US011258957B2

(12) United States Patent
McElvain et al.

(10) Patent No.: US 11,258,957 B2
(45) Date of Patent: Feb. 22, 2022

(54) AUTO EXPOSURE OF IMAGE SENSORS BASED UPON ENTROPY VARIANCE

(71) Applicant: DOLBY LABORATORIES LICENSING CORPORATION, San Francisco, CA (US)

(72) Inventors: Jon S. McElvain, Manhattan Beach, CA (US); Walter C. Gish, Oak Park, CA (US); Jonathan Robert Miller, Glendora, CA (US); Gregory John Ward, Berkeley, CA (US); Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/274,165

(22) PCT Filed: Sep. 5, 2019

(86) PCT No.: PCT/US2019/049795
§ 371 (c)(1),
(2) Date: Mar. 5, 2021

(87) PCT Pub. No.: WO2020/051361
PCT Pub. Date: Mar. 12, 2020

(65) Prior Publication Data
US 2021/0360139 A1 Nov. 18, 2021

Related U.S. Application Data

(60) Provisional application No. 62/728,654, filed on Sep. 7, 2018.

(30) Foreign Application Priority Data

Sep. 7, 2018 (EP) .................................... 18193265

(51) Int. Cl.
H04N 5/235 (2006.01)
H04N 5/357 (2011.01)
(Continued)

(52) U.S. Cl.
CPC ......... *H04N 5/2353* (2013.01); *H04N 5/2355* (2013.01); *H04N 5/357* (2013.01); *H04N 5/3535* (2013.01); *H04N 5/35554* (2013.01)

(58) Field of Classification Search
CPC .. H04N 5/2353; H04N 5/357; H04N 5/35554; H04N 5/3535; H04N 5/2355
See application file for complete search history.

(56) References Cited

U.S. PATENT DOCUMENTS 6,580,454 B1   6/2003  Perner
8,441,535 B2   5/2013  Morin
(Continued)

FOREIGN PATENT DOCUMENTS

CN   108419025   8/2018
EP     2175635   4/2010
(Continued)

OTHER PUBLICATIONS

Cvetkovic, S. et al. "Automatic Level Control for Video Cameras towards HDR Techniques" Jan. 2010, URASIP J. Image and Video Processing.
(Continued)

*Primary Examiner* — Twyler L Haskins
*Assistant Examiner* — Angel L Garces-Rivera

(57) ABSTRACT

An auto exposure method for an image sensor includes (a) evaluating variance, for each of a plurality of histograms of the pixel values from a respective plurality of individual exposures of the image sensor at respective exposure 5 time settings, of contribution from individual bins of the histogram to total entropy of the histogram, to determine an
(Continued)

optimal exposure time for the image sensor corresponding to a minimum value of the variance, and (b) outputting the optimal exposure time to the image sensor.

20 Claims, 30 Drawing Sheets

(51) Int. Cl.
*H04N 5/353* (2011.01)
*H04N 5/355* (2011.01)

(56) References Cited

U.S. PATENT DOCUMENTS

| | | | |
|---|---|---|---|
| 8,730,353 | B2 | 5/2014 | Park |
| 8,743,235 | B2 * | 6/2014 | Kehtarnavaz .......... H04N 5/235 348/222.1 |
| 9,916,644 | B1 | 3/2018 | Swami |
| 2007/0242141 | A1 | 10/2007 | Ciurea |
| 2008/0297597 | A1 | 12/2008 | Inomata |
| 2009/0303347 | A1 | 12/2009 | Kwon |
| 2010/0091124 | A1 | 4/2010 | Hablutzel |
| 2012/0113297 | A1 | 5/2012 | Mori |
| 2012/0120279 | A1 | 5/2012 | Li |
| 2013/0028509 | A1 | 1/2013 | Moon |
| 2013/0208138 | A1 | 8/2013 | Li |
| 2015/0042836 | A1 | 2/2015 | Lin |
| 2015/0130967 | A1 | 5/2015 | Pieper |
| 2017/0064179 | A1 | 3/2017 | Richards |
| 2018/0191934 | A1 | 7/2018 | Song |

FOREIGN PATENT DOCUMENTS

| | | |
|---|---|---|
| EP | 2565843 | 3/2013 |
| EP | 3270583 | 1/2018 |

OTHER PUBLICATIONS

Ning, J. et al. "The Optimization and Design of the Auto-Exposure Algorithm Based on Image Entropy" 2015 IEEE 8th International Congress on Image and Signal Processing, pp. 1020-1025.

Rahman, M. et al. "Using Image Entropy Maximum for Auto Exposure" Journal of Electronic Imaging, Jan.-Mar. 2011.

Schulz, S. et al. "Using Brightness Histogram to Perform Optimum Auto Exposure", WSEAS Transactions on System and Control, vol. 2, Issue 2, Feb. 2007, pp. 1-9.

* cited by examiner

```
                                    2000
                                         ↘

┌─────────────────────────────────────────────────────────────────────────────┐
│                    DETERMINE AN OPTIMAL LONG EXPOSURE TIME                   │
│                                     2010                                     │
│  ┌───────────────────────────────────────────────────────────────────────┐  │
│  │ CHANGE THE LONG EXPOSURE TIME TO MINIMIZE A NOISE DISCREPANCY BETWEEN  │  │
│  │ THE LONG-EXPOSURE PIXEL VALUES AND THE SHORT-EXPOSURE PIXEL VALUES AT A│  │
│  │ TRANSITION POINT THAT DEFINES TRANSITION BETWEEN USE OF THE LONG-      │  │
│  │ EXPOSURE PIXEL VALUES AND USE OF THE SHORT-EXPOSURE PIXEL VALUES IN    │  │
│  │ DEMOSAICING OF AN IMAGE CAPTURED BY THE SME HDR IMAGE SENSOR           │  │
│  │                                  2012                                  │  │
│  └───────────────────────────────────────────────────────────────────────┘  │
└─────────────────────────────────────────────────────────────────────────────┘
                                      │
                                      ▼
┌─────────────────────────────────────────────────────────────────────────────┐
│ PERFORM A PLURALITY OF REPETITIONS OF STEPS 510, 520, 530, 540, AND 550 (AND │
│ OPTIONALLY STEP 560) OF METHOD 500 TO DETERMINE AN OPTIMAL SHORT EXPOSURE    │
│ TIME, WHEREIN THE GOODNESS METRIC IS OR INCLUDES ENTROPY VARIANCE ACROSS THE │
│ HDR HISTOGRAM                                                                │
│                                   2020                                       │
└─────────────────────────────────────────────────────────────────────────────┘
```

FIG. 20

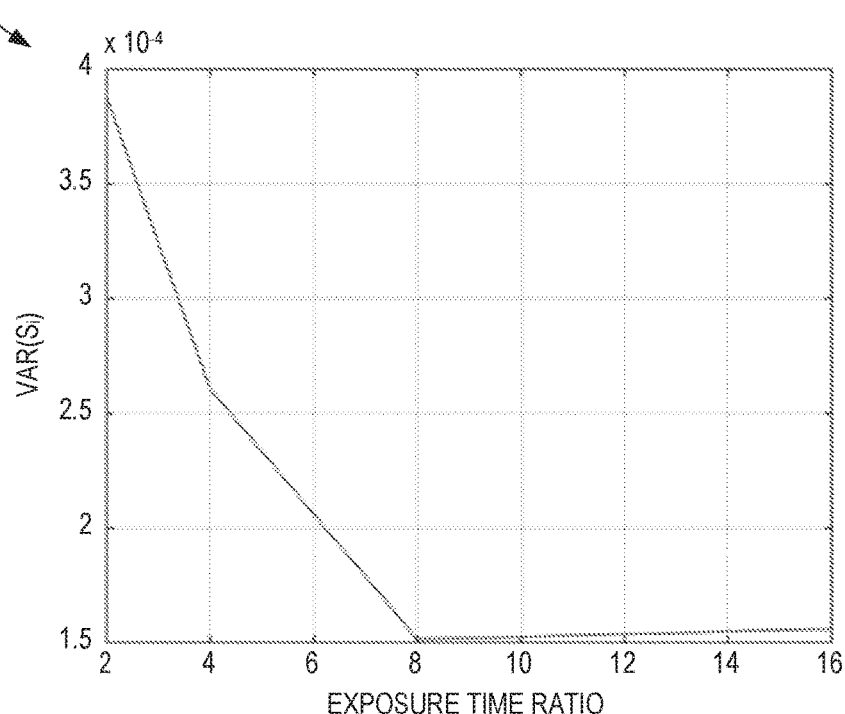

FIG. 21

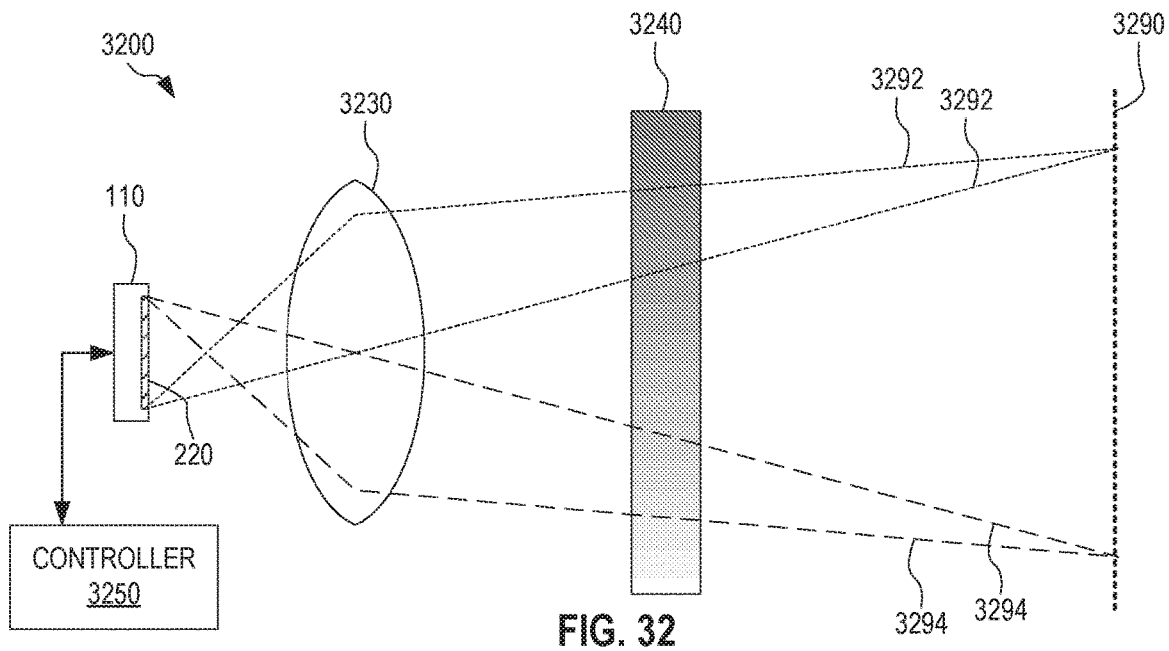
FIG. 32
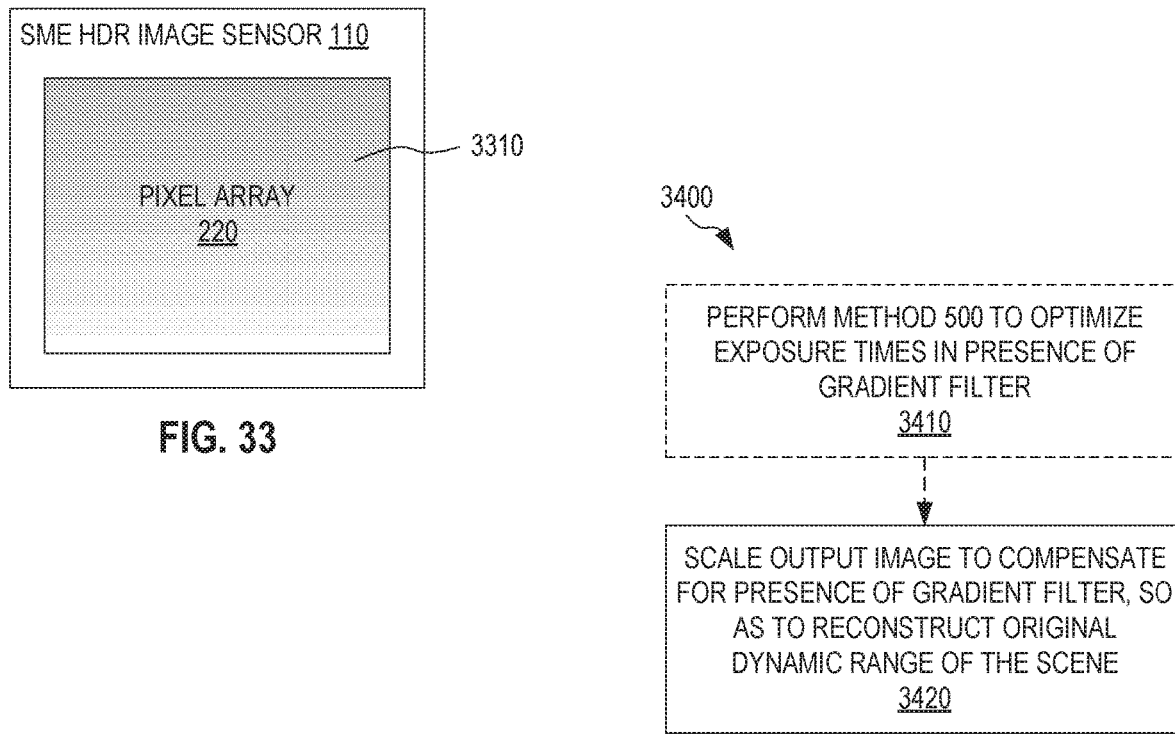
FIG. 33
FIG. 34

4000

```
┌─────────────────────────────────────────────────────────────────────────────┐
│ EVALUATE VARIANCE, FOR EACH OF A PLURALITY OF HDR HISTOGRAMS OF THE PIXEL   │
│ VALUES FROM A RESPECTIVE PLURALITY OF INDIVIDUAL EXPOSURES OF THE SME-HDR   │
│ IMAGE SENSOR AT RESPECTIVE EXPOSURE TIME SETTINGS, OF CONTRIBUTION FROM     │
│ INDIVIDUAL BINS OF THE HDR HISTOGRAM TO TOTAL ENTROPY OF THE HDR HISTOGRAM, │
│ TO DETERMINE AN OPTIMAL EXPOSURE TIME SETTING FOR THE IMAGE SENSOR          │
│ CORRESPONDING TO A MINIMUM VALUE OF THE VARIANCE                            │
│ 4010                                                                        │
└─────────────────────────────────────────────────────────────────────────────┘
```

REPEAT FOR DIFFERENT EXPOSURE TIME SETTINGS

REMOVE EFFECT OF NOISE FROM EXPOSURE-TIME-SPECIFIC HISTOGRAMS
4012

GENERATE AN INSTANCE OF THE HDR HISTOGRAM FOR THE PIXEL VALUES FROM AN EXPOSURE AT A RESPECTIVE ONE OF THE EXPOSURE TIME SETTING
4014

SYNTHESIZE THE HDR HISTOGRAM FROM A PLURALITY OF EXPOSURE-TIME-SPECIFIC HISTOGRAMS ASSOCIATED WITH A RESPECTIVE PLURALITY OF PIXEL SUBSETS OF THE SME HDR IMAGE SENSOR OPERATING AT A RESPECTIVE PLURALITY OF DIFFERENT EXPOSURE TIMES
4016

CALCULATE THE VARIANCE FROM THE INSTANCE OF THE HISTOGRAM
4018

OUTPUT THE OPTIMAL EXPOSURE TIME SETTING TO THE SINGLE-EXPOSURE-TIME IMAGE SENSOR
4020

FIG. 40

AUTO EXPOSURE OF IMAGE SENSORS BASED UPON ENTROPY VARIANCE

CROSS-REFERENCE TO RELATED APPLICATIONS

This application claims priority to U.S.Provisional Patent Application No. 62/728,654, filed Sep. 7, 2018 and European Patent Application No. 18193265.8, filed Sep. 7, 2018, each of which is hereby incorporated by reference in its entirety.

TECHNICAL FIELD

The present application relates to auto exposure of digital cameras.

BACKGROUND

For traditional digital cameras, adjusting proper image exposure is paramount to achieving high quality images through the camera image processing pipeline. Overexposure can result in blown-out regions of the image, and underexposure may give rise to excessive noise levels and possible color artifacts. For professional and high-end consumer cameras, such as digital single-lens reflex (DSLR) cameras, there are generally three parameters adjusted in the context of auto-exposure: exposure time, analog and/or digital gain (ISO speed), and iris aperture size (f-number). Smartphone cameras and other mobile-device based cameras generally have a fixed lens. On these platforms, the auto exposure algorithm optimizes two parameters: exposure time and gain. In general, auto exposure algorithms analyze one or more images captured by the imaging system to optimize exposure time and gain (and f-number in the case of variable iris cameras).

The image sensor of most mobile-device based cameras, such as smartphone cameras, has a limited dynamic range, due to lower bit depth output (typically 10 bits), in addition to a reduced full-well capacity of the pixels. For many scenes, this dynamic range is insufficient to capture both the brightest and darkest areas of the scene. For example, when taking a photo of a person that is backlit, the person's face may appear underexposed or, alternatively, the brighter background may appear overexposed. There are several examples of high-dynamic-range (HDR) imaging functionality, and some of these can extend the dynamic range of the camera beyond the dynamic range of the image sensor. In a typical approach, an HDR digital camera captures two images of the same scene: one image with a short exposure time to get good image data for bright portions of a scene, and another image with a longer exposure time to get good image data for darker portions of the scene. Onboard image processing circuitry then scales these two images to a common scale and combines the scaled images to produce a single HDR image of the scene that better depicts both the brighter and the darker scene portions. Such HDR imaging works well in many situations, and this type of HDR imaging functionality has become a standard feature in many devices for still photography. However, the short and long exposures are recorded at different times with at least a full-frame readout process in between, and the image combination therefore often produces undesirable artifacts when the scene is not static. If an object moves between the short exposure and the long exposure, the HDR image may show, in severe cases, offset duplicate images of the moving object or, in less severe cases, edge artifacts at the moving object.

In an effort to eliminate motion artifacts in HDR images, the industry has developed spatially-multiplexed-exposure (SME) HDR image sensors that achieve brighter and dimmer exposures in a single shot. An SME HDR image sensor applies an exposure time pattern to the pixel array of the image sensor, such that not all pixels operate with the same exposure time. In one SME HDR image sensor type, popularly known as a zig-zag HDR image sensor, the pixel array is divided into zig-zag pixel lines, wherein the zig-zag lines alternate between a long and a short exposure time. In another SME HDR image sensor type, a Quad HDR image sensor, the common Bayer color filter pattern is expanded, such that each color filter covers a 2×2 block of pixels. Within the 2×2 block, one pixel is exposed at a long exposure time, another pixel is exposed at a short exposure time, and the remaining two pixels are exposed at a middle exposure time.

SUMMARY

In an embodiment, an auto exposure method for a spatially-multiplexed-exposure (SME) high-dynamic-range (HDR) image sensor includes (a) retrieving raw image data from an exposure of the SME HDR image sensor, wherein the raw image data includes long-exposure pixel values from pixels of the SME HDR image sensor characterized by a long exposure time and short-exposure pixel values from pixels of the SME HDR image sensor characterized by a short exposure time, (b) preprocessing the long-exposure pixel values and the short-exposure pixel values to remove therefrom long-exposure pixel values and short-exposure pixel values failing to meet one or more quality requirements, (c) synthesizing, into an HDR histogram, the long-exposure pixel values remaining after the step of preprocessing and the short-exposure pixel values remaining after the step of preprocessing, (d) deriving a goodness metric from the HDR histogram, (e) adjusting at least one of the long exposure time and the short exposure time, based at least in part upon the goodness metric, and (f) outputting the at least one of the long exposure time and the short exposure time, as adjusted, to the SME HDR image sensor.

In an embodiment, a product for auto exposure of an SME HDR image sensor includes machine-readable instructions encoded in non-transitory memory. The machine-readable instructions include (a) data input instructions that, when executed by a processor, retrieve raw image data from an exposure of the SME HDR image sensor, wherein the raw image data includes long-exposure pixel values from pixels of the SME HDR image sensor characterized by a long exposure time and short-exposure pixel values from pixels of the SME HDR image sensor characterized by a short exposure time, (b) preprocessing instructions that, when executed by the processor, preprocess the long-exposure pixel values and the short-exposure pixel values to remove therefrom long-exposure pixel values and short-exposure pixel values failing to meet one or more quality requirements, (c) synthesizing instructions that, when executed by the processor, synthesize into an HDR histogram (i) the long-exposure pixel values remaining after execution of the preprocessing instructions and (ii) the short-exposure pixel values remaining after execution of the preprocessing instructions, (d) metric instructions that, when executed by the processor, derive a goodness metric from the HDR histogram, (e) adjustment instructions that, when executed by the processor, adjust at least one of the long exposure time and the short exposure time, based at least in part upon the goodness metric, and (f) data output instructions that, when executed by the processor, output the at least one of the long exposure time and the short exposure time.

In an embodiment, an auto exposure method for an image sensor includes (a) evaluating variance, for each of a plurality of histograms of the pixel values from a respective plurality of individual exposures of the image sensor at respective exposure time settings, of contribution from individual bins of the histogram to total entropy of the histogram, to determine an optimal exposure time for the image sensor corresponding to a minimum value of the variance, and (b) outputting the optimal exposure time to the image sensor.

In an embodiment, a product for auto exposure of an image sensor includes machine-readable instructions encoded in non-transitory memory. The machine-readable instructions include (a) data input instructions that, when executed by a processor, retrieve pixel values from the image sensor, (b) entropy variance optimization instructions that, when executed by a processor, evaluate variance, across each of a plurality of histograms of the pixel values from a respective plurality of individual exposures of the image sensor at respective exposure time settings, of contribution from individual bins of the histogram to total entropy of the histogram, to determine an optimal exposure time for the image sensor corresponding to a minimum value of the variance, and (c) data output instructions that, when executed by the processor, output the optimal exposure time to the image sensor.

In an embodiment, an auto exposure method for a spatially-multiplexed-exposure (SME) high-dynamic-range (HDR) image sensor includes (a) retrieving raw image data from an exposure of the SME HDR image sensor, wherein the raw image data includes long-exposure pixel values from long-exposure pixels of the SME HDR image sensor characterized by a long exposure time and short-exposure pixel values from short-exposure pixels of the SME HDR image sensor characterized by a short exposure time, (b) for each of a plurality of spatial regions of the SME-HDR image sensor, evaluating saturation level of a selected long-exposure pixel in the spatial region, (c) for each of the spatial regions characterized by the long-exposure pixel value of the selected long-exposure pixel exceeding a saturation threshold, determining (i) a reduced short exposure time for the short-exposure pixels in the spatial region and (ii) an increased digital gain value that compensates for the reduced short exposure time, and (d) for each of the spatial regions characterized by the long-exposure pixel value of the selected long-exposure pixel exceeding the saturation threshold, outputting the reduced short exposure time and the increased digital gain value to each short-exposure pixel in the spatial region.

In an embodiment, a high-dynamic-range (HDR) imaging system with auto exposure functionality includes an SME HDR image sensor with circuitry configured to separately adjust at least one exposure time for each of a plurality of spatial regions. The HDR imaging system further includes a processor, and machine-readable instructions encoded in non-transitory memory. The machine-readable instructions include (a) data input instructions that, when executed by the processor, retrieve raw image data from an exposure of the SME HDR image sensor, wherein the raw image data includes long-exposure pixel values from long-exposure pixels of the SME HDR image sensor characterized by a long exposure time and short-exposure pixel values from short-exposure pixels of the SME HDR image sensor characterized by a short exposure time, (b) saturation evaluation instructions that, when executed by the processor and for each of the spatial regions, evaluate saturation level of at least one selected long-exposure pixel in the spatial region, (c) adjustment instructions that, when executed by the processor and for each of the spatial regions characterized by the long-exposure pixel value of the at least one selected long-exposure pixel exceeding a saturation threshold, determine (i) a reduced short exposure time for each short-exposure pixel in the spatial region and (ii) an increased digital gain value that compensates for the reduced short exposure time, and (d) data output instructions that, when executed by the processor and for each spatial region characterized by the long-exposure pixel value of the at least one selected long-exposure pixel exceeding a saturation threshold, output the reduced short exposure time and the increased digital gain value to each short-exposure pixel in the spatial region.

BRIEF DESCRIPTION OF THE DRAWINGS

FIG. 20 illustrates an auto exposure method, for a dual-exposure-time SME HDR image sensor, which first optimizes a long exposure time and next optimizes a short exposure time based upon entropy variance, according to an embodiment.

FIG. 21 is a plot of example entropy variances computed in the method of FIG. 20.

FIGS. 32 and 33 illustrate an HDR camera that includes a gradient filter to shrink the dynamic range of a scene, according to an embodiment.

FIG. 34 illustrates a method for reconstructing at least part of the original dynamic range of scene when captured by an HDR camera using gradient filter, according to an embodiment.

FIG. 40 illustrates a method for auto exposure of an SME HDR image sensor based at least in part upon minimization of entropy variance, according to an embodiment.

DESCRIPTION OF EXAMPLE EMBODIMENTS

Disclosed herein are systems and methods for auto exposure of spatially-multiplexed-exposure (SME) high-dynamic-range (HDR) image sensors, as well as camera systems that employ an SME HDR image sensor and have auto exposure functionality. Certain embodiments of the disclosed systems and methods have applicability beyond auto exposure of SME HDR image sensors.

Figure 1:
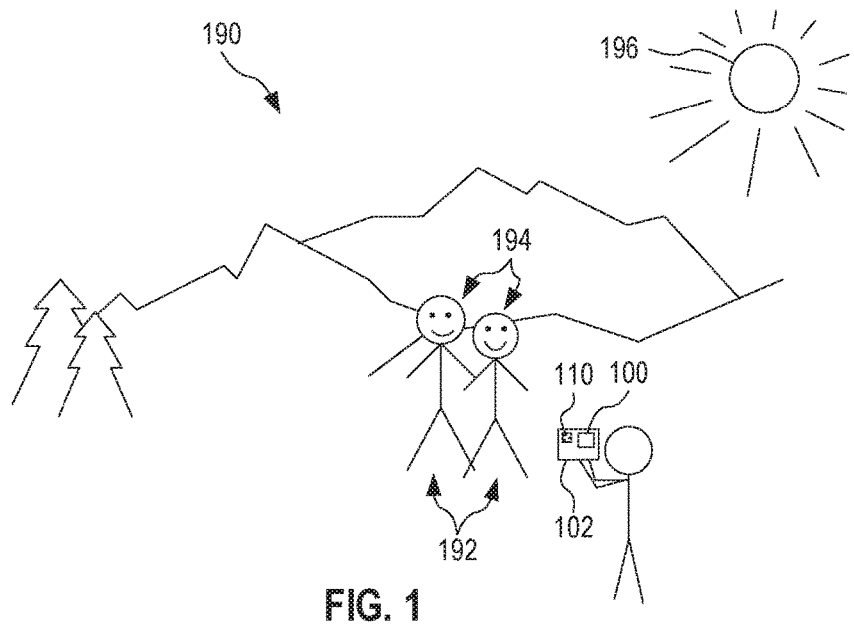
FIGS. 1 and 2 illustrate an exposure time controller for auto exposure of a spatially-multiplexed-exposure (SME) high-dynamic-range (HDR) image sensor in an HDR camera, according to an embodiment.
Figure 2:
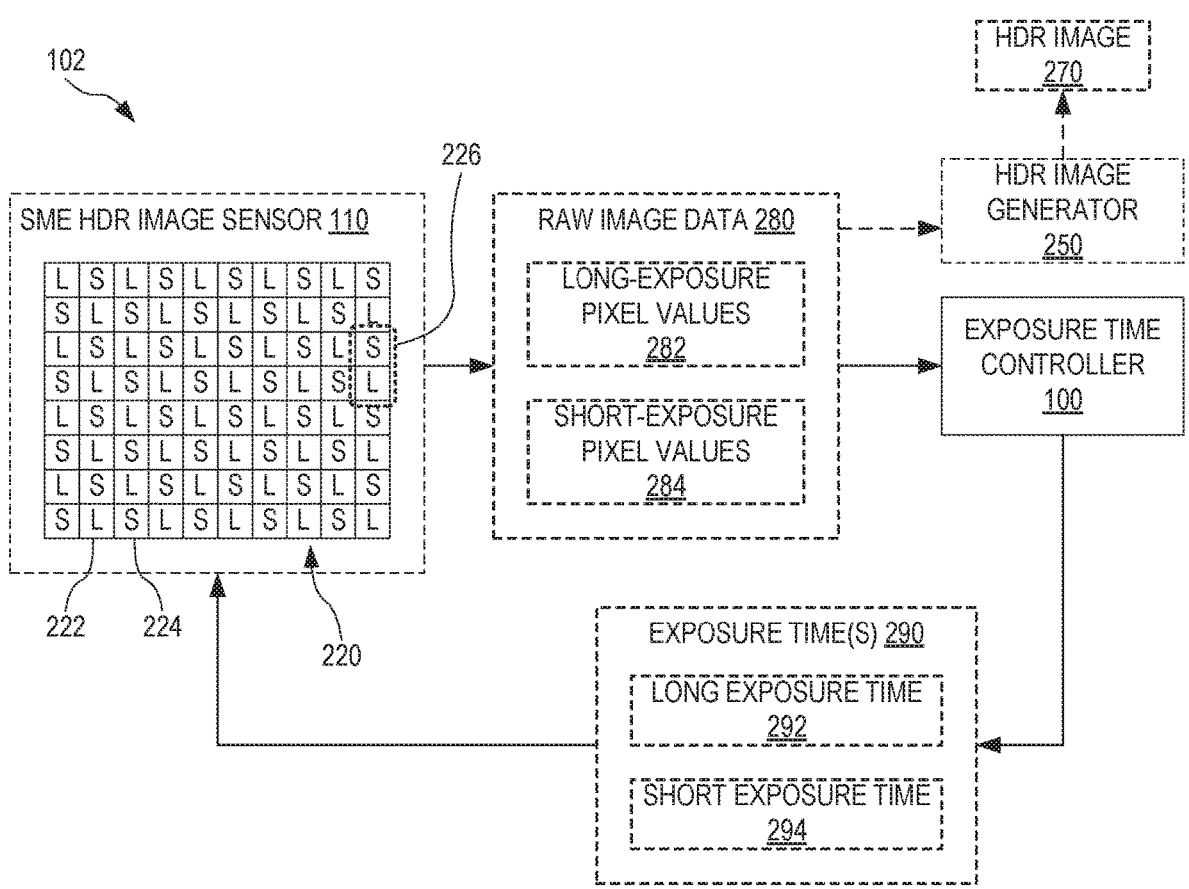

FIGS. 1 and 2 illustrate one exposure time controller 100 for auto exposure of an SME HDR image sensor 110 in an HDR camera 102. FIG. 1 shows exposure time controller 100 implemented in HDR camera 102 in one example of use. FIG. 2 is a functional block diagram illustrating functionality of exposure time controller 100 in HDR camera 102. FIGS. 1 and 2 are best viewed together.

In the use scenario of FIG. 1, HDR camera 102 generates an HDR image of a scene 190 that has a high dynamic range at least because persons 192 are backlit by sun 196, such that faces 194 of persons 192 are significantly darker than portions of scene 190 directly lit by sun 196. For the purpose of enabling HDR imaging, photosensitive pixel array 220 of SME HDR image sensor 110 includes a plurality of long-exposure pixels 222 and a plurality of short-exposure pixels 224. Long-exposure pixels 222 are configured to operate at a long exposure time 292, while short-exposure pixels 224 are configured to operate at a short exposure time 294. When generating HDR imagery, for example as needed to capture the dynamic range of scene 190, long exposure time 292 is longer than short exposure time 294. However, in some embodiments, SME HDR image sensor 110 may be configured to operate with equal long exposure time 292 and short exposure time 294 when the dynamic range of the scene does not require HDR imagery, or when a user of HDR camera 102 has disabled HDR functionality.

It is understood that the layout of long-exposure pixels 222 and short-exposure pixels 224 in pixel array 220 depicted in FIG. 2 is only one example of possible configurations of pixel array 220. Without departing from the scope hereof, pixel array 220 may arrange long-exposure pixels 222 and short-exposure pixels 224 differently from the layout shown in FIG. 2. However, to achieve HDR imagery, pixel array 220 arranges long-exposure pixels 222 and short-exposure pixels 224 in a mosaic such that each long-exposure pixel 222 is adjacent or near at least one short-exposure pixel 224 and vice versa, for example as indicated by pixel group 226 in FIG. 2.

SME HDR image sensor 110 exposes all pixels of pixel array 220 in a single "shot", such that each frame captured by pixel array 220 includes pixel values of both long-exposure pixels 222 and short-exposure pixels 224. For comparison, temporally-multiplexed exposure HDR cameras are not capable of applying different exposure times to different pixels of the same pixel array. Instead, a temporally-multiplexed exposure HDR camera is equipped with a standard single-exposure-time pixel array and sequentially captures two (or more) full frames at two (or more) different respective exposure times.

Exposure time controller 100 is configured to adjust at least one of long exposure time 292 and short exposure time 294 to achieve an extended dynamic range that is optimal for scene 190.

Figure 3:
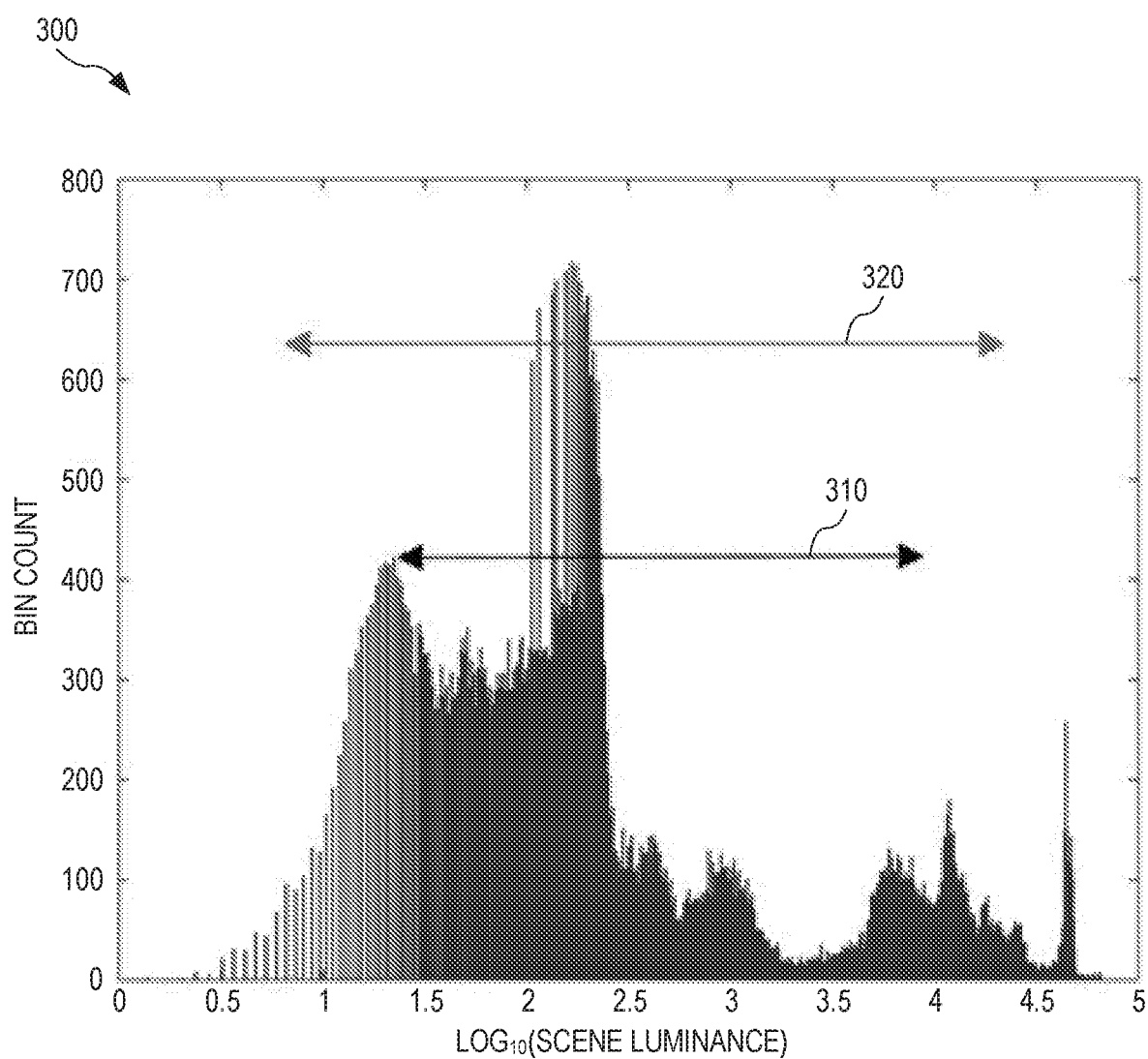
FIG. 3 shows an example luminance histogram for a scene.

FIG. 3 shows one example luminance histogram 300 for a scene, such as scene 190. A typical single-exposure-time image sensor has a dynamic range 310. Auto exposure of such a single-exposure-time image sensor could move dynamic range 310 to a most important portion of luminance histogram 300. However, regardless of its position, dynamic range 310 will miss significant portions of the signal in luminance histogram 300. In contrast, the coexistence of long-exposure pixels 222 and short-exposure pixels 224 enables SME HDR image sensor 110 to achieve a high dynamic range, such as high dynamic range 320, that is greater than dynamic range 310. Each of long-exposure pixels 222 and short-exposure pixels 224 may have a dynamic range similar to dynamic range 310, but the dynamic ranges of long-exposure pixels 222 and short-exposure pixels 224 can cooperate to capture a higher dynamic range.

Referring again to FIGS. 1 and 2, exposure time controller 100 is configured to determine values for long exposure time 292 and short exposure time 294 that best capture the signal in luminance histogram 300. Thus, exposure time controller 100 may adjust both position and extent of high dynamic range 320 to best capture the dynamic range of scene 190.

Exposure time controller 100 retrieves raw image data 280 from an exposure of pixel array 220. For each frame captured by pixel array 220, raw image data 280 includes both (a) long-exposure pixel values 282 from respective long-exposure pixels 222 and (b) short-exposure pixel values 284 from respective short-exposure pixels 224. Exposure time controller 100 processes one or more frames of raw image data 280 to adjust long exposure time 292 and short exposure time 294 for the dynamic range properties of scene 190. Exposure time controller 100 communicates an adjusted exposure time set 290, including values of long exposure time 292 and short exposure time 294, to SME HDR image sensor 110. Exposure time controller 100 may adjust one or both of long exposure time 292 and short exposure time 294.

In one implementation, exposure time controller 100 optimizes exposure time set 290 through an iterative process. In this iterative process, exposure time controller performs multiple iterations of (a) retrieving a frame of raw image data 280 from SME HDR image sensor 110, (b) adjusting one or both of long exposure time 292 and short exposure time 294 based upon long-exposure pixel values 282 and short-exposure pixel values 284, and (c) communicating an adjusted exposure time step 290 to SME HDR image sensor 110. Each subsequent iteration is based on raw image data 280 captured according to adjusted exposure time set 290 received in the preceding iteration. In another implementation, exposure time controller 100 optimizes exposure time set 290 in a non-iterative manner based upon analysis of raw image data 280 from several different frames, each captured using a different exposure time set 290.

HDR camera 102 may further include an HDR image generator 250 that generates an HDR image 270 from raw image data 280, for example as captured after auto exposure of SME HDR image sensor 110 by exposure time controller 100.

Figure 4:
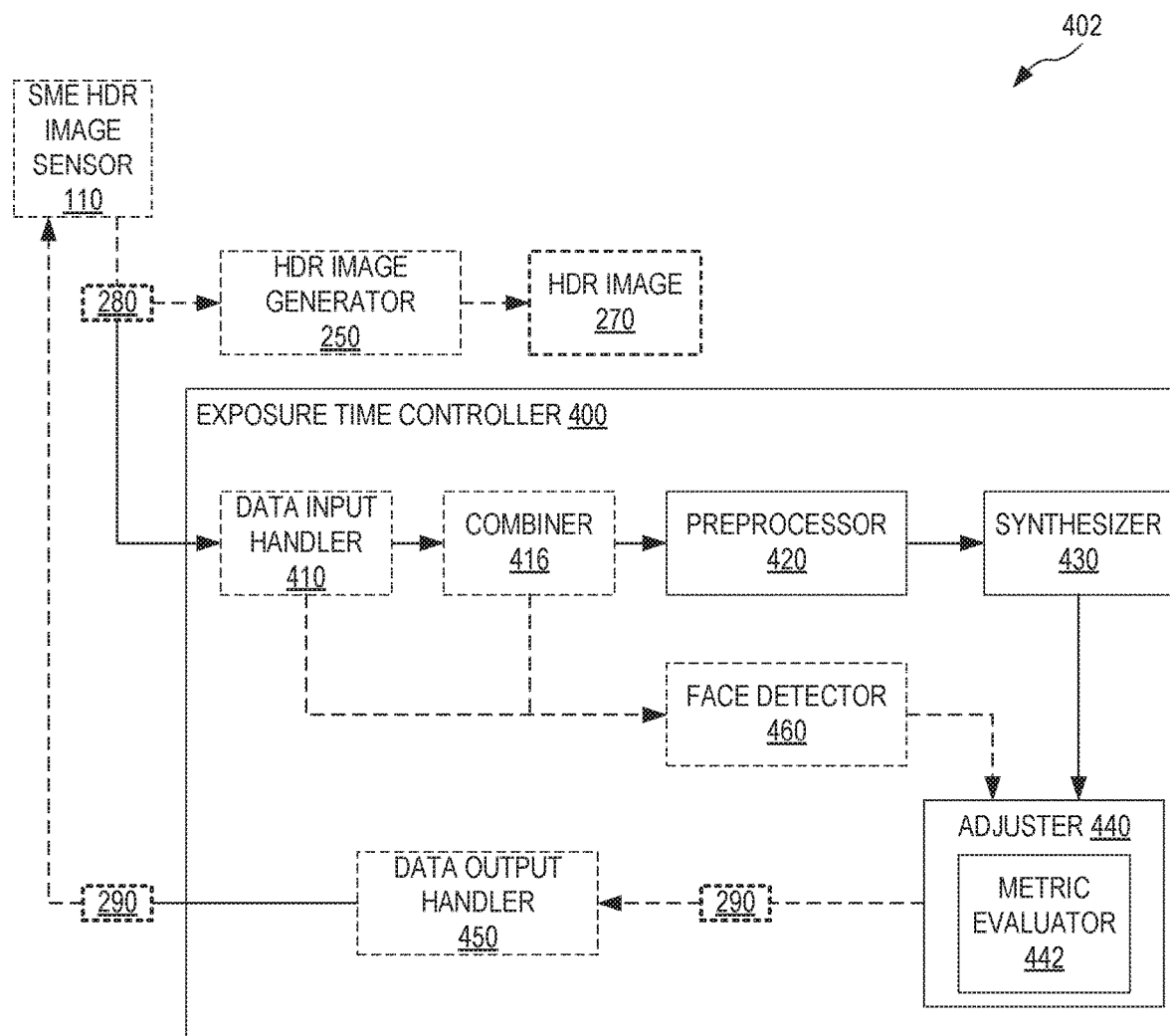
FIG. 4 illustrates an exposure time controller for auto exposure of an SME HDR image sensor based at least in part upon evaluation of a goodness metric derived from an HDR histogram synthesized from long-exposure pixel values and short-exposure pixel values from the SME HDR image sensor, according to an embodiment.

FIG. 4 illustrates one exposure time controller 400 for auto exposure of an SME HDR image sensor based at least in part upon evaluation of a goodness metric derived from an HDR histogram synthesized from long-exposure pixel values and short-exposure pixel values from the SME HDR image sensor. Exposure time controller 400 is an embodiment of exposure time controller 100 and may be implemented together with SME HDR image sensor 110 in an HDR camera 402 (an embodiment of HDR camera 102). Alternatively, exposure time controller 400 may be provided as a standalone product to be implemented with a third-party SME HDR image sensor.

Exposure time controller 400 includes a preprocessor 420, a synthesizer 430, and an adjuster 440. Adjuster 440 includes a metric evaluator 442. Exposure time controller 400 may further include one or both of a data input handler 410 and a data output handler 450.

In operation, preprocessor 420 processes long-exposure pixel values 282 and short-exposure pixels values 284 of raw image data 280 from an exposure of SME HDR image sensor 110 (i.e., from one frame captured by SME HDR image sensor 110). Data input handler 410 may retrieve raw image data 280 from SME HDR image sensor 110. After preprocessing by preprocessor 420, synthesizer 430 synthesizes long-exposure pixel values 282 and short-exposure pixels values 284 into an HDR histogram of pixel values. Adjuster 440 utilizes metric evaluator 442 to evaluate a goodness metric of the HDR histogram. Based at least in part on this goodness metric, adjuster 440 generates an adjusted exposure time set 290. Data output handler 450 may communicate the adjusted exposure time set 290 to SME HDR image sensor 110.

In an embodiment, exposure time controller 400 further includes a face detector 460. Face detector 460 processes image data received from SME HDR image sensor 110, for example raw image data 280 retrieved by data input handler 410, to detect one of more faces in the image captured by SME HDR image sensor 110, such as faces 194. In this embodiment, adjuster 440 may further take into account the exposure of one or more faces detected by face detector 460 to adjust exposure time set 290. In one example of this embodiment, adjuster 440 collectively considers the goodness metric and exposure of one or more faces detected by face detector 460 to optimize exposure time set 290 for both appropriate exposure of the face(s) and ideal capture of the general dynamic range of the HDR histogram. Adjuster 440 may be configured to trade off these two metrics according to a preconfigured or user-definable setting.

Exposure time controller 400 may further include a combiner 416. The functionality of combiner 416 is discussed below, primarily in reference to FIG. 11.

HDR camera 402 may further include HDR image generator 250 that generates an HDR image 270 from raw image data 280, for example as captured after auto exposure of SME HDR image sensor 110 by exposure time controller 400.

Figure 5:
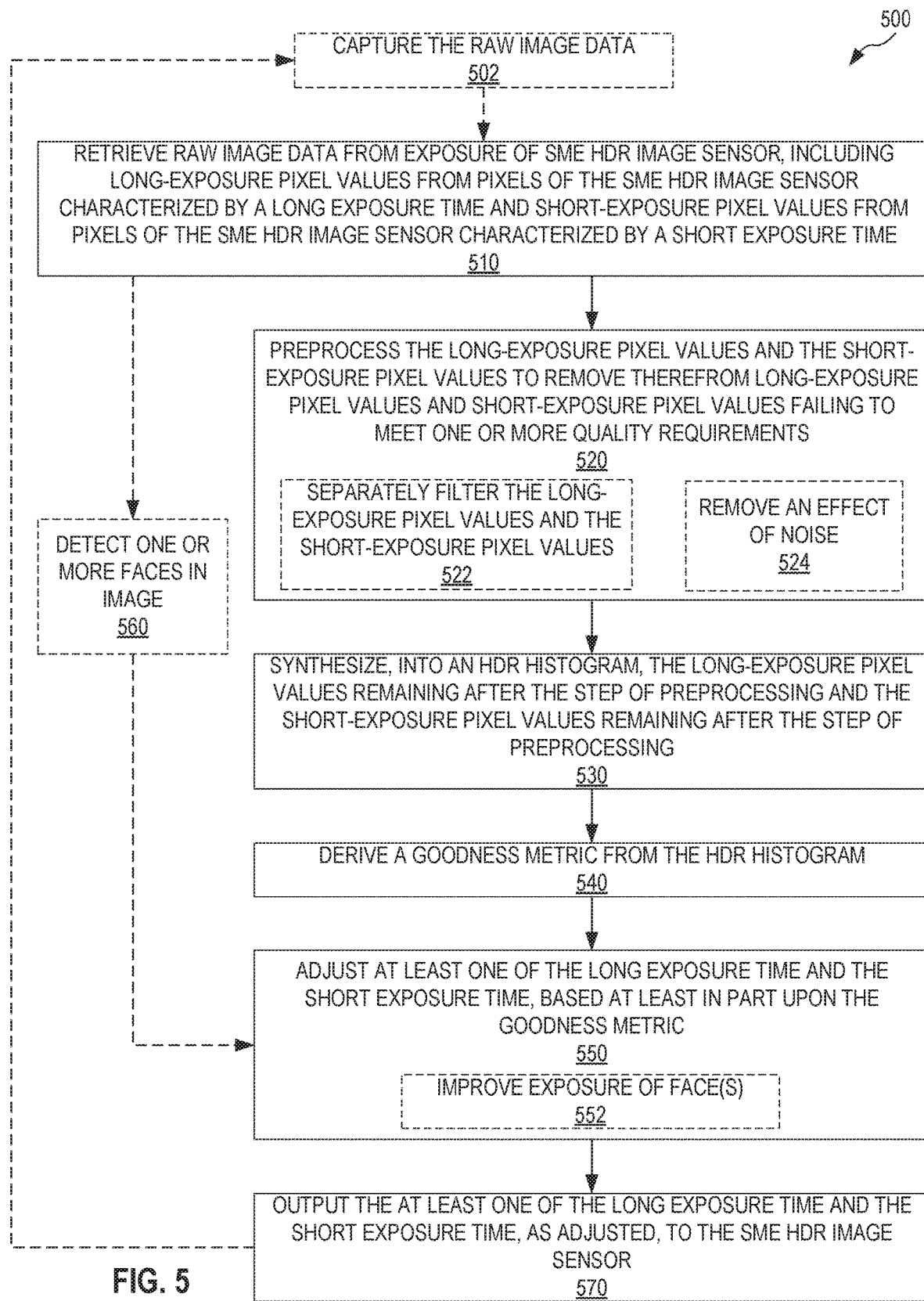
FIG. 5 illustrates an auto exposure method for an SME HDR image sensor, according to an embodiment.

FIG. 5 illustrates one auto exposure method 500 for an SME HDR image sensor. Method 500 may be performed by exposure time controller 400, for example to auto expose SME HDR image sensor 110 in HDR camera 102.

In a step 510, method 500 retrieves raw image data from an exposure of an SME HDR image sensor, including long-exposure pixel values from pixels of the SME HDR image sensor characterized by a long exposure time and short-exposure pixel values from pixels of the SME HDR image sensor characterized by a short exposure time. For each long-exposure pixel value there is at least one corresponding short-exposure pixel value and vice versa. Each such group of corresponding long-exposure and short-exposure pixel values originate from adjacent or nearby long-exposure and short-exposure pixels. For example, pixel group 226 generates a spatially associated group of a long-exposure pixel value 282 and a short-exposure pixel value 284. In one example of step 510, data input handler 410 retrieves a frame of raw image data 280 from an exposure of SME HDR image sensor 110.

In a step 520, method 500 preprocesses the long-exposure pixel values and the short-exposure pixel values, retrieved in step 510, to remove therefrom long-exposure pixel values and the short-exposure pixel values failing to meet one or more quality requirements. Step 520 may include a step 522 of separately filtering the long-exposure pixel values and the short-exposure pixel values. Step 522 may remove long-exposure pixel values that are saturated and short-exposure pixel values that are significantly affected by noise. Step 520 may also remove long-exposure pixel values and short-exposure pixel values that are affected by a motion artifact. Even though the long-exposure pixel values and the short-exposure pixel values originate from the same exposure of the SME HDR image sensor, the difference between the long exposure time and the short exposure time may result in an inconsistency between long-exposure pixel values and short-exposure pixel values in non-static regions of the scene. These motion artifacts are less severe than those experienced with temporally-multiplexed-exposure HDR cameras, where the long and short exposures are separated at least by a full readout cycle. In an embodiment, step 520 includes a step 524 of removing an effect of noise from the long-exposure pixel values and the short-exposure pixel values. Preprocessor 420 may perform step 520 on long-exposure pixel values 282 and short-exposure pixel values 284.

After preprocessing in step 520, some of the remaining long-exposure pixel values may no longer have a spatially associated remaining short-exposure pixel value, and some of the remaining short-exposure pixel values may no longer have a spatially associated remaining long-exposure pixel value. However, some groups of spatially associated long-exposure and short-exposure pixel values may still be intact or at least still include one long-exposure pixel value and one short-exposure pixel value.

In a step 530, method 500 synthesizes, into an HDR histogram, the long-exposure pixel values and short-exposure pixel values remaining after step 520. In one example of step 530, synthesizer 430 synthesizes long-exposure pixel values 282 and short-exposure pixel values 284 received from preprocessor 420 after preprocessing according to step 520.

In a step 540, method 500 derives a goodness metric from the HDR histogram synthesized in step 530. The goodness metric may be based upon one or more parameters such as (a) the number of pixels overexposed or underexposed in the HDR histogram, (b) the number of pixels clipped at the lower and/or upper end of the HDR histogram, (c) statistical parameters of the HDR histogram, e.g., mean, weighted mean, or median, (d) the total entropy computed from the histogram, e.g., $S_{total} = -\Sigma p_i \log_2(p_i)$, wherein $p_i$ is a relative count in the i'th bin of the HDR histogram and the summation is over all bins i of the HDR histogram, (e) a weighted version of the total entropy $S_{total}$, (f) entropy $S_{noise}$ due to noise, (g) useful entropy determined as $F = S_{total} - S_{noise}$, (h) variance across the HDR histogram of the contribution of individual bins to the total entropy, e.g., $Var(S_i) = (S_i - \text{mean}(S_i))^2$, wherein $S_i = -p_i \log_2(p_i)$, and (i) a transition-point noise discrepancy defined herein as the noise discrepancy between long-exposure pixel values and short-exposure pixel values at the transition point between use of long-exposure pixel values and short-exposure pixel values in HDR image generation of an HDR image from image data captured by the SME HDR image sensor. In implementations where the goodness metric includes more than one parameter, the goodness metric may be a weighted sum of such parameters. The magnitude of the weights may be set according to whether a lower value or a higher value of the parameter is deemed advantageous. In one example of step 540, metric evaluator 442 derives a goodness metric from an HDR histogram synthesized by synthesizer 430.

In a step 550, method 500 adjusts at least one of the long exposure time and the short exposure time for the SME HDR image sensor. Step 550 bases this adjustment at least in part upon the goodness metric, and the adjustment made by step 550 seeks to improve this goodness metric. For example, step 550 may adjust the long and/or short exposure time to maximize useful entropy, to collectively minimize $Var(S_i)$ and the transition-point noise discrepancy, to reduce clipping at the upper and/or lower ends of the HDR histogram, or to optimize another goodness metric listed above in reference to step 540. Step 550 may consider several aspects of a composite goodness metric and make different adjustments based upon the different aspects. In one example of step 550, adjuster 440 adjusts one or both of long exposure time 292 and short exposure time 294, based at least in part upon the goodness metric determined in step 540, and outputs a resulting adjusted exposure time set 290.

In an embodiment, collectively minimizing minimize $Var(S_i)$ and the transition-point noise discrepancy, comprises minimizing a function dependent on the variance and the transition point discrepancy. For example, the function may be a cost function that weighs the importance of each of the two factors, the minimum of the variance and the minimum of the noise discrepancy. In other words, an optimal exposure time may be determined by collectively minimizing the entropy variance and the noise discrepancy between pixel values from at least two different exposure times in this function. The function may have one or more (local) minimum at which the variance and the noise discrepancy are both simultaneously at a relative minimum.

Figure 6:
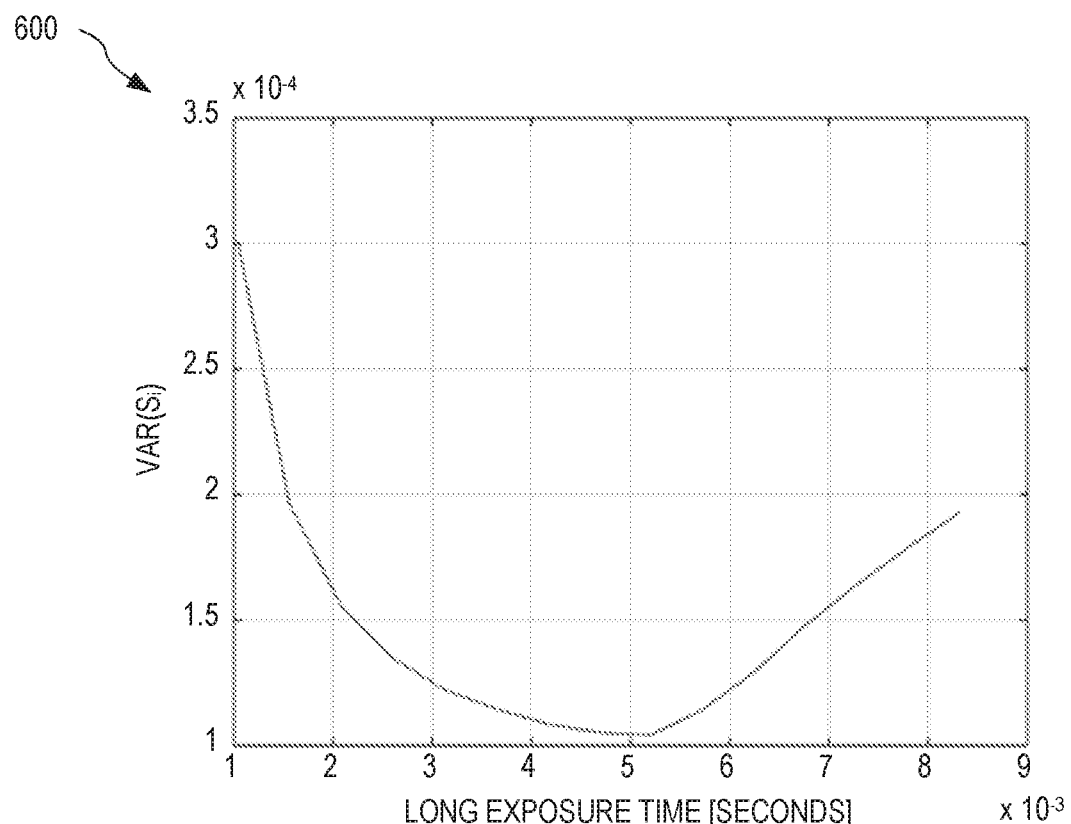
FIG. 6 is a plot of example entropy variances.

FIG. 6 is a plot 600 of example entropy variances that may be computed in a plurality of repetitions of step 540 of method 500. Plot 600 shows $Var(S_i)$ as a function of the long exposure time for a fixed ratio of 16 between the long exposure time and the short exposure time. Plot 600 shows a minimum in the entropy variance $Var(S_i)$ at a long exposure time of approximately 5 milliseconds. Thus, in an example of step 550 based upon the data of plot 600, step 550 may determine that the optimal long exposure time is approximately 5 milliseconds.

Step 550 of method 500 may utilize data such as those shown in plot 600 to determine an optimal exposure time, optionally while also considering other factors. Step 550 may consider the entropy variance Var($S_i$) as a function of the long exposure time (for example as shown in FIG. 6), as a function of the short exposure time, or as a function of both the short and the long exposure time.

In an embodiment, method 500 further includes a step 560 of detecting one of more faces in an image generated by the SME HDR image sensor. In this embodiment of method 500, step 550 includes a step 552 of improving the exposure of the detected face(s). Face detector 460 may perform step 560. Step 552 may compare a brightness of the detected face(s) to a target brightness and scale the long exposure time accordingly, optionally in a tradeoff with optimization of the exposure times according to the goodness metric. For example, step 550 may adjust, in step 552, the long exposure time to improve face exposure and then adjust the short exposure time to improve the goodness metric of step 540.

In a step 570, method 500 outputs an exposure time set, as adjusted in step 550, to the SME HDR image sensor. In one example of step 570, data output handler 450 outputs an adjusted exposure time set 290 to SME HDR image sensor 110.

Method 500 may further include a step 502 of capturing the raw image data retrieved in step 510. In one example of step 502, SME HDR image sensor 110 captures raw image data 280.

In one implementation, method 500 performs several iterations of steps 510, 520, 530, 540, 550 (optionally preceded by step 560 and including step 552), and 570, and optionally step 502, to iteratively optimize the exposure times for the SME HDR image sensor. In this implementation, each iteration (except for the first one) is based upon raw image data generated with exposure times according as adjusted in the preceding iteration. Different iterations of one iterative optimization process may emphasize different goodness metrics and/or face exposure. For example, initial iterations may make adjustments of the long exposure time to reduce clipping at the low end of the HDR histogram and/or to improve face exposure, whereas later iterations adjust the short exposure time and make smaller adjustments to the long exposure time to optimize a goodness metric derived from the HDR histogram, such as an entropy based metric.

Without departing from the scope hereof, method 500 may, instead of performing an iterative optimization, perform several repetitions of steps 510, 520, 530, and 540 (and optionally one or both of steps 560 and 502), to map out the goodness metric (and, optionally, face exposure) as a function of the long and/or short exposure times. In this alternative implementation, step 550 selects the exposure time set that optimizes the goodness metric or collectively optimizes the goodness metric and face exposure, and step 570 outputs the selected exposure time set to the SME HDR image sensor.

Although not shown in FIG. 5, method 500 may further include a step of generating an HDR image (e.g., HDR image 270) from raw image data captured after auto exposure of the SME HDR image sensor 110 by iterations or repetitions of steps 510, 520, 530, 540, 550, and 570 (and optionally 560). HDR image generator 250 may perform this step of generating an HDR image.

Figure 7:
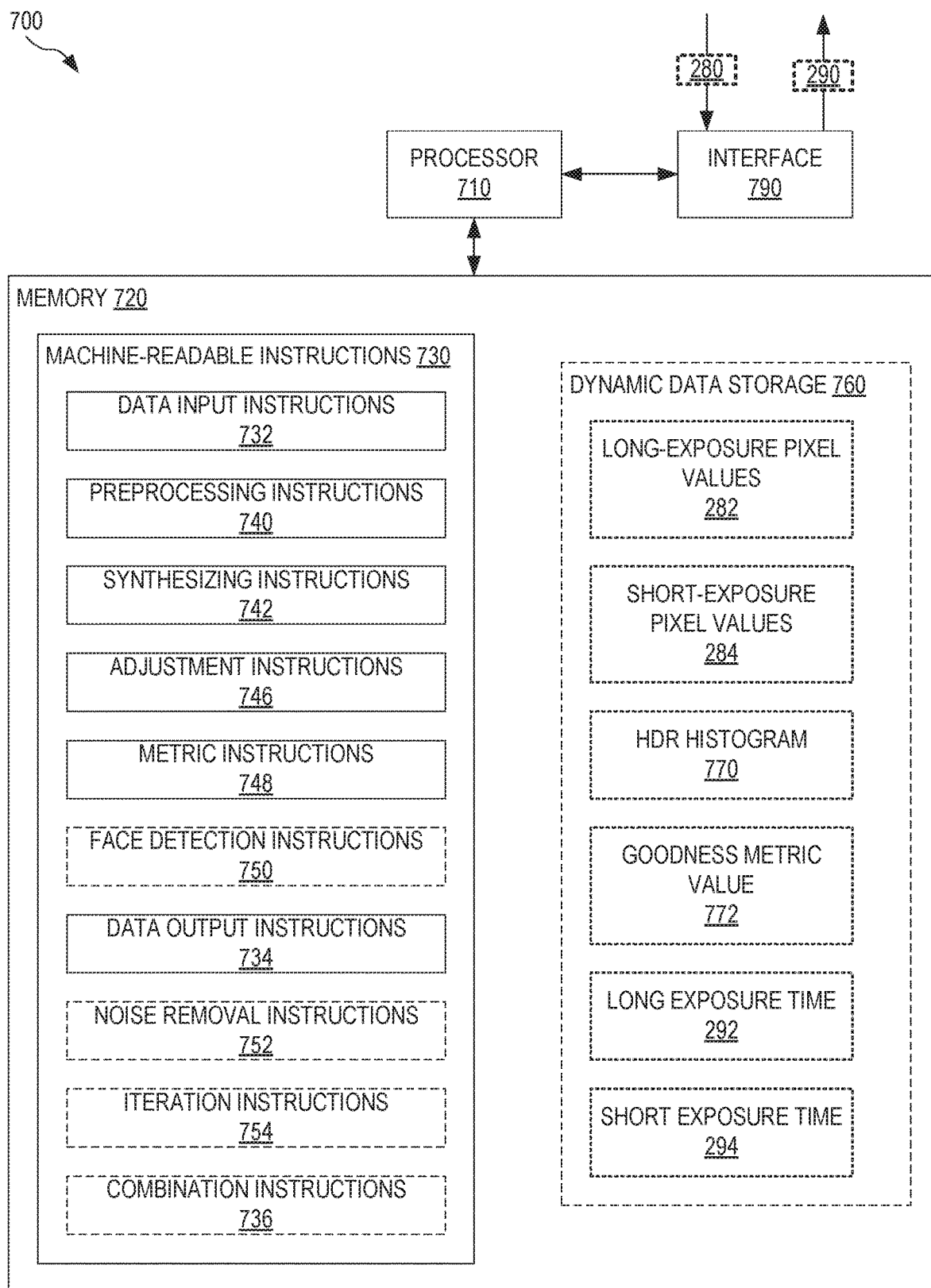
FIG. 7 illustrates a computer for auto exposure of an SME HDR image sensor based at least in part upon evaluation of a goodness metric derived from an HDR histogram synthesized from long-exposure pixel values and short-exposure pixel values from the SME HDR image sensor, according to an embodiment.

FIG. 7 illustrates one computer 700 for auto exposure of an SME HDR image sensor based at least in part upon evaluation of a goodness metric derived from an HDR histogram synthesized from long-exposure pixel values and short-exposure pixel values from the SME HDR image sensor. Computer 700 is an embodiment of exposure time controller 400 and may be implemented together with SME HDR image sensor 110 in HDR camera 402. Alternatively, computer 700 may be provided as a standalone product to be implemented with a third-party SME HDR image sensor. Computer 700 includes a processor 710, a non-transitory memory 720, and an interface 790. Memory 720 includes machine-readable instructions 730 and may further include a dynamic data storage 760.

Machine-readable instructions 730 include data input instructions 732, preprocessing instructions 740, synthesizing instructions 742, adjustment instructions 746, metric instructions 748, and data output instructions 734 that, upon execution by processor 710, perform steps 510, 520, 530, 550, 540, and 570, respectively, of method 500. Data input instructions 732 are configured to retrieve raw image data 280 via interface 790, and data output instructions 734 are configured to output exposure time set 290 via interface 790. Machine-readable instructions 730 may further include one or both of face detection instructions 750 and noise removal instructions 752 that, upon execution by processor 710, perform steps 560 and 524, respectively, of method 500.

In certain embodiments, machine-readable instructions 730 includes iteration instructions 754 that, upon execution by processor 710, effect the performance of several iterations of method 500 according to data input instructions 732, preprocessing instructions 740, synthesizing instructions 742, adjustment instructions 746, metric instructions 748, and data output instructions 734, and optionally one or both of face detection instructions 750 and noise removal instructions 752.

Dynamic data storage 760 may store one or more of (a) long-exposure pixel values 282 and short-exposure pixel values 284 received via interface 790 upon execution by processor 710 of data input instructions 732 and preprocessed upon execution by processor 710 of preprocessing instructions 740, (b) an HDR histogram 770 generated upon execution by processor 710 of synthesizing instructions 742, (c) a goodness metric value 772 generated upon execution by processor 710 of metric instructions 748, and long exposure time 292 and short exposure time 294 adjusted upon execution by processor 710 of adjustment instructions 746.

Machine-readable instructions 730 may further include combination instructions 736 that cooperate with processor 710 to form an embodiment of combiner 416.

In cooperation with processor 710, data input instructions 732, preprocessing instructions 740, synthesizing instructions 742, adjustment instructions 746, metric instructions 748, data output instructions 734, face detection instructions 750, and combination instructions 736 form respective embodiments of data input handler 410, preprocessor 420, synthesizer 430, adjuster 440, metric evaluator 442, data output handler 450, face detector 460, and combiner 416. Noise removal instructions 752 may be implemented in preprocessor 420. Iteration instructions 754 may be implemented in exposure time controller 400.

It is understood that machine-readable instructions 730 may be provided as a standalone software product encoded in non-transitory memory for implementation with a third-party processor 710 and interface 790.

An SME HDR image sensor may be configured to utilize more than two different exposure times in each exposure, for example a long exposure time, a middle exposure time, and a short exposure time. The systems and method described above in reference to FIGS. 1-7 are readily extended to work with such SME HDR image sensors. Thus, without departing from the scope hereof, SME HDR image sensor 110 may, in addition to long-exposure pixels 222 and short-exposure pixels 224, include one or more sets of middle-exposure pixels, wherein each set of middle-exposure pixels is exposed at a respective middle exposure time that is shorter than long exposure time 292 and longer than short exposure time 294. Such embodiments of SME HDR image sensor 110 outputs, in each frame of raw image data 280, long-exposure pixel values 282, short-exposure pixel values 284, and also one or more sets of middle-exposure pixel values generated by one or more respective sets of middle-exposure pixels. For example, each pixel group 226 may be extended by one or more middle-exposure pixels located in the same spatial region.

Correspondingly, exposure time controller 100 may process raw image data 280 that further includes such middle-exposure pixel values. Embodiments based on three or more different exposure times may further extend high dynamic range 320 as compared to embodiments limited to two different exposure times. Alternatively or in combination therewith, the additional exposure time(s) may serve to reduce bit depth or noise requirements to the SME HDR image sensor, or provide at least one additional degree of freedom in the auto exposure process.

Referring now to exposure time controller 400, each of data input handler 410, preprocessor 420, and synthesizer 430 may be configured to further process one or more sets of middle-exposure pixel values as part of raw image data 280. Specifically, preprocessor 420 may remove, from each set of middle-exposure pixel values, both saturated middle-exposure pixel values and middle-exposure pixel values that are significantly affected by noise. Each of adjuster 440 and data output handler 450 may be configured to process one or more middle exposure times as part of exposure time set 290. Similarly, for method 500, each of steps 502, 510, 520, and 530 (and in certain embodiments also step 560) may be adapted to process one or more sets of middle-exposure pixel values in addition to the long-exposure pixel values and the short-exposure pixel values, and each of steps 550 and 570 may be adapted to process one or more middle exposure times in addition to the long exposure time and the short exposure time. It follows that computer 700 may be similarly configured to further process one or more sets of middle-exposure pixel values and one or more middle exposure times.

In embodiments including one or more middle exposure times, the transition-point noise discrepancy may refer to the transition-point noise discrepancy between two exposure times that are adjacent to each other in terms of duration. For example, in embodiments having a long exposure time, a single middle-exposure time, and a short exposure time, the transition-point noise discrepancy may be evaluated between long-exposure pixel values and middle-exposure pixel values and/or between middle-exposure pixel values and short-exposure pixel values.

The embodiments discussed above in reference to FIGS. 1-7 are applicable to both monochrome SME HDR image sensors and color SME HDR image sensors. For color SME HDR image sensors, the long-exposure pixel values and the short-exposure pixel values (and, when applicable, each set of middle-exposure pixel values) each contain pixel values for a plurality of different colors, such as three colors. For example, each pixel group 226 may be extended to include (a) three long-exposure pixels 222 sensitive to three different colors, respectively, and (b) three short-exposure pixels 224 sensitive to the three different colors, respectively (and, when applicable, one or more groups of three middle-exposure pixels sensitive to the three different colors, respectively). Exposure time controller 100, exposure time controller 400, method 500, and computer 700 may be configured to first combine the different colors to generate long-exposure pixel values and short-exposure pixel values (and, when applicable, one or more sets of middle-exposure pixel values) that are representative of luminance, and then proceed as discussed above to determine exposure time(s) based upon these exposure-time-specific luminance values. Exposure time controller 400 may employ combiner 416 to combine different colors. Alternatively, exposure time controller 100, exposure time controller 400, method 500, and computer 700 may be configured to process different colors separately at least up until the point of adjusting the exposure time set, at which point each exposure time may be defined uniformly for all colors.

Figure 8:
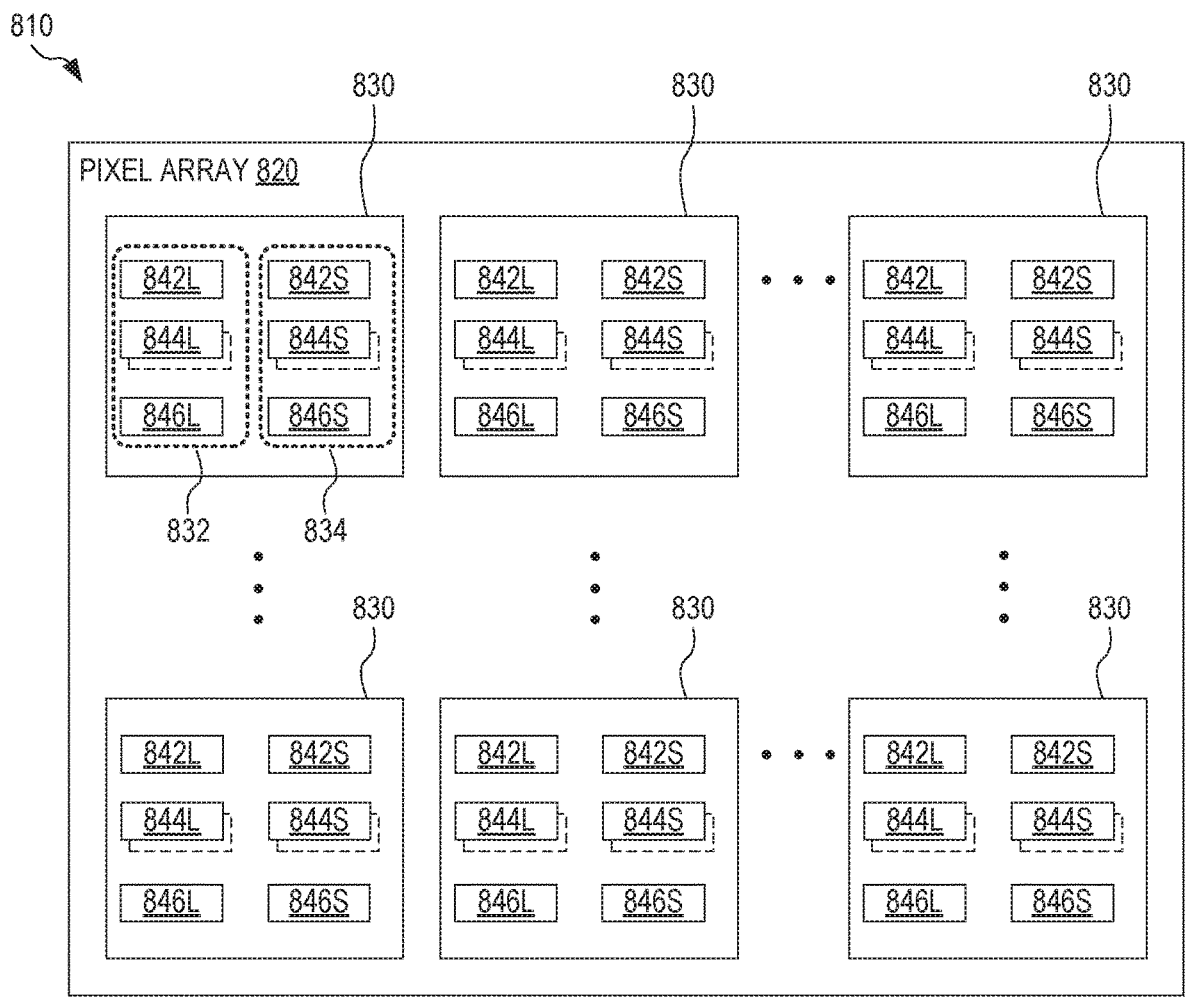
FIG. 8 illustrates a color SME HDR image sensor having a pixel array that includes a plurality of multicolor pixel groups, according to an embodiment.

FIG. 8 illustrates one color SME HDR image sensor 810 having a pixel array 820 that includes a plurality of multi-color pixel groups 830. Color SME HDR image sensor 810 is an embodiment of SME HDR image sensor 110, pixel array 820 is an embodiment of pixel array 220, and pixel group 830 is an embodiment of pixel group 226. Each pixel group 830 includes long-exposure pixels 832 and short-exposure pixels 834. Long-exposure pixels 832 and short-exposure pixels 834 are embodiments of long-exposure pixels 222 and short-exposure pixels 224. Within each pixel group 830, long-exposure pixels 832 include color-specific pixels 842L, 844L, and 846L, and short-exposure pixels 834 include color-specific pixels 842S, 844S, and 846S. Pixels 842L and 842S are sensitive to a first color, Pixels 844L and 844S are sensitive to a second color, and pixels 846L and 846S are sensitive to a third color. The first, second, and third colors may be red, green, and blue, respectively. Each pixel group 830 may include two or more instances of any one of color-specific pixels 842L, 844L, 846L, 842S, 844S, and 846S. For example, as shown in FIG. 8, each pixel group 830 may include two instances of pixel 844L and two instances of pixel 844S.

Figure 9:
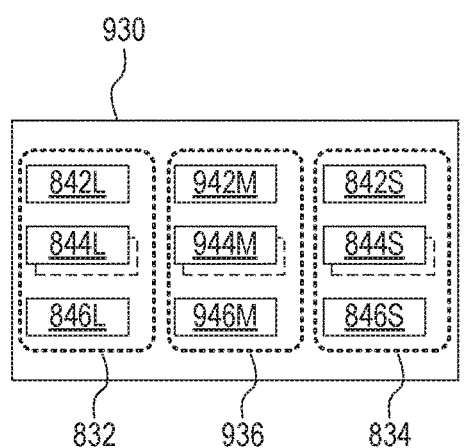
FIG. 9 illustrates a multicolor triple-exposure time pixel group that may be implemented in the color SME HDR image sensor of FIG. 8, according to an embodiment.

FIG. 9 illustrates one multicolor triple-exposure time pixel group 930 that may be implemented in color SME HDR image sensor 810. Pixel group 930 is an embodiment of pixel group 830 that further includes at least one set of middle-exposure pixels 936. Each set of middle-exposure pixels 936 is exposed at a middle exposure time that is shorter than the long exposure time and longer than the short exposure time. Each set of middle-exposure pixels 936 includes color-specific pixels 942M, 944M, and 946M that are sensitive to the first, second, and third colors, respectively. Each pixel group 930 may include two or more instances of any one of color-specific pixels 842L, 844L, 846L, 842S, 844S, 846S, 942M, 944M, and 946M. For example, as shown by dashed boxes in FIG. 9, each pixel group 930 may include two instances of pixel 844L, two instances of pixel 844S, and two instances of pixel 944M. In embodiments of pixel group 930 that includes more than one set of middle-exposure pixels 936, each set of middle-exposure pixels 936 is exposed at a different respective exposure time.

Figure 10:
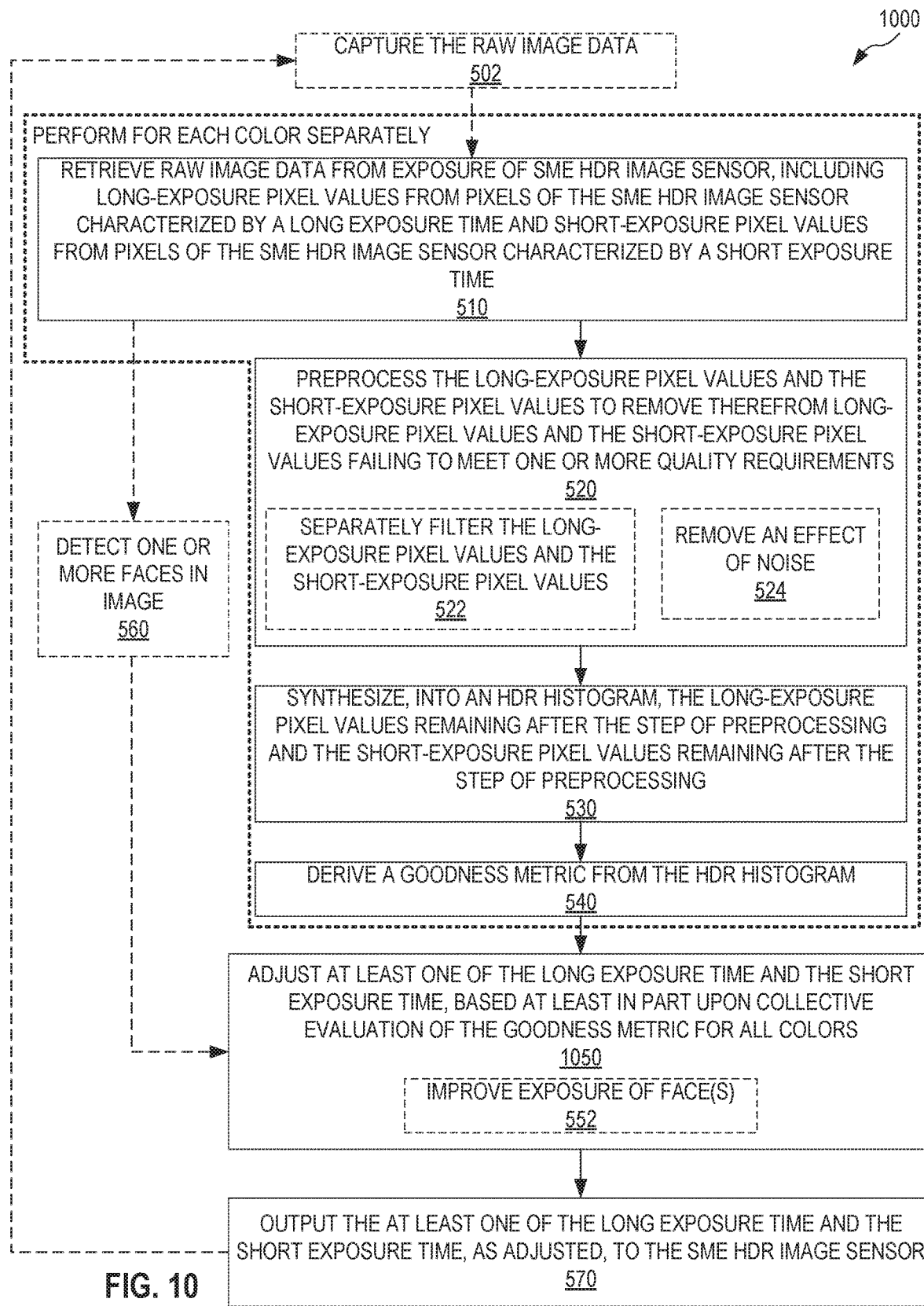
FIG. 10 illustrates an auto exposure method, for a color SME HDR image sensor, that generates and considers an HDR histogram for each color of the color SME HDR image sensor, according to an embodiment.

FIG. 10 illustrates one auto exposure method 1000, for a color SME HDR image sensor, that generates and considers an HDR histogram for each color of the color SME HDR image sensor. Method 1000 is an embodiment of method 500. Method 1000 may be performed by exposure time controller 400 or computer 700, for example to auto expose color SME HDR image sensor 810 in HDR camera 102.

Method 1000 performs steps 510, 520, 530, and 540 for each color separately. Method 1000 thereby determines a goodness metric for each of the colors. The goodness metric may or may not be the same or similar for different colors.

In one example, data input handler 410, preprocessor 420, synthesizer 430, and metric evaluator 442 perform steps 510, 520, 530, and 540, respectively, for each of the first, second, and third colors of color SME HDR image sensor 810, based upon raw image data 280 that includes long-exposure pixel values 282 from long-exposure pixels 832 and short-exposure pixel values 284 from short-exposure pixels 834, and optionally also middle-exposure pixel values from middle-exposure pixels 936.

Next, method 1000 performs a step 1050 of adjusting at least one of the long exposure time and the short exposure time, based at least in part upon a collective evaluation of the color-specific goodness metrics determined in step 540. Each exposure time determined in step 1050 applies to every color. Step 1050 does not generate color-specific exposure times. Step 1050 is an embodiment of step 550. In the collective evaluation of the color-specific goodness metrics, step 1050 may apply the same weight to each color or apply color-dependent weights. The color-dependent weights may be adaptive to the scene content, such that a dominant color is assigned a greater weight. In one example of step 1050, adjuster 440 adjusts at least one of long exposure time 292 and short exposure time 294 (and optionally one or more middle exposure times), based at least in part upon a collective evaluation of the color-specific goodness metrics determined in step 540, and adjuster 440 outputs a resulting adjusted exposure time set 290.

Method 1000 may include steps 560 and 552, as discussed above in reference to FIG. 5. In one implementation, method 1000 bases step 560 on one or more of the different colors and searches for faces in color-specific image data (e.g., in green image data). In another implementation, method 1000 combines the different colors to generate a luminance image that forms the basis of face detection in step 560.

After completion of step 1050, method 1000 performs step 570 to output an exposure time set, as adjusted in step 550, to the color SME HDR image sensor. In one example of step 570, data output handler 450 outputs an adjusted exposure time set 290 to color SME HDR image sensor 810.

Method 1000 may further include step 502 of capturing the raw image data retrieved in step 510. In one example of step 502, as implemented in method 1000, color SME HDR image sensor 810 captures raw image data 280 that includes long-exposure pixel values 282 from long-exposure pixels 832 and short-exposure pixel values 284 from short-exposure pixels 834, and optionally also middle-exposure pixel values from middle-exposure pixels 936.

Method 1000 may perform several iterations of steps 510, 520, 530, 540, 550 (optionally preceded by step 560 and including step 552), and 570, and optionally step 502, to iteratively optimize the exposure times for the SME HDR image sensor, wherein steps 510, 520, 530, and 540 are performed for each color in each iteration. As discussed above in reference to FIG. 5, each iteration (except for the first one) is based upon raw image data generated with exposure times according as adjusted in the preceding iteration, and different iterations of one iterative optimization process may emphasize different goodness metrics and/or face exposure. Without departing from the scope hereof, method 1000 may, instead of performing an iterative optimization, perform several repetitions of steps 510, 520, 530, and 540 (and optionally one or both of steps 560 and 502), to map out the goodness metric (and, optionally, face exposure) as a function of the long and/or short exposure times, wherein steps 510, 520, 530, and 540 are performed for each color in each repetition. In this alternative implementation, step 550 selects the exposure time set that optimizes the goodness metric or collectively optimizes the goodness metric and face exposure, and step 570 outputs the selected exposure time set to the SME HDR image sensor.

Figure 11:
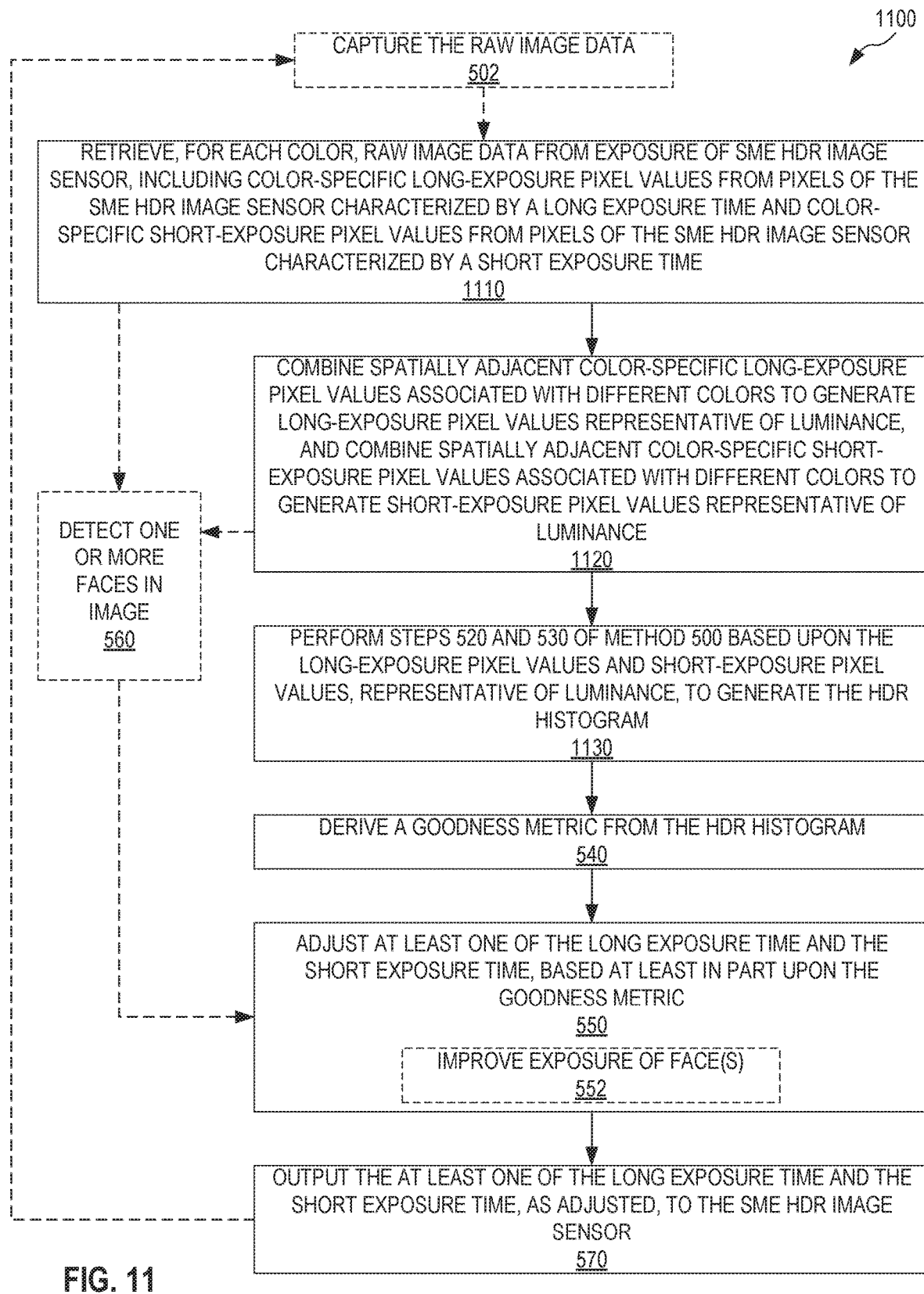
FIG. 11 illustrates an auto exposure method, for a color SME HDR image sensor, that generates and considers an HDR histogram of luminance values, according to an embodiment.

FIG. 11 illustrates one auto exposure method 1100, for a color SME HDR image sensor, that generates and considers an HDR histogram of luminance values. Method 1100 is an embodiment of method 500. Method 1100 may be performed by exposure time controller 400 or computer 700, for example to auto expose color SME HDR image sensor 810 in HDR camera 102.

In a step 1110, method 1100 retrieves, for each color, raw image data from exposure of SME HDR image sensor. The raw image data includes color-specific long-exposure pixel values from pixels of the SME HDR image sensor characterized by a long exposure time and color-specific short-exposure pixel values from pixels of the SME HDR image sensor characterized by a short exposure time. The raw image data may also include one or more sets of color-specific middle-exposure pixel values, wherein each set of color-specific middle-exposure pixel values originates from pixels of the SME HDR image sensor characterized by a respective middle exposure time. In one example of step 1110, data input handler 410 retrieves a frame of raw image data 280 from an exposure of SME HDR image sensor 110, wherein the frame of raw image data 280 includes long-exposure pixel values 282 from long-exposure pixels 832 of each pixel group 830 and short-exposure pixel values 283 from short-exposure pixels 834 of each pixel group 830. The frame of raw image data 280 may also include one or more sets of middle-exposure pixel values, wherein each set originates from middle-exposure pixels 936, of each pixel group 930, exposed at a respective middle exposure time.

A subsequent step 1120 combines, for each exposure time, pixel values from spatially adjacent pixels associated with different colors to generate a respective exposure-time-specific luminance value. Step 1120 combines spatially adjacent color-specific long-exposure pixel values associated with different colors to generate long-exposure pixel values representative of luminance, and combines spatially adjacent color-specific short-exposure pixel values associated with different colors to generate short-exposure pixel values representative of luminance Step 1120 may also combine spatially adjacent color-specific middle-exposure pixel values associated with different colors to generate middle-exposure pixel values representative of luminance. In one example of step 1120, combiner 416 processes pixel values received from each pixel group 830. For each pixel group 830, combiner 416 (a) combines long-exposure pixel values 282 from pixels 842L, 844L, and 846L to form a long-exposure luminance value for the pixel group 830 under consideration and (b) combines short-exposure pixel values 283 from pixels 842S, 844S, and 846S to form a short-exposure luminance value for the pixel group 830 under consideration. Combiner 416 may also, for each pixel group 830 (930) and for each middle exposure time, combine middle-exposure pixel values from pixels 942M, 944M, and 946M to form a middle-exposure luminance value for the pixel group 830 (930) and middle exposure time under consideration.

In a step 1130, method 1100 performs steps 520 and 530 to generate an HDR histogram of luminance values based upon the exposure-time-specific luminance values obtained in step in step 1120. Next, method 1100 performs step 540 to derive a goodness metric from the histogram. This goodness metric pertains to luminance and is not color-specific. Method 1100 proceeds to perform step 550 and 570, as discussed above in reference to FIG. 5.

Method 1100 may further include step 502 of capturing the raw image data retrieved in step 510. In one example of step 502, as implemented in method 1000, color SME HDR image sensor 810 captures raw image data 280 that includes long-exposure pixel values 282 from long-exposure pixels 832 and short-exposure pixel values 284 from short-exposure pixels 834, and optionally also middle-exposure pixel values from middle-exposure pixels 936.

In an embodiment, method 1100 includes step 560 and step 550 includes 552. In one implementation of this embodiment, step 560 is based upon raw image data retrieved in step 1110. For example, face detector 460 may process raw image data 280 received from data input handler 410 to detect one or more faces. In another implementation of this embodiment, step 560 is based upon luminance data generated in step 1120. For example, face detector 460 may process luminance data generated by data combiner 416 to detect one or more faces.

Method 1100 may perform several iterations of steps 1110, 1120, 1130, 540, 550 (optionally preceded by step 560 and including step 552), and 570, and optionally step 502, to iteratively optimize the exposure times for the color SME HDR image sensor. As discussed above in reference to FIG. 5, each iteration (except for the first one) is based upon raw image data generated with exposure times as adjusted in the preceding iteration, and different iterations of one iterative optimization process may emphasize different goodness metrics and/or face exposure. Without departing from the scope hereof, method 1100 may, instead of performing an iterative optimization, perform several repetitions of steps 1110, 1120, 1130, and 540 (and optionally one or both of steps 560 and 502), to map out the goodness metric (and, optionally, face exposure) as a function of the long and/or short exposure times, wherein steps 1110, 1120, 1130, and 540 are performed for each color in each repetition. In this alternative implementation, step 550 selects the exposure time set that optimizes the goodness metric or collectively optimizes the goodness metric and face exposure, and step 570 outputs the selected exposure time set to the color SME HDR image sensor.

Figure 12:
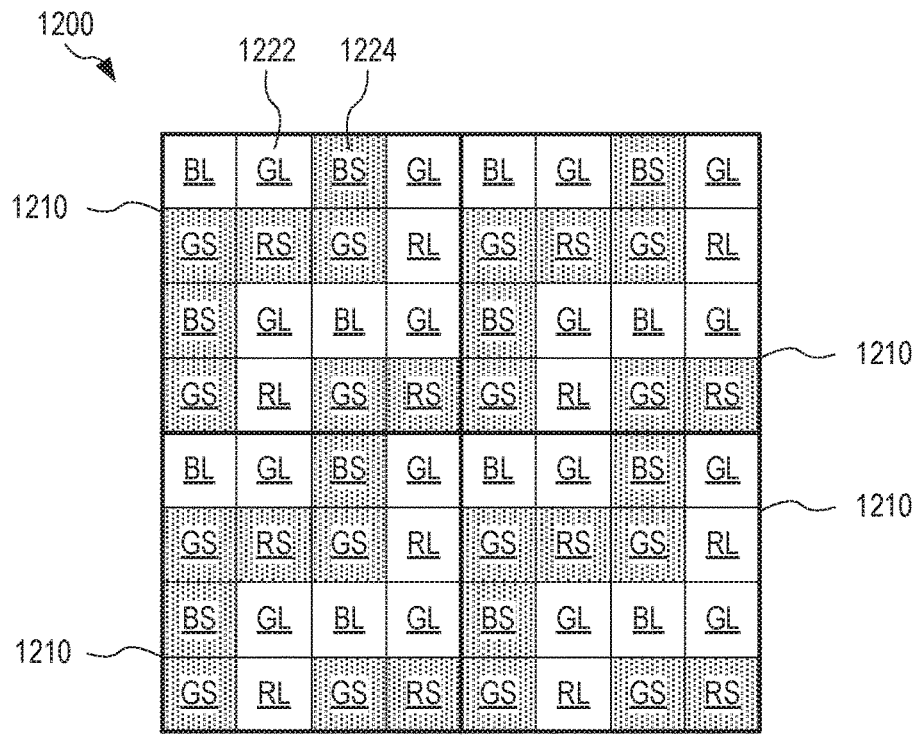
FIG. 12 illustrates a zig-zag HDR image sensor, according to an embodiment.

FIG. 12 illustrates one zig-zag HDR image sensor 1200. Image sensor 1200 is an embodiment of color SME HDR image sensor 810. Pixels of image sensor 1200 are arranged in square pixel groups 1210. It is understood that image sensor 1200 may include more pixel groups 1210 than depicted in FIG. 12, for example hundreds or thousands of pixel groups 1210. Each pixel group 1210 includes long-exposure-time pixels 1222 (shown with white background in FIG. 12) and short-exposure-time pixels 1224 (shown with shaded background in FIG. 12). In each pixel group 1210, long-exposure-time pixels 1222 includes four pixels "GL" sensitive to green light, two pixels "RL" sensitive to red light, and two pixels "BL" sensitive to blue light, and short-exposure-time pixels 1224 includes four pixels "GS" sensitive to green light, two pixels "RS" sensitive to red light, and two pixels "BS" sensitive to blue light. Pixel groups 1210 arrange long-exposure-time pixels 1222 and short-exposure-time pixels 1224 along alternating zig-zag paths (see the white and shaded zig-zag paths in FIG. 12). Each of pixel group 1210 is an embodiment of pixel group 830.

Exposure time controller 400 and computer 700 may use method 1000 or 1100 to auto expose zig-zag HDR image sensor 1200.

Figure 13:
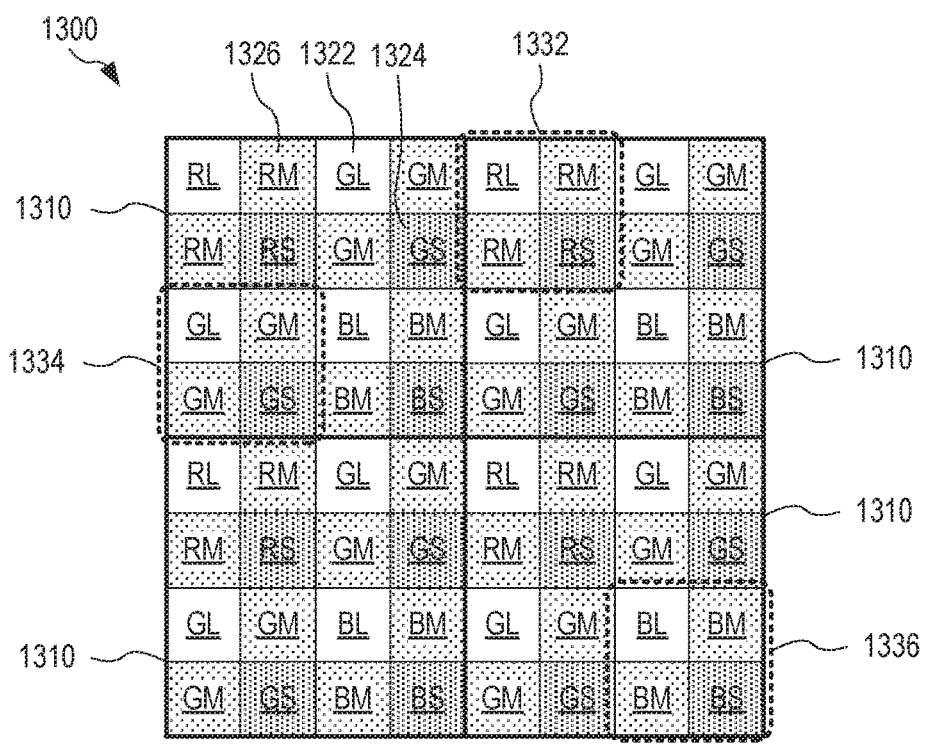
FIG. 13 illustrates a quad SME HDR color image sensor, according to an embodiment.

FIG. 13 illustrates a quad SME HDR color image sensor 1300. Image sensor 1300 is an embodiment of color SME HDR image sensor 810 implementing pixel groups 930. Pixels of image sensor 1300 are arranged in square pixel groups 1310. It is understood that image sensor 1300 may include more pixel groups 1310 than depicted in FIG. 13, for example an array of hundreds or thousands of pixel groups 1310. Each pixel group 1310 includes one 2×2 pixel cluster 1332 of red pixels sensitive to red light, two 2×2 pixel clusters 1334 of green pixels sensitive to green light, and one 2×2 pixel cluster 1336 of blue pixels sensitive to blue light. Each of pixel clusters 1332, 1334, and 1336 includes one long-exposure-time pixel 1322, two middle-exposure-time pixels 1326, and one short-exposure-time pixel 1324. Thus, as indicated in FIG. 13, each pixel cluster 1332 includes one long-exposure-time pixel "RL", two middle-exposure-time pixels "RM", and one short-exposure-time pixel "RS", each pixel cluster 1334 includes one long-exposure-time pixel "GL", two middle-exposure-time pixels "GM", and one short-exposure-time pixel "GS", and each pixel cluster 1336 includes one long-exposure-time pixel "BL", two middle-exposure-time pixels "BM", and one short-exposure-time pixel "BS".

Exposure time controller 400 and computer 700 may use method 1000 or 1100 to auto expose quad SME HDR color image sensor 1300.

Figure 14:
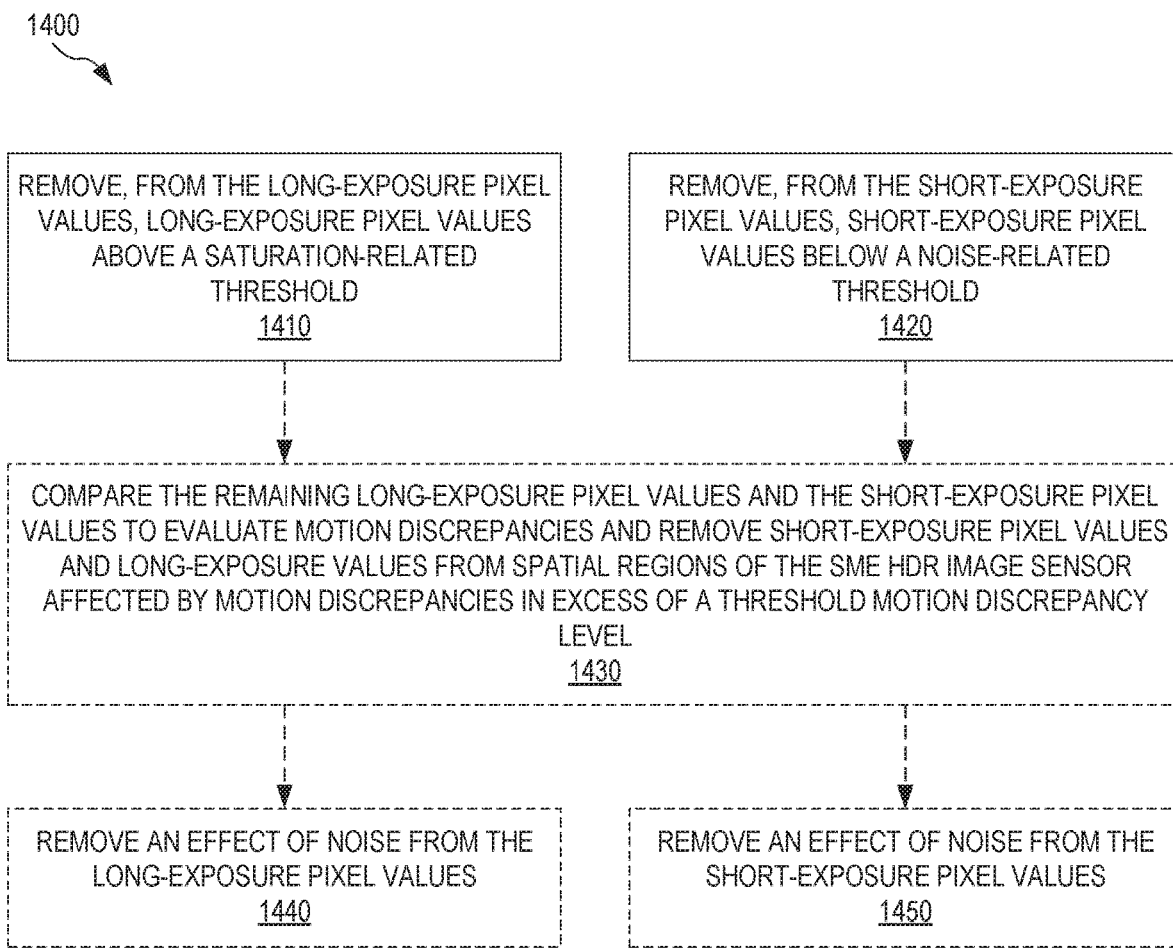
FIG. 14 illustrates a preprocessing method, according to an embodiment.

FIG. 14 illustrates one preprocessing method 1400. Method 1400 is an embodiment of step 520 of method 500. Method 1400 may be implemented in step 520 of method 1000 and in step 1130 of method 1100. Method 1400 may be performed by preprocessor 420. Method 1400 includes filtering steps 1410 and 1420. Step 1410 removes, from the long-exposure pixel values, long-exposure pixel values above a saturation-related threshold. Step 1420 removes, from the short-exposure pixel values, short-exposure pixel values that are below a noise-related threshold. Step 1410 may construct a histogram of the long-exposure pixel values and apply, to this histogram, a mask that removes long-exposure pixel values above the saturation-related threshold. Similarly, step 1420 may construct a histogram of the short-exposure pixel values and apply, to this histogram, a mask that removes short-exposure pixel values below the noise-related threshold.

Figure 15:
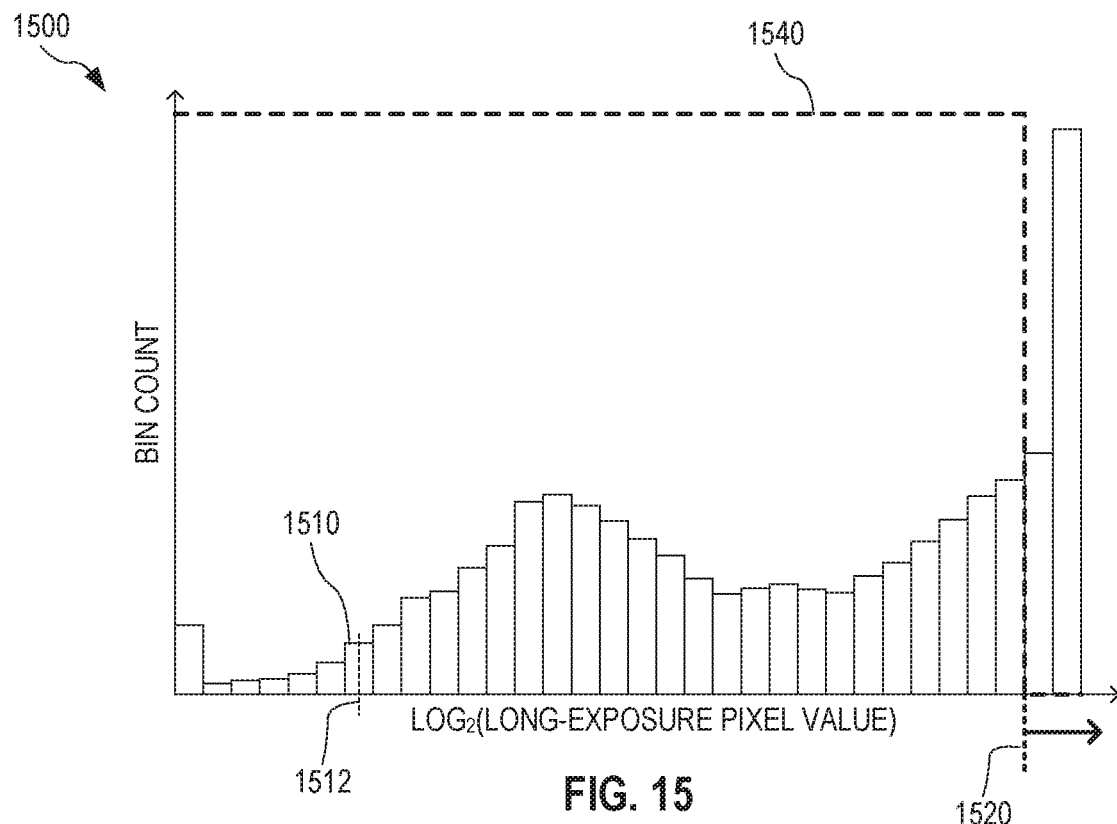
FIG. 15 shows an example histogram of long-exposure pixel values.

FIG. 15 shows an example histogram 1500 of long-exposure pixel values 282 binned in bins 1510. Each bin 1510 is characterized by a center value 1512. Step 1410 may construct histogram 1500 from long-exposure pixel values 282. Step 1410 may filter out long-exposure pixel values 282 that exceed a saturation threshold 1520. For this purpose, step 1410 may apply a mask 1540 to histogram 1500.

Figure 16:
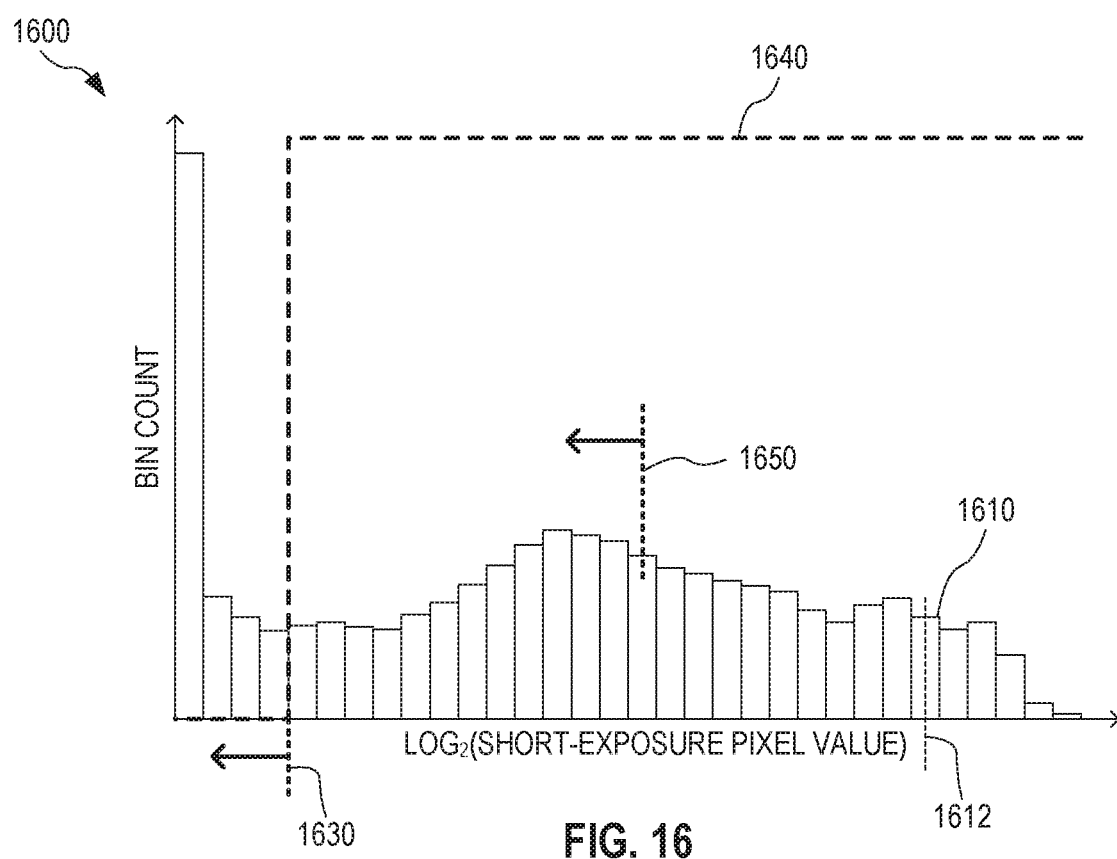
FIG. 16 shows an example histogram of short-exposure pixel values.

FIG. 16 shows an example histogram 1600 of short-exposure pixel values 284 binned in bins 1610. Each bin 1610 is characterized by a center value 1612. Step 1420 may construct histogram 1600 from short-exposure pixel values 284. Step 1420 may filter out short-exposure pixel values 284 that are below a noise threshold 1630. For this purpose, step 1420 may apply a mask 1640 to histogram 1600.

Referring again to FIG. 14, it is understood that method 1400 may further include a step of removing, from each of one or more sets of middle-exposure pixel values, middle-exposure pixel values that are above a saturation-related threshold and middle-exposure pixel values that are below a noise-related threshold.

In certain embodiments, method 1400 further includes an additional filtering step 1430 that removes from consideration pixel values from spatial regions of the SME HDR image sensor affected by motion discrepancies. These motion discrepancies arise when the imaged scene changes so rapidly that the difference between the long exposure time and the short exposure time causes an excess discrepancy between the information provided by a long-exposure pixel and the information provided by an adjacent or nearby short-exposure pixel. Step 1430 compares the long-exposure pixel values and the short-exposure pixel values, remaining after filtering in steps 1410 and 1420, to evaluate motion discrepancies between the long-exposure pixel values and the short-exposure pixel values. Step 1430 then removes short-exposure pixel values and long-exposure values from spatial regions of the SME HDR image sensor affected by motion discrepancies in excess of a threshold motion discrepancy level.

In one example, step 1430 filters out all pixel values from pixel groups 226 where the corresponding long-exposure pixel value 282 and short-exposure pixel value 284 significantly deviate from each other after having been scaled to a common scale according to the long exposure time and the short exposure time. In this comparison, step 1430 may account for the positional difference between long-exposure pixel 222 and short-exposure pixel 224 in pixel array 220. In another example, step 1430 filters out all pixel values from pixel groups 830 where one or more pairs of same-color long-exposure pixel value 832 and short-exposure pixel value 834 significantly deviate from each other after having been scaled to a common scale according to the long exposure time and the short exposure time. In this example, step 1430 may consider several colors or only one color, e.g., pixel values originating from a green long-exposure pixel 844L and a green short-exposure pixel 844S.

Step 1430 is readily extendable to further include one or more sets of middle-exposure pixel values in the comparison. For example, step 1430 may consider pixel values from pixel groups 930. Step 1430 may discard pixel values of spatial regions where at least one pair of a long-exposure pixel value and a corresponding short-exposure pixel value, scaled to a common exposure time scale, deviate from each other by more than a threshold value. The "corresponding short-exposure pixel value" is the pixel value of a short-exposure pixel that is nearest or within a predefined distance from the long-exposure pixel from which the long-exposure pixel value originates, with the additional requirement for color SME HDR image sensors that the corresponding short-exposure pixel is of the same color as the long-exposure pixel. For a monochrome SME HDR image sensor, the corresponding long-exposure pixel and short-exposure pixel are typically located next to each other. For a color SME HDR image sensor, the corresponding long-exposure pixel and short-exposure pixel are typically spaced apart from each other with one or more pixels of different color therebetween.

In one example, step 1430 discards pixel values from spatial regions where one or more pairs of corresponding long-exposure and short-exposure pixels fail to meet the requirement $$|d_{long} - r \cdot d_{short}| \leq \varepsilon$$

wherein $d_{long}$ is the long-exposure pixel value, $d_{short}$ is the short-exposure pixel value, r is the ratio of the long exposure time to the short exposure time, and E is a threshold. In another example, step 1430 utilizes a refined relationship that further accounts for the long-exposure and short-exposure pixels not being co-located. In this refined example, step 1430 may discard pixel values from spatial regions where one or more pairs of corresponding long-exposure and short-exposure pixels fail to meet the requirement $$|d_{long} + \nabla d_{long} \cdot (x_{short} - x_{long}) - r \cdot d_{short}| \leq \varepsilon,$$

wherein $x_{long}$ and $x_{short}$ refer to the positions of the long-exposure pixel and short-exposure pixel, respectively, and $\nabla d_{long}$ is a gradient for the long-exposure pixel value. $\nabla d_{long}$ may be determined by interpolation.

In embodiments of method 1400 that further consider one or more sets of middle-exposure pixels, step 1430 may further compare middle-exposure pixel values to corresponding long-exposure pixel values and/or corresponding short-exposure pixel values, to evaluate motion discrepancies therebetween. Alternatively, step 1430 may base its filtering exclusively on comparison between long-exposure pixel values and short-exposure pixel values, even for embodiments of method 1400 that consider middle-exposure pixels, since the relationship between long-exposure pixel values and short-exposure pixel values is the relationship most sensitive to motion.

Method 1400 may further include noise-removal steps 1440 and 1450. Step 1440 removes an effect of noise from the long-exposure pixel values, and step 1450 removes an effect of noise from the short-exposure pixel values. Although not shown in FIG. 14, method 1400 may further include a step of removing an effect of noise from each of one or more sets of middle-exposure pixel values. In computer 700, processor 710 may execute noise removal instructions 752 to remove the effect of noise from short-exposure pixel values and long-exposure pixel values (and, optionally, middle-exposure pixel values).

Figure 17:
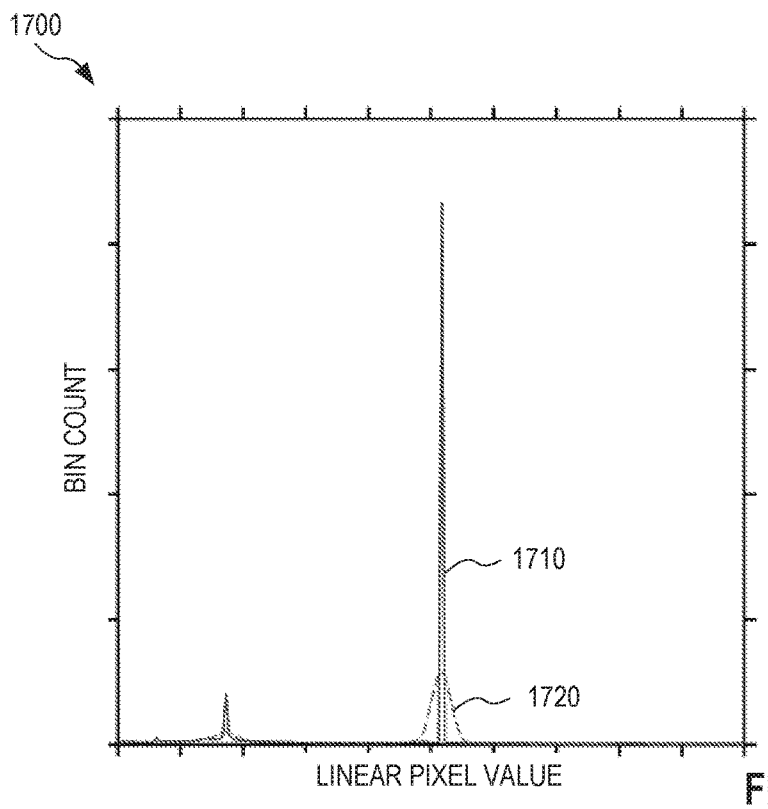
FIG. 17 is an example plot that illustrates an example effect of noise on a histogram of pixel values.

FIG. 17 is a plot 1700 that illustrates an effect of noise on a histogram 1710 of pixel values. The pixel values of histogram 1710 may be associated with a long exposure time, a short exposure time, or a middle exposure time. Without departing from the scope hereof, the pixel values of histogram 1710 may be luminance values formed by combining color-specific pixel values. In the following description, FIG. 17 is best viewed together with FIG. 14.

Histogram 1710 is noise free and has two sharp peaks, corresponding to a hypothetical scene with only two brightnesses. In practice, noise will be present, and this noise causes a broadening of the two sharp peaks. Histogram 1720 is an example of the pixel value distribution of histogram 1710 affected by the presence of noise. For Gaussian noise, histogram 1710 is a convolution of histogram 1720 with a Gaussian distribution characterized by a standard deviation σ. The standard deviation σ may be a function of pixel value.

Assuming that the standard deviation σ of the Gaussian distribution is independent of pixel value (for a given exposure time), histogram 1710 may be reconstructed from histogram 1720 according to the equation $$p_s(v) = Cp_{s+n}(v) + (1-C)(G_\sigma \ast p_{s+n})(v),$$

wherein v is the bin location, $p_s$ is histogram 1710, $G_\sigma$ is the Gaussian noise distribution, C is a tuning parameter that may be sensor dependent, $p_{s+n}$ is histogram 1720, and $G_\sigma \ast p_{s+n}$ is the Gaussian convolution of $p_{s+n}$.

In another example, the standard deviation a of the Gaussian distribution depends on pixel value, such that the variance of the Gaussian is a linear function of pixel value (for a given exposure time) as indicated by the linear noise model $\sigma^2 = mv + b$, wherein $m \neq 0$. Coefficients m and b may be measured or known for any particular SME HDR image sensor model. In this example, the Gaussian filter $G_\sigma$ may be adjusted according to bin location v, or histogram 1720 may be mapped to simulate a constant noise level using conformal mapping. For example, histogram 1720 may be re-binned according to the conformal mapping function $$y = f(v) = \frac{2}{m}\left(\sqrt{mv+b} - \sqrt{b}\right).$$

Here, y is the bin locations on a scale where the Gaussian noise follows a constant model characterized by σ=1. After re-binning and deconvolution according to a constant Gaussian noise model on the y-scale, the conformal mapping may be reversed to the original v-scale by applying the inverse conformal mapping function $$v = f^{-1}(y) = \frac{1}{m}\left[\left(\frac{m}{2}y + \sqrt{b}\right)^2 - b\right].$$

Each of steps 1440 and step 1450 may remove a noise effect as discussed above for FIG. 17 and histogram 1720. Without departing from the scope hereof, method 1400 may include a similar step for each set of middle-exposure pixel values, when applicable.

Method 1400 may be encoded in machine-readable instructions 730 as preprocessing instructions 740, optionally with steps 1440 and 1450 (and similar middle-exposure noise removal steps) encoded as noise removal instructions 752.

Figure 18:
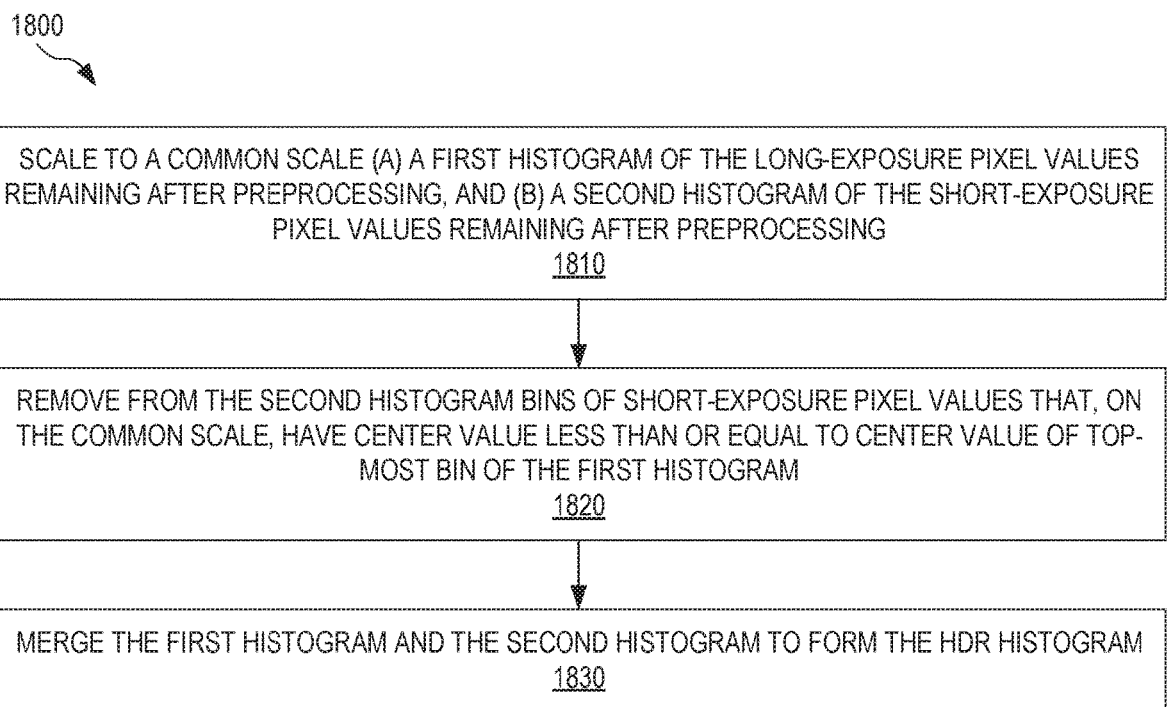
FIG. 18 illustrates a method for synthesizing an HDR histogram, according to an embodiment.

FIG. 18 illustrates one method 1800 for synthesizing an HDR histogram. Method 1800 is an embodiment of step 530 of method 500 and may be performed by synthesizer 430. Method 1800 may be encoded in machine-readable instructions 730 as synthesizing instructions 742. Method 1800 may be implemented in step 520 of method 1000 and in step 1130 of method 1100. Method 1800 includes steps 1810, 1820, and 1830.

Step 1810 scales, to a common scale, (a) a first histogram of the long-exposure pixel values remaining after preprocessing in step 520 of method 500, and (b) a second histogram of the short-exposure pixel values remaining after preprocessing in step 520 of method 500. Step 1810 performs this scaling according to the ratio between the long exposure time and the short exposure time. For example, step 1810 may multiply the short-exposure time values by the ratio of the long exposure time to the short exposure time, so as to place the short-exposure time values on the same scale as the long-exposure time values. In one example of step 1810, synthesizer 430 scales histograms 1500 and 1600 to a common scale.

Step 1820 removes from the second histogram bins of short-exposure pixel values that, on the common scale, have center value less than or equal to a center value of the top-most bin of the first histogram. Step 1820 serves to ensure that no group of spatially associated pixels of the same color (e.g., same-color pixel values from one pixel group 226, 830, or 930) is represented in both the first histogram and the second histogram. In one example of step 1820, synthesizer 430 processes histogram 1600 (as scaled, if scaled in step 1810), to remove therefrom all bins having center value 1612 (as scaled, if scaled in step 1810) less than the center value 1512 of the lowest bin 1510 in histogram 1500 (as scaled, if scaled in step 1810). For example, step 1820 may remove all bins from histogram 1600 (as scaled, if scaled in step 1810) that are below a pixel value 1650.

Step 1830 merges the first histogram with the second histogram to form the HDR histogram.

Figure 19:
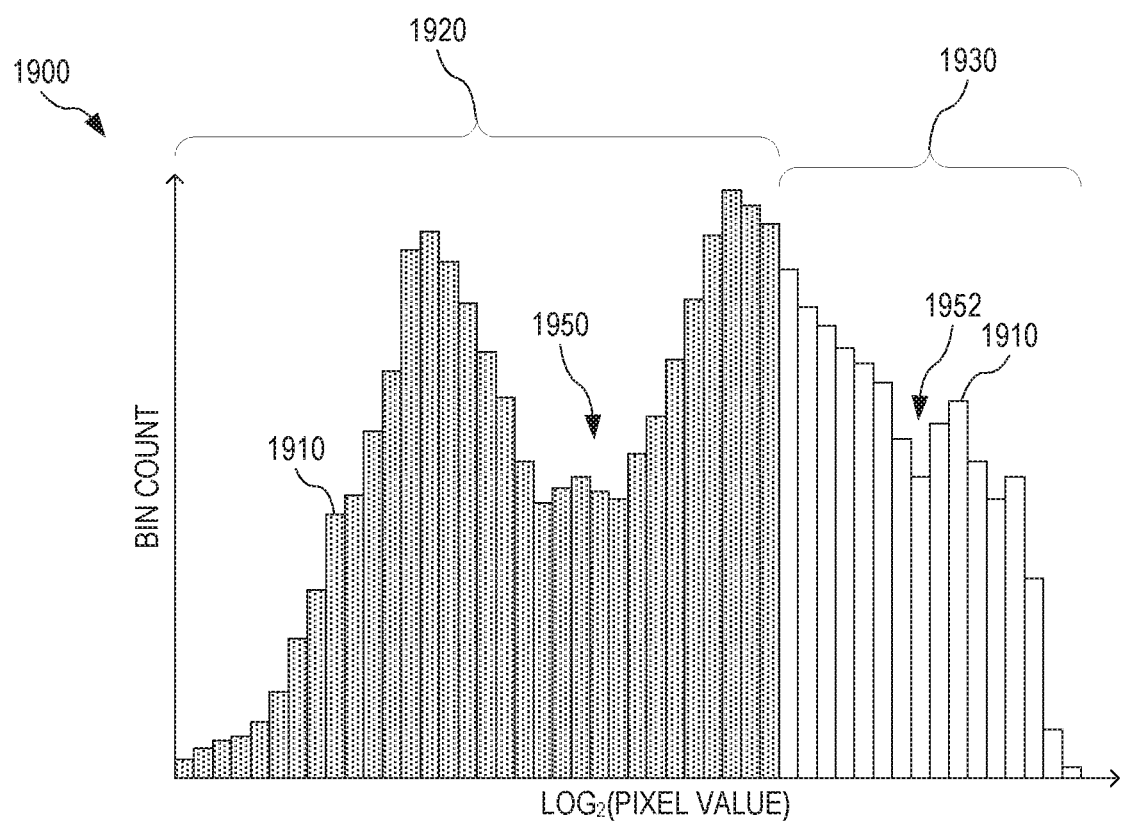
FIG. 19 shows one example HDR histogram synthesized using the method of FIG. 18.

FIG. 19 shows one example HDR histogram 1900 synthesized in step 1830 from histograms 1500 and 1600, after processing of histograms 1500 and 1600 in steps 1810 and 1820. Histogram 1900 is binned into bins 1910. A lower range 1920 of bins 1910 stems from long-exposure pixel values of histogram 1500, whereas an upper range 1930 of bins 1910 stems from short-exposure pixel values of histogram 1600.

Referring again to FIG. 18, in order to synthesize the first and second histograms, e.g., histograms 1500 and 1600, method 1800 may re-bin pixel values of one or both of the first and second histograms to achieve mutually consistent binning between these two histograms. Method 1800 may perform this re-binning between step 1820 and 1830.

Without departing from the scope hereof, method 1800 may also process middle-exposure pixel values associated with one or more middle exposure times, for example when processing pixel values from pixels groups 930. In such embodiments, method 1800 processes at least three histograms associated with at least three respective exposure times, and step 1820 removes from each histogram bins that, on the common scale, have center value less than or equal to the center value of the top-most bin of the histogram associated with the closest longer exposure time.

FIG. 20 illustrates one auto exposure method 2000, for a dual-exposure-time SME HDR image sensor, which first optimizes a long exposure time and next optimizes a short exposure time based upon entropy variance. Method 2000 may be performed by exposure time controller 400, for example to auto expose SME HDR image sensor 110 in HDR camera 102. Method 2000 is one implementation of method 500. Method 2000 may be applied to auto expose color SME HDR image sensor 810.

Method 2000 includes steps 2010 and 2020. Step 2010 determines a long exposure time. Step 2020 performs a plurality of repetitions of steps 510, 520, 530, 540, and 550 of method 500 to determine an optimal short exposure time, wherein the goodness metric used in step 540 is or includes entropy variance across the HDR histogram, e.g., Var($S_i$) discussed above in reference to FIG. 5. Step 2020 may further include step 560 in one or more of the repetitions.

In one embodiment, method 2000 implements method 1000. In this embodiment, step 2020 performs steps 510, 520, 530, 540, and 550 (and, optionally, step 560) as discussed above in reference to FIG. 10. In another embodiment, method 2000 implements method 1100. In this embodiment, step 2020 performs steps 1110, 1120, 1130, 540, and 550 (and, optionally, step 560) as discussed above in reference to FIG. 11. When method 2000 is applied to a color SME HDR image sensor, step 2010 may determine the optimal long exposure time based upon a consideration of luminance values, based upon a consideration of pixel values associated with one particular color, or based upon a collective consideration of pixel values associated with two or more different colors.

Method 2000 allows for optimizing the long exposure time, in step 2010, based upon other parameters than that or those used to optimize the short exposure time. Step 2010 may determine the optimal long exposure time as the long exposure time that minimizes the number of pixels underexposed, optimizes exposure of faces, and/or minimizes the transition-point noise discrepancy between the long-exposure pixel values and the short-exposure pixel arising in demosaicing of image data captured by the SME HDR image sensor to generate an HDR image. Such demosaicing is, for example, performed by HDR image generator 250 to generate HDR image 270.

For each image pixel of an HDR image generated from an SME HDR image sensor, demosaicing includes selecting which exposure time to utilize. For example, demosaicing of raw image data 280 from pixel group 226 of FIG. 2 may include electing either long-exposure pixel value 282 from long-exposure pixel 222 or short-exposure pixel value 284 from short-exposure pixel 224. Alternatively, demosaicing of raw image data 280 from pixel group 226 of FIG. 2 may include weighting contribution of long-exposure pixel value 282 from long-exposure pixel 222 and short-exposure pixel value 284 from short-exposure pixel 224. In either case, where the scene transitions from dark to bright, the demosaicing process may switch from exclusive or predominant use of long-exposure pixel values to exclusive or predominant use of short-exposure pixel values. Even though the pixel values are scaled to compensate for the switch from long-exposure pixel values to short-exposure pixel values, certain noise contributions, such as readout noise, do not scale with exposure time. To explain further, the noise discrepancy at the transition point may be caused by the fact that for two (or more) exposures, in order to match the pixel values in radiance for the exposures, the pixels may be scaled by a scale factor. For example, if the long and short exposures use 50 millisecond and 5 millisecond exposure times, respectively, then the short pixel values will have a reduced digital value in the raw form in the same spatial region. In order to match the radiance (U), the radiance for the long-exposure pixel values may be set to U_long=V_long, and the radiance for the short-exposure pixel values may be set to U_short=(50/5)*V_short, where V_long and V_short are the raw pixel values for the long and short exposure, respectively. This means that any noise present in the short exposure will also be multiplied by the multiplication factor (50/5, in this example) when radiance matching takes place. When the auto-exposure method switches, for example, between long and short exposures times (for example when the long exposure pixels become saturated), a visible change in the image noise structure will occur in those regions. Optimization of the exposure time according to some embodiments of the invention contributes to minimize this artifact. Noise discrepancy artifacts are different from blur artifacts. In blur artifacts the aim is to reduce the exposure time to reduce motion streaks and blurring in the image.

Thus, image artifacts may appear in the HDR image as noticeable borders between image regions based upon long-exposure pixel values and image regions based upon short-exposure pixel values. Such artifacts may be particularly visible where a large region smoothly transitions from darker to brighter. Similar image artifacts may arise in HDR images generated from color SME HDR image sensor 810.

In one embodiment, step 2010 includes a step 2012 of changing the long exposure time to minimize the transition-point noise discrepancy between the long-exposure pixel values and the short-exposure pixel values at the transition point between use of the long-exposure pixel values and use of the short-exposure pixel values in demosaicing of image data captured by the SME HDR image sensor. Step 2012 may set the long exposure time to minimize or reduce the number of pixels having pixel values at the transition point. When method 2000 is applied to color SME HDR image sensors, step 2012 may minimize the transition-point noise discrepancy for one selected color, for each of several colors, or for luminance values.

FIG. 21 is a plot 2100 of example entropy variances computed in step 2020 of method 2000. Plot 2100 shows Var($S_i$) as a function of exposure time ratio, i.e., the ratio of the long exposure time to the short exposure time, for a long exposure time of 2 milliseconds. Plot 2100 shows a minimum at an exposure ratio of 8. Thus, if based upon plot 2100, step 2020 of method 2000 would set the short exposure time to 0.25 milliseconds.

Method 2000 may be extended to auto exposure of SMR HDR image sensors operating with more than two different exposure times, for example color SME HDR image sensor 810 implementing pixel groups 930. In one such implementation, method 2000 optimizes the long exposure time in step 2010 and then optimizes the remaining exposure times in step 2020. When included to auto exposure SMR HDR image sensors operating with more than two different exposure times, step 2012 minimizes a transition-point noise discrepancy between two closest exposure times, for example between the long exposure time and a closest middle exposure time.

Figure 22:
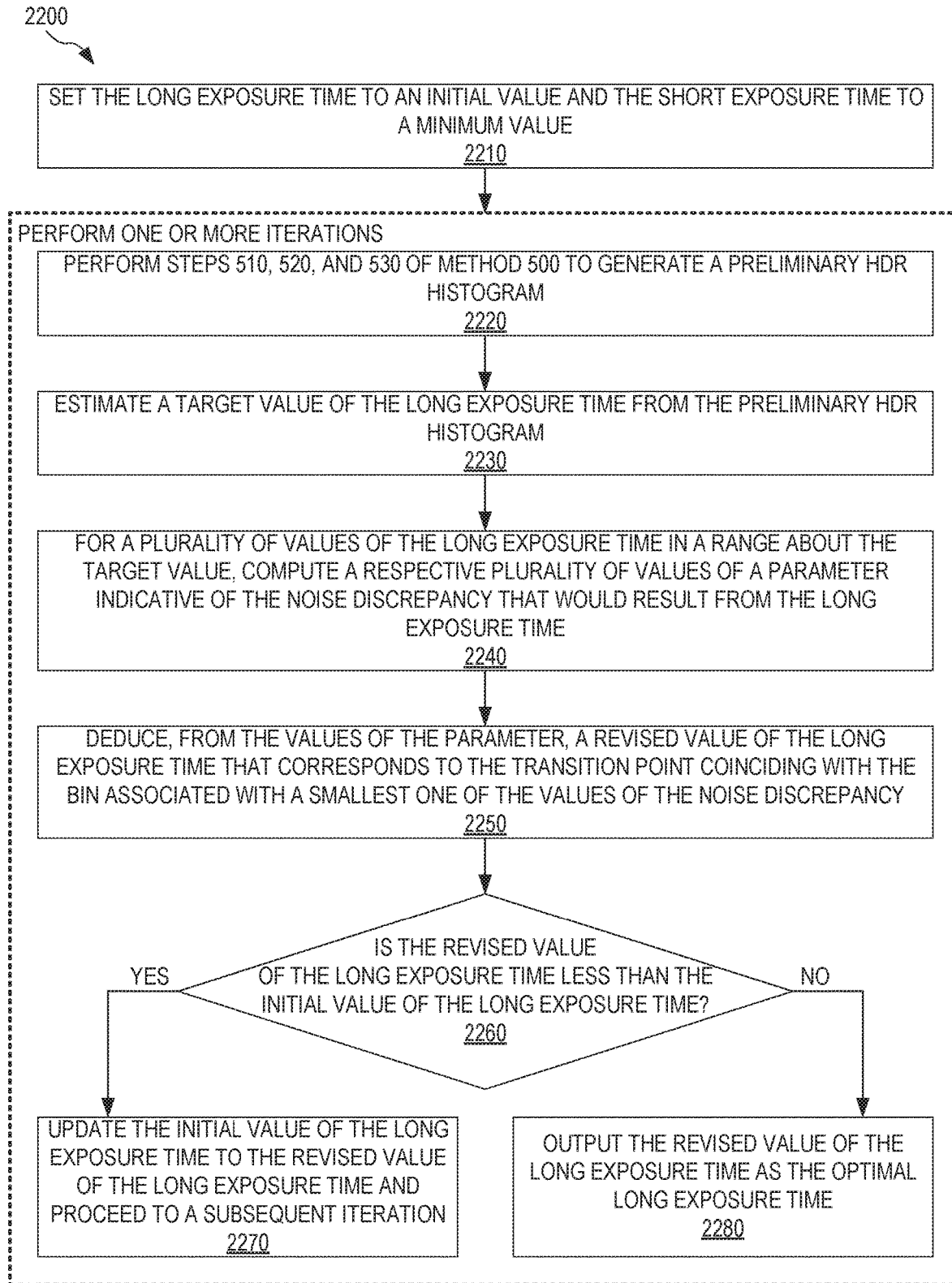
FIG. 22 illustrates a method for optimizing a long exposure time for an SME HDR image sensor, according to an embodiment.

FIG. 22 illustrates one method 2200 for optimizing a long exposure time for an SME HDR image sensor. When applied to a dual-exposure-time SME HDR image sensor, method 2200 determines a long exposure time that minimizes transition-point noise discrepancies between long-exposure pixel values and short-exposure pixel values. Although method 2200 is discussed in the following as pertaining to dual-exposure-time SME HDR image sensors, method 2200 may, as discussed above for step 2010 of method 2000, be applied to SME HDR image sensors having more than two different exposure times, without departing from the scope hereof. Method 2200 is an embodiment of step 2012 of method 2000. Step 2010 of method 2000 may apply method 2200 to optimize the long exposure time, optionally in conjunction with consideration of other metrics such as face exposure and the number of pixels underexposed.

In a step 2210, method 2200 sets the long exposure time of the SME HDR image sensor to an initial value and the short exposure time of the SME HDR image sensor to a minimum value. Next method 2200 proceeds to perform one or more iterations of a series of steps to optimize the long exposure time while keeping the short exposure time at the minimum value defined in step 2210. Each iteration includes steps 2220, 2230, 2240, 2250, a decision 2260, and, depending on the outcome of decision 2260, step 2270 or 2280.

Step 2220 performs a plurality of repetitions of steps 510, 520, and 530 of method 500 to generate a preliminary HDR histogram. For color SME HDR image sensors, step 2220 may instead perform steps 1110, 1120, and 1130 to generate a preliminary HDR histogram of luminance values, or step 2220 may perform steps 510, 520, 530 for one selected color or for several different colors.

Step 2230 estimates a target value of the long exposure time from the preliminary HDR histogram generated in step 2220. For example, for HDR histogram 1900, it may be advantageous to adjust the long exposure time such that valley 1950 is shifted up to the transition point between lower range 1920 and upper range 1930, or such that valley 1952 is shifted down to the transition point between lower range 1920 and upper range 1930. Thus, in this example, 2230 may set the target long exposure time to shift either valley 1950 or valley 1952 to the transition point between lower range 1920 and upper range 1930. Alternatively, step 2230 may set a target long exposure time that shifts the mean, median, or mode of the preliminary HDR histogram away from the transition point.

For color SME HDR image sensors, step 2230 may estimate the target value based upon a preliminary HDR histogram of luminance values, step 2230 may estimate the target value based upon a preliminary HDR histogram of pixel values for one selected color, or step 2230 may estimate the target value based upon a collective consideration of several preliminary HDR histograms associated with several different colors, respectively.

Figure 23:
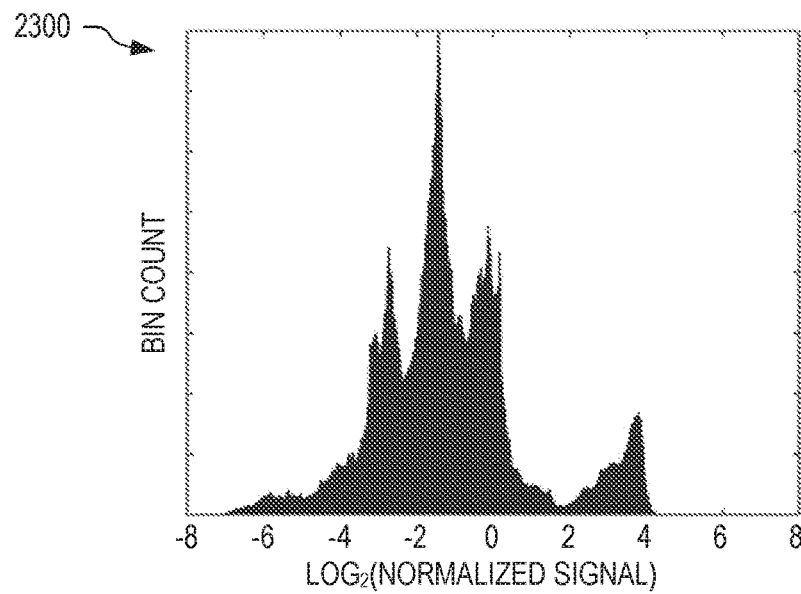
FIGS. 23, 24, and 25 illustrate one example of HDR histogram generation and estimation of a target long exposure time in the method of FIG. 22.
Figure 24:
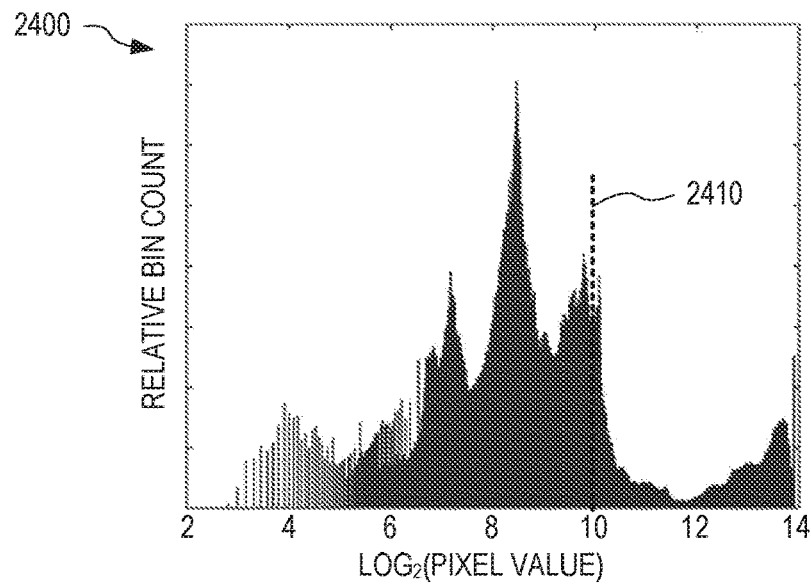
Figure 25:
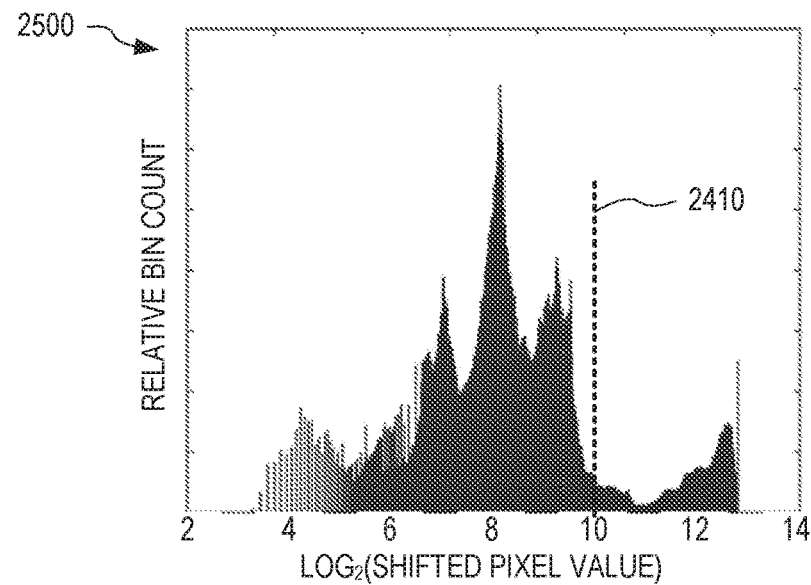

FIGS. 23, 24, and 25 illustrate one example of HDR histogram generation in step 2220 and estimation of a target long exposure time in step 2230. FIGS. 23, 24, and 25 are best viewed together with FIG. 22 in the following description. FIG. 23 is an example luminance histogram 2300 for a scene, such as scene 190. FIG. 24 is an example HDR histogram 2400 generated in step 2230 based upon raw image data 280 from the scene characterized by luminance histogram 2300, wherein raw image data 280 is captured with the initial long exposure time and minimum short exposure time defined in step 2210. In this example, a transition point 2410 between long-exposure pixel values and short-exposure pixel values is at approximately $2^{10}$. To move the bulk of the histogram away from transition point 2410, step 2330 may target a reduced long exposure time. FIG. 25 shows a simulated HDR histogram 2500 that is a formed by simulating the effect of a reduced long exposure time on the data of HDR histogram 2400. In this example, the target long exposure time is the exposure time that positions the mean pixel value <v> of simulated HDR histogram 2500 at 18% of transition point 2410. Thus, in this example, the target long exposure time is $$t_{long\_target} = t_{long\_initial} * 0.18 * \frac{v_t}{\langle v \rangle}.$$

As evident in FIG. 25, the bulk of simulated HDR histogram 2500 is shifted away from transition point 2410. In a similar but more general example, the target long exposure time may be set to $$t_{long\_target} = t_{long\_initial} * A * \frac{v_t}{\langle v \rangle},$$

wherein A is less than one, for example between 0.1 and 0.5. In an alternative example, the target long exposure time is set to $$t_{long\_target} = t_{long\_initial} * A * \frac{v_t}{P(v)},$$

wherein P(v) is another statistical parameter of HDR histogram 2400 such as median, geometric mean, or mode.

For a range of long exposure times near the target long exposure time estimated in step 2230, step 2240 computes a parameter indicative of the transition-point noise discrepancy that would result from the long exposure time. The parameter may be an expected value of the transition-point noise discrepancy or an expected value of a parameter that is proportional to the transition-point noise discrepancy as a function of the long exposure time. For color SME HDR image sensors, the parameters computed in step 2240 may pertain to a transition-point noise discrepancy between luminance values, or step 2240 may compute the parameters for one or more colors separately. The following description of step 2240 applies to computation of parameters associated with luminance values, pixel values of a monochrome SME HDR image sensor, or pixel values associated with one color of a color SME HDR image sensor. However, the description is readily extended to computation of several sets of parameters, each set being associated with a different color. The range of long exposure times considered in step 2240 spans from a minimum long exposure time $t_{long\_min}$ to a maximum long exposure time $t_{long\_max}$. In one example, $t_{long\_min} = t_{long\_target} - \Delta t$ and $t_{long\_max} = t_{long\_target} + \Delta t$, wherein $\Delta t$ is a certain percentage of the target long exposure time $t_{long\_target}$. In one example, $\Delta t$ is between 5% and 50% of the target long exposure time $t_{long\_target}$. In another example, $\Delta t$ is between 15% and 25% of the target long exposure time $t_{long\_target}$. Scaling, in step 2240, of the initial long exposure time $t_{long\_initial}$ to a modified long exposure time $t_{long\_mod}$ is equivalent to scaling bin values v of the HDR histogram (generated in step 2220) to modified bin values $v' = v * t_{long\_mod}/t_{long\_initial}$. Step 2240 then evaluates the transition-point noise discrepancy at each of a plurality of modified bin values in the range from a minimum modified bin value $v'_{min} = v * t_{long\_min}/t_{long\_initial}$ to a maximum modified bin value $v'_{max} = V * t_{long\_max}/t_{long\_initial}$.

In an embodiment, step 2240 computes the transition-point noise discrepancies. In this embodiment, step 2240 may apply a noise model. In one implementation, step 2240 applies the linear noise model $\sigma^2 = mv + b$ discussed above in reference to FIGS. 14 and 17. In this implementation, the noise level difference between short- and long-exposure pixel values at the transition point may be written as $$\Delta(\sigma^2) = \sigma^2_{short} - \sigma^2_{long} = r^2\left(m\frac{v_t}{r} + b\right) - (mv_t + b),$$

wherein r is the ratio of the long exposure time to the short exposure time, and $v_t$ is the pixel value of the transition point in an HDR histogram formed by scaling up short-exposure pixel values to the scale of the long-exposure pixel values. $v_t$ is, for example, the saturation threshold of the long-exposure pixel values, e.g., saturation threshold 1520. The transition-point noise discrepancy $\varepsilon_{noise}$ impacting an HDR image may be computed as the noise level difference $\Delta(\sigma^2)$ weighted by the pixel count $p(v_t)$ at the transition point:

$$\varepsilon_{noise} = \Delta(\sigma^2) p(v_t).$$

However, since $\Delta(\sigma^2)$ is independent of the long exposure time and only $p(v_t)$ depends on the long exposure time, $p(v_t)$ is in itself sufficiently informative about the transition-point noise discrepancy to determine which long exposure time minimizes the transition-point noise discrepancy $\varepsilon_{noise}$. Thus, in another embodiment, step 2240 simply computes $p(v_t)$ for each of a plurality of long exposure times in the range between $t_{long\_min}$ and $t_{long\_max}$, without computing $\Delta(\sigma^2)$ and $\varepsilon_{noise}$.

Step 2250 deduces, from the parameters computed in step 2240, a revised value of the long exposure time that corresponds to the transition point coinciding with the bin associated with the smallest transition-point noise discrepancy value computed in step 2250. The parameters thus processed by step 2250 may be $p(v_t)$, $\varepsilon_{noise}$, or another parameter indicative of transition-point noise discrepancy. Step 2250 may revise the long exposure time in a manner that places the transition point in a location in the histogram having relatively few counts. In one embodiment, step 2250 chooses a long exposure time that minimizes $p(v_t)$ within the range evaluated in step 2240. In embodiments where step 2240 processes several different colors separately, step 2250 collectively considers the parameters associated with these different colors to revise the value of the long exposure time.

Step 2260 is a decision step that determines whether method 2200 proceeds to step 2270 or to step 2280. If the revised long exposure time deduced in step 2250 is less than the initial long exposure time set in step 2210, method 2200 proceeds to step 2270. Otherwise, method 2200 proceeds to step 2280. Step 2270 updates the initial long exposure time of step 2210 to the revised long exposure time deduced in step 2250 and method 2200 performs a subsequent iteration of steps 2220, 2230, 2240, 2250, 2260, and 2270 or 2280. Step 2280 outputs the revised long exposure time deduced in step 2250 as the optimal long exposure time and terminates method 2200.

Without departing from the scope hereof, method 2200 may omit steps 2240 and 2250 and instead proceed to decision step 2260 with the target long exposure time estimated in step 2230.

Referring now to embodiments of method 2000 that implement method 2200 in step 2012, step 2020 may also consider the transition-point noise discrepancy as part of the goodness metric. In one such embodiment, step 2020 minimizes a composite error metric $\varepsilon_{total} = \text{var}(S_i) + a^*\varepsilon_{noise}$, wherein a is a predefined parameters that defines the relative importance of entropy variance var $(S_i)$ and transition-point noise discrepancy $\varepsilon_{noise}$.

FIGS. 26-31 provide examples of data generated and processed in embodiments of method 2000 that implement method 2200 in step 2012 and that consider the transition-point noise discrepancy as the goodness metric in step 2020 or part of the goodness metric in step 2020. FIGS. 26-31 are best viewed together with FIGS. 20 and 22 in the following description.

Figure 26:
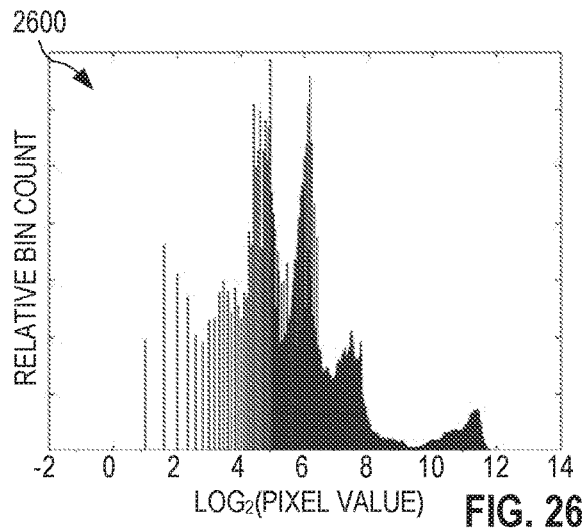
FIG. 26 is an example preliminary HDR histogram generated in the method of FIG. 22.
Figure 27:
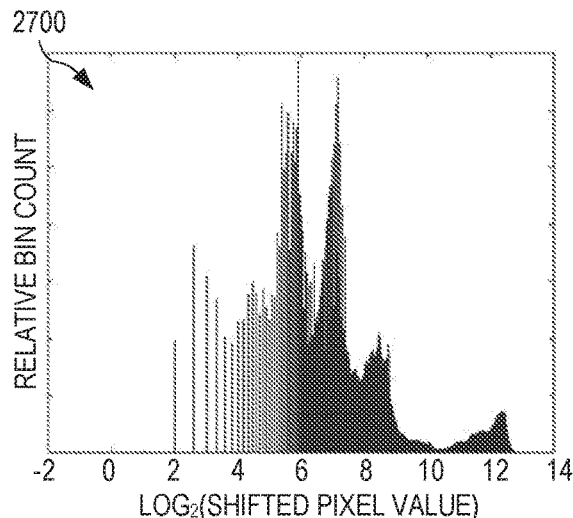
FIG. 27 is an example HDR histogram shifted according to an optimal long exposure time outputted in the method of FIG. 22.
Figure 28:
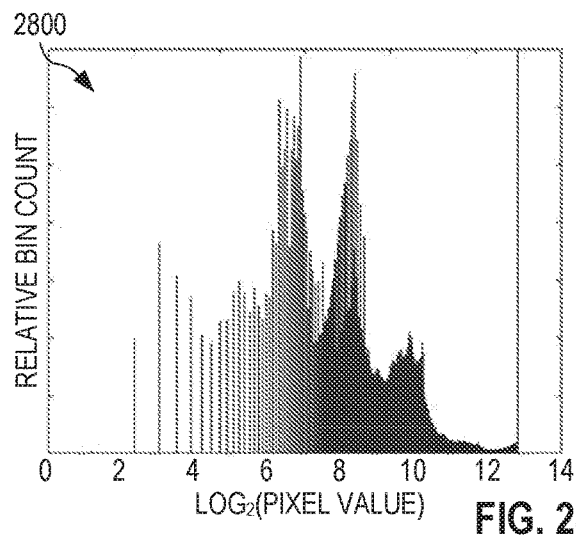
FIGS. 28-31 are example HDR histograms considered in the method of FIG. 22.
Figure 29:
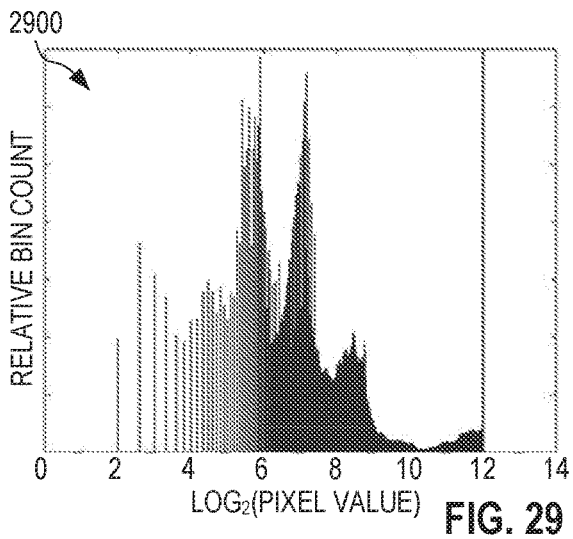
Figure 30:
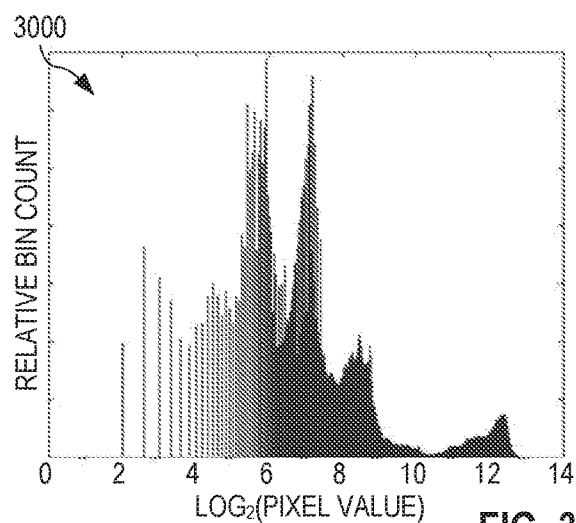
Figure 31:
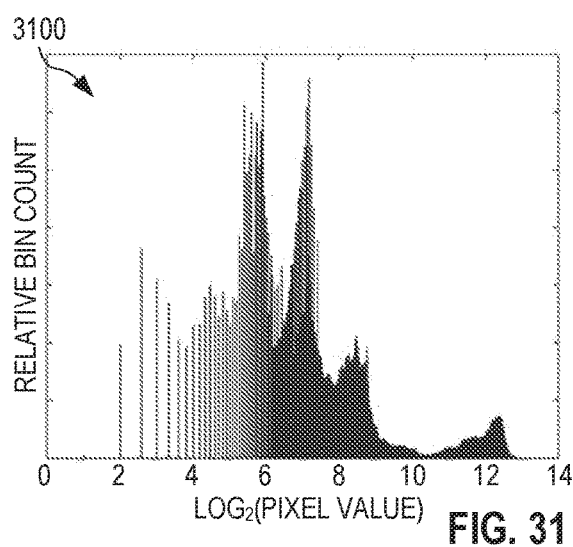

FIG. 26 is an example preliminary HDR histogram 2600 generated in step 2220 of method 2200, as part of step 2010 of method 2000. Histogram 2600 is based on a long exposure time of 1 millisecond and a long-to-short exposure time ratio r of 16. FIG. 27 is an example HDR histogram 2700 shifted according to the optimal long exposure time outputted in step 2280 of method 2200, as part of step 2010 of method 2000. The long-to-short exposure time ratio r is 16 for HDR histogram 2700. FIGS. 28-31 are example HDR histograms 2800, 2900, 3000, and 3100 considered in step 2020 of method 2000. Each of HDR histograms 2800, 2900, 3000, and 3100 is based upon the optimal long exposure time determined in step 2010, using method 2200, but the long-to-short exposure time ratio r is different for each of HDR histograms 2800, 2900, 3000, and 3100, namely 2, 4, 8, and 16, respectively. Step 2020 may include $\varepsilon_{noise}$ in its goodness metric, for example as part of composite error metric $\varepsilon_{total}$, and optionally in conjunction with other parameters such as those discussed above in reference to FIG. 5.

FIGS. 32 and 33 illustrate one HDR camera 3200 that includes a gradient filter to shrink the dynamic range of a scene 3290. FIG. 32 is a cross sectional view of HDR camera 3200, and FIG. 33 is a plan view of an image sensor of HDR camera 3200. FIGS. 32 and 33 are best viewed together in the following description.

HDR camera 3200 is an embodiment of HDR camera 102 and may be auto exposed by exposure time controller 100 according to method 500, 1000, or 1100. HDR camera 3200 includes SME HDR image sensor 110, a gradient filter 3240, an imaging objective 3230 placed between image sensor 110 and gradient filter 3240, and a controller 3250. Gradient filter 3240 is a neutral density filter with a transmission coefficient that exhibits a gradient in at least one dimension. In the embodiment depicted in FIGS. 32 and 33, the transmission coefficient of gradient filter 3240 is characterized by a linear gradient in one dimension. This embodiment of gradient filter 3240 may be suitable for image capture of scenes 3290 with a bright upper half and dim lower half, such as photos of the horizon. However, without departing from the scope hereof, gradient filter 3240 may exhibit a more complex transmission coefficient variation.

Light rays 3292 passing through a less transmissive portion of gradient filter 3240 on its way to pixel array 220 is attenuate more than light rays 3294 passing through a more transmissive portion of gradient filter 3240 on its way to pixel array 220. A photographer may select a gradient filter 3240 and orient the selected gradient filter 3240 to dim brighter portions of scene 3290. In the scenario depicted in FIGS. 32 and 33, gradient filter 3240 dims an upper portion of scene 3290 more so than a lower portion of scene 3290. The function of gradient filter 3240 is similar to applying a virtual mask 3310 on pixel array 220, with the transmission coefficient of virtual mask 3310 varying in a manner similar to that of gradient filter 3240.

Reduction of the dynamic range of scene 3290 by gradient filter 3240 lessens the dynamic range demands on SME HDR image sensor 110. For example, gradient filter 3240 may reduce the number of pixels that are under- or overexposed in an HDR image generated by SME HDR image sensor 110 and instead bring such pixels into the dynamic range of SME HDR image sensor 110 to capture the full information for the corresponding scene portions.

Controller 3250 controls at least aspects of image capture by SME HDR image sensor 110. Controller 3250 may process image data generated by SME HDR image sensor 110 in HDR camera 3200 to compensate for the presence of gradient filter 3240. Thus, gradient filter 3240 and controller 3250 cooperate to further extend the dynamic range of HDR camera 3200 as compared to embodiments of HDR camera 102 that do not include gradient filter 3240 and controller 3250. Controller 3250 may also auto expose SME HDR image sensor 110. In one embodiment, controller 3250 includes exposure time controller 100.

FIG. 34 illustrates one method 3400 for reconstructing at least part of the original dynamic range of scene 3290 when captured by HDR camera 3200 using gradient filter 3240. Method 3400 may be performed by controller 3250. Method 3400 includes a step 3420 of scaling an output image of SME HDR image sensor 110 to compensate for the presence of gradient filter 3240. The scaling applied in step 3420 at least partly reconstructs the original dynamic range of scene 3290 prior to being non-uniformly attenuated by gradient filter 3240. Step 3420 may scale an output image of SME HDR image sensor 110 by the inverse of virtual mask 3310 to reverse the attenuation imposed by gradient filter 3240. In one scenario, step 3420 reconstructs the entire dynamic range of scene 3290. In another scenario, the dynamic range of scene 3290, even as reduced by gradient filter 3240, exceeds the dynamic range of SME HDR image sensor 110. In this scenario, step 3240 only partly reconstructs the original dynamic range of scene 3290. Step 3240 may be based upon a specification of gradient filter 3240 encoded in controller 3250, or provided thereto by a user.

In an embodiment, method 3400 further includes a step 3410 of performing method 500 (or method 1000 or 1100) to auto expose SME HDR image sensor 110 in the presence of gradient filter 3240.

Figure 35:
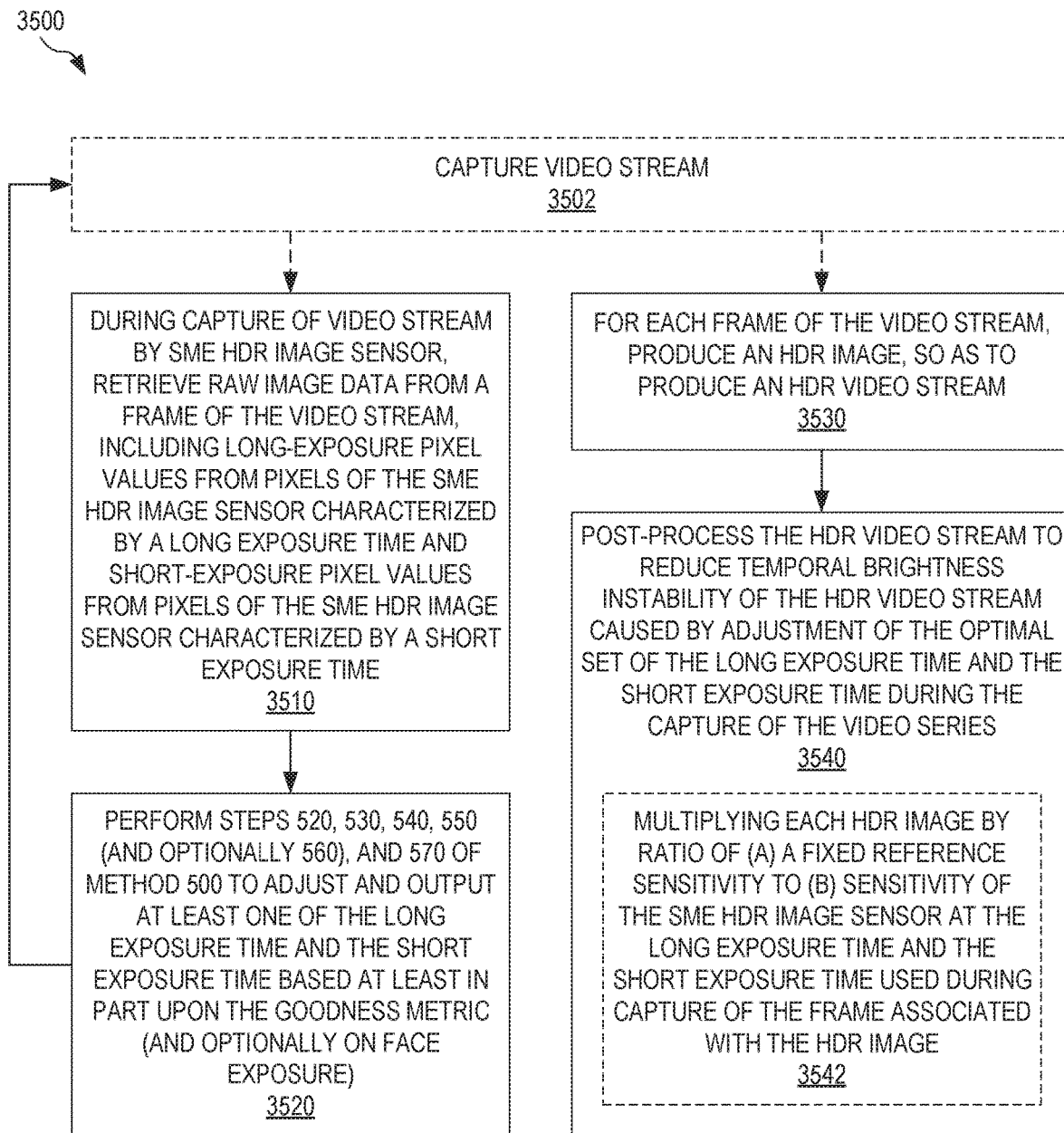
FIG. 35 illustrates a method for auto exposure of video stream capture by an SME HDR image sensor, with post-capture reduction of temporal brightness instability of the video stream, according to an embodiment.

FIG. 35 illustrates one method 3500 for auto exposure of video stream capture by an SME HDR image sensor, with post-capture reduction of temporal brightness instability of the video stream. Method 3500 may be performed by HDR camera 402, or by exposure time controller 400 together with HDR image generator 250.

During video stream capture, method 3500 performs iterations of steps 3510 and 3520 to auto expose the SME HDR image sensor during capture of the video stream. Method 3500 may perform steps 3510 and 3520 continuously or regularly to auto expose the SME HDR image sensor as the scene changes. Method 3500 further includes steps 3530 and 3540 that cooperate to generate an HDR video stream. In an embodiment, method 3500 also includes a step 3502 of capturing the video stream. Step 3502 may be performed by SME HDR image sensor 110.

Step 3510 retrieves raw image data from a frame of the video stream, including long-exposure pixel values from pixels of the SME HDR image sensor characterized by a long exposure time and short-exposure pixel values from pixels of the SME HDR image sensor characterized by a short exposure time. In one example of step 3510, exposure time controller 400 retrieves a frame of raw image data 280 from SME HDR image sensor 110. Without departing from the scope hereof, the image data retrieved in step 3510 may further include one or more sets of middle-exposure pixel values from pixels of the SME HDR image sensor characterized by one or more middle-exposure times, respectively. Step 3520 performs steps 520, 530, 540, 550 (and optionally 560), and 570 of method 500 to adjust and output, to the SME HDR image sensor, at least one of the long exposure time and the short exposure time based at least in part upon the goodness metric (and optionally on face exposure). It is understood that step 3520 may implement steps 520, 530, 540, 550 (and optionally 560), and 570 according to method 1000 or 1100. In one example of step 3520, exposure time controller 400 adjusts at least one of long exposure time 292 and short exposure time 294 and outputs exposure time set 290 to SME HDR image sensor 110.

Step 3530 produces an HDR image for each frame of the video stream, so as to produce an HDR video stream. In one example of step 3530, HDR image generator 250 generates an HDR image 270 from each frame of a video stream received from SME HDR image sensor 110. The frame rate of frames processed by step 3530 to generate HDR imagery may be the same as or different from the frame rate of frames processed by step 3510 to auto expose the SME HDR image sensor. In one implementation, auto exposure by steps 3510 and 3520 is slower than the frame rate of the video stream processed in step 3530. In another implementation, auto exposure by steps 3510 and 3520 is faster than the frame rate of the video stream processed in step 3530. For example, method 3500 may perform several iterations of steps 3510 and 3520 to auto expose the SME HDR image sensor prior to capture of each frame processed in step 3530 for HDR imagery.

In some scenarios, auto exposure (by virtue of steps 3510 and 3520) of video stream capture may lead to brightness jumps in the video stream generated in step 3530. To remedy this issue, step 3540 post-processes the HDR video stream to reduce temporal brightness instability of the HDR video stream. HDR image generator 250 may perform step 3540. In an embodiment, step 3540 includes a step 3542 of multiplying each HDR image by a ratio of (a) a fixed reference sensitivity to (b) the sensitivity of the SME HDR image sensor at the exposure times used during capture of the frame from with the HDR image is generated.

Without departing from the scope hereof, method 3500 may be adapted to auto expose other types of image sensors than SME HDR image sensors, such as temporally-multiplexed-exposure HDR image sensors or single-exposure-time image sensors. When method 3500 is adapted to auto expose video capture by a single-exposure-time image sensor, the images generated in step 3530 may not be HDR images.

Figure 36:
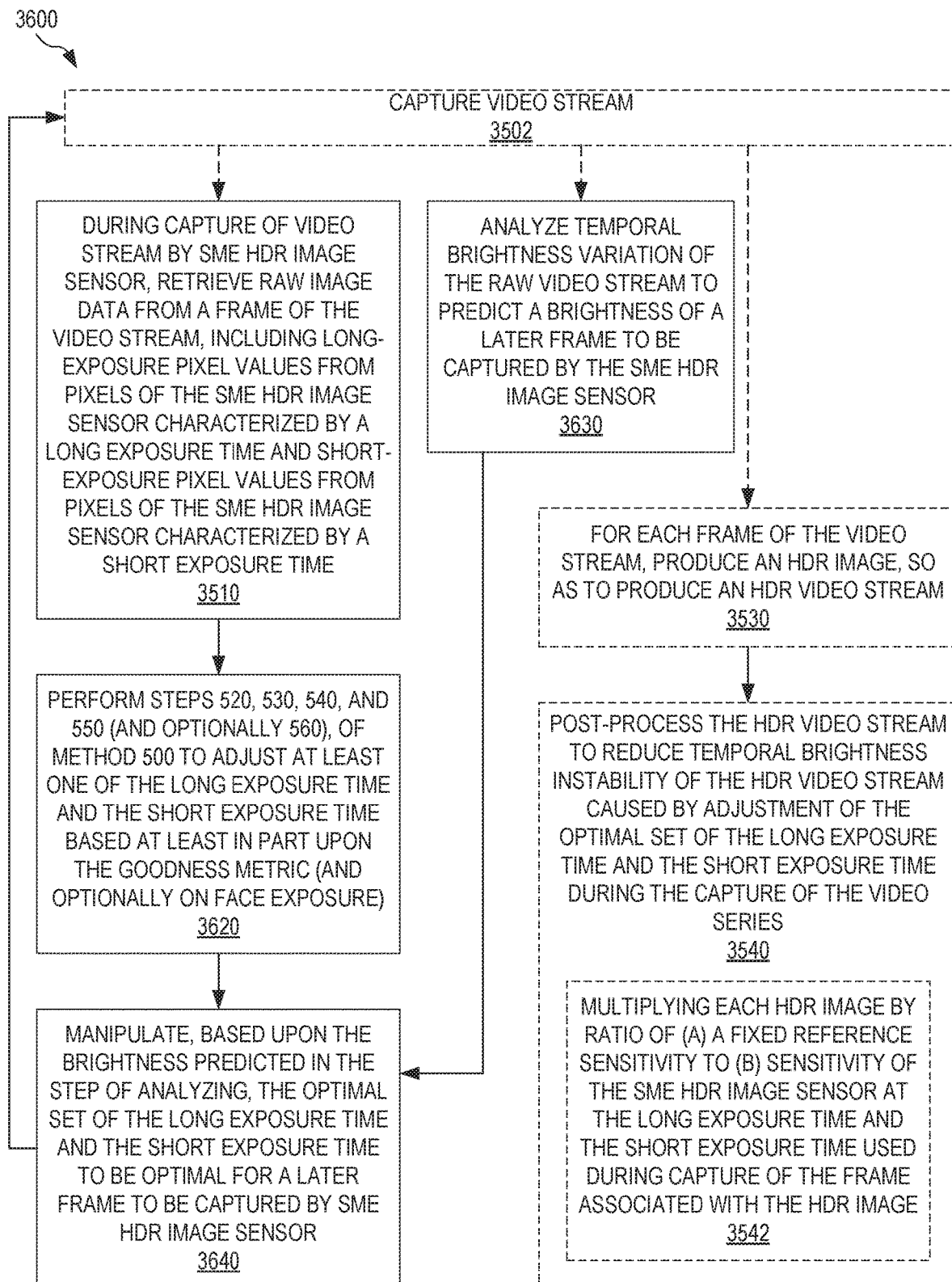
FIG. 36 illustrates a method for auto exposure of video stream capture by an SME HDR image sensor, which optimizes auto exposure according to predicted brightness of future scenes, according to an embodiment.

FIG. 36 illustrates one method 3600 for auto exposure of video stream capture by an SME HDR image sensor, which optimizes auto exposure according to predicted brightness of future scenes. Method 3600 may be performed by HDR camera 402, or by exposure time controller 400 together with HDR image generator 250.

During video stream capture, method 3600 performs iterations of steps 3510, 3620, 3630, and 3640 to auto expose the SME HDR image sensor during capture of the video stream, wherein the auto exposure takes into account anticipated brightness of the scenes to be captured. Method 3600 may perform steps 3510, 3620, 3630, and 3640 continuously or regularly to auto expose the SME HDR image sensor as the scene changes. Method 3600 may further include steps 3530 and 3540 that cooperate to generate an HDR video stream, as discussed above in reference to FIG. 35.

Step 3510 retrieves raw image data from a frame of the video stream, as discussed above in reference to FIG. 35. Step 3620 is similar to step 3520 except that step 3620 does not output the adjusted exposure time(s) to the SME HDR image sensor. Step 3630 analyzes the temporal brightness variation of the raw video stream to predict a brightness of a later frame to be captured by the SME HDR image sensor. In one example of step 3630, exposure time controller 400 analyzes the temporal brightness variation of a raw video stream captured by SME HDR image sensor 110 to predict a brightness of a next or later frame to be captured by SME HDR image sensor 110. Step 3640 manipulates the exposure time(s), as adjusted by step 3620, based upon the brightness predicted in step 3630 to further adjust the exposure time(s) to be optimal for the later frame to be captured by SME HDR image sensor. Step 3630 may be performed by exposure time controller 400, such that exposure time controller 400 outputs exposure time set 290, as adjusted and further manipulated in steps 3620 and 3640, to SME HDR image sensor 110 to be applied by SME HDR image sensor 110 when capturing the later frame.

Method 3600 may further include steps 3530, as discussed above in reference to FIG. 35, to generate an HDR video stream. Optionally, method 3600 also includes step 3540 to reduce temporal brightness instability of the HDR video stream, as discussed above in reference to FIG. 35.

Without departing from the scope hereof, method 3600 may be adapted to auto expose other types of image sensors than SME HDR image sensors, such as temporally-multiplexed-exposure HDR image sensors or single-exposure-time image sensors. When method 3600 is adapted to auto expose video capture by a single-exposure-time image sensor, the images generated in step 3530 may not be HDR images.

Figure 37:
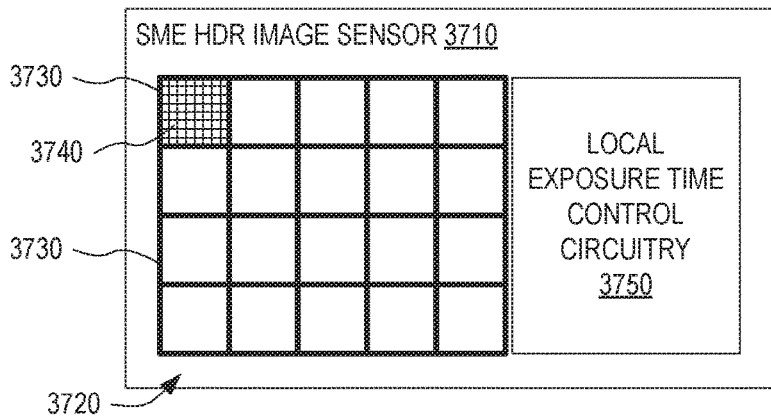
FIG. 37 illustrates an SME HDR image sensor with local exposure time control, according to an embodiment.

FIG. 37 illustrates one SME HDR image sensor 3710 with local exposure time control. SME HDR image sensor 3710 is an embodiment of SME HDR image sensor 110 and may be implemented in HDR camera 102. SME HDR image sensor 3710 includes a pixel array 3720 and local exposure time control circuitry 3750. Pixel array 3720 is divided into local regions 3730, and local exposure time control circuitry 3750 is configured to set the exposure times for each local region 3730 independently. For example, local exposure time control circuitry 3750 may assign one set of exposure times to pixels 3740 of one local region 3730 and another set of exposure times to pixels 3740 of another local region 3730.

Without departing from the scope hereof, pixel array 3720 may be divided into more or fewer local regions 3730 than depicted in FIG. 37, local regions 3730 may have size and shape different from those depicted in FIG. 37, and the size and/or shape of local regions 3730 may differ between different local regions 3730.

In one embodiment, pixel array 3720 is configured with pixel groups 226, and each local region 3740 includes at least one pixel group 226. In another embodiment, pixel array 3720 is configured with pixel groups 830, and each local region 3740 includes at least one pixel group 830. In yet another embodiment, pixel array 3720 is configured with pixel groups 930, and each local region 3740 includes at least one pixel group 930.

Figure 38:
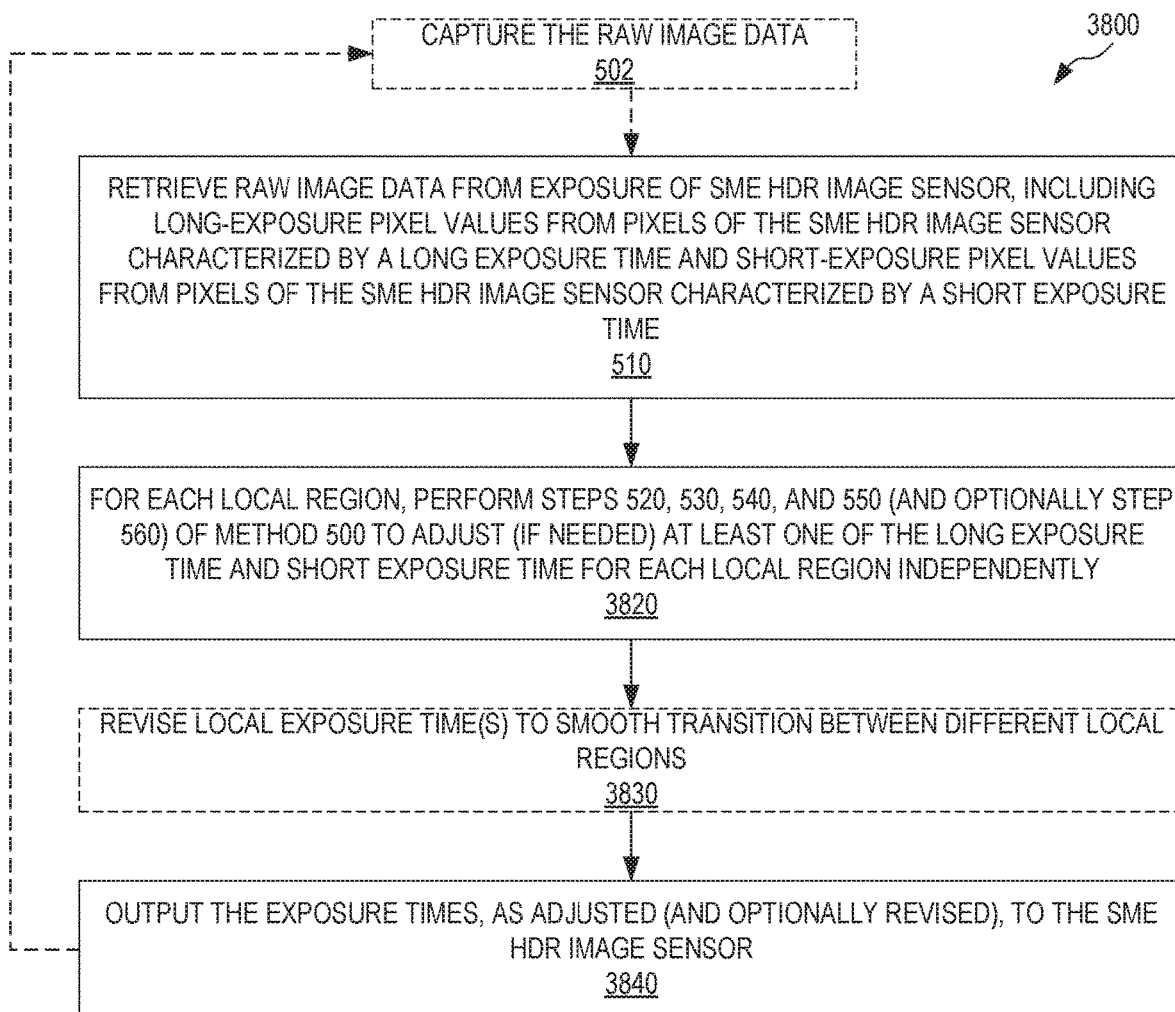
FIG. 38 illustrates a method for local auto exposure of an SME HDR image sensor, according to an embodiment.

FIG. 38 illustrates one method 3800 for local auto exposure of an SME HDR image sensor. Method 3800 may be used for local auto exposure of SME HDR image sensor 3710 and set different exposure times for different respective local regions 3730 of pixel array 3720.

Method 3800 performs step 510 to retrieve raw image data from an exposure of the SME HDR image sensor, as discussed above in reference to FIG. 5. In one example of step 510 of method 3800, exposure time controller 400 retrieves a frame of raw image data 280 from SME HDR image sensor 3710.

Next, in a step 3820, for each of a plurality of local regions of the pixel array of the SME HDR image sensor, method 3800 performs steps 520, 530, 540, and 550 (and, optionally, step 560) to adjust at least one of the long exposure time and short exposure time for the local region. Step 3820 thus allows for independent exposure time adjustment for each local region. It is understood that step 3820 may adjust exposure time(s) for one or more of the local regions while leaving the exposure times unchanged for any remaining local regions. Step 3820 may implement steps 520, 530, 540, and 550 (and, optionally, step 560) according to method 1000 or 1100. In one example of step 3820, exposure time controller 400 adjusts long exposure time 292 and/or short exposure time 294 for each of one or more local regions 3730 of SME HDR image sensor 3710.

Without departing from the scope hereof, method 3800 may be applied to auto exposure of SME HDR image sensors operating with more than two different exposure times, in which case steps 510 and 3820 further process one or more set of middle-exposure pixel values, and step 3820 may adjust one or more middle exposure times for each of one or more of the local regions.

In a step 3840, method 3800 outputs the exposure times, as adjusted, to the SME HDR image sensor. In one example of step 3840, exposure time controller 400 outputs a plurality of exposure time sets 290 to the respective plurality of local regions 3730 of SME HDR image sensor 3710.

In certain embodiments, method 3800 further includes a step 3830 performed between steps 3820 and 3840. Step 3830 revises the local exposure times, as adjusted in step 3820, to smooth exposure time transitions between different local regions. In one such embodiment, step 3830 imposes an upper limit on differences between exposure times of neighboring regions. In another such embodiment, step 3830 applies a spatial smoothing filter to the exposure times, as adjusted in step 3820. In yet another such embodiment, step 3820 is performed with a spatial resolution of local regions that is less than the spatial resolution of local regions of the SME HDR image sensor, and step 3830 utilizes the full spatial resolution of the local regions of the SME HDR image sensor to smooth the exposure time transitions. Exposure time controller 400 may perform step 3830.

Method 3800 may further include step 502, as discussed above in reference to FIG. 5. In one example of step 502, as implemented in method 3800, SME HDR image sensor 3710 captures raw image data 280.

Method 3800 may perform several iterations or repetitions of steps 510, 3820, and 3840 (and, optionally, also one or both of steps 502 and 3830) to optimize the exposure times for each local region of the SME HDR image sensor, in a manner similar to that discussed above for method 500.

Figure 39:
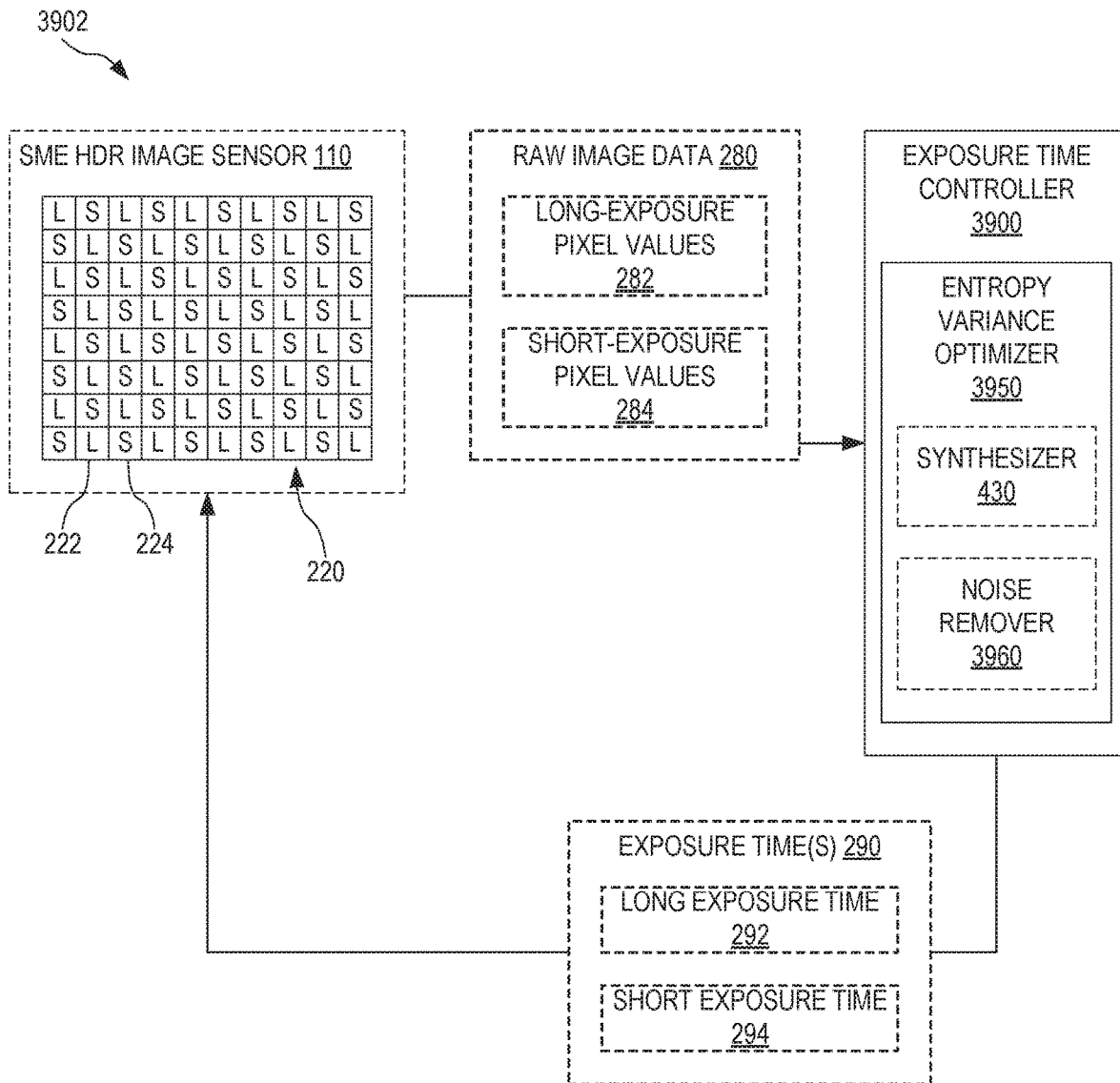
FIG. 39 illustrates an exposure time controller for auto exposure of an SME HDR image sensor, based at least in part upon minimization of entropy variance, according to an embodiment.

FIG. 39 illustrates one exposure time controller 3900 for auto exposure of an SME HDR image sensor, based at least in part upon minimization of entropy variance $Var(S_i)$. Exposure time controller 3900 is an embodiment of exposure time controller 100 and may be coupled with SME HDR image sensor 110 in an HDR camera 3902. HDR camera 3902 is an embodiment of HDR camera 102.

Exposure time controller 3900 includes an entropy variance optimizer 3950 that processes raw image data 280 received from SME HDR image sensor 110 to optimize exposure time set 290 based upon minimization of entropy variance $Var(S_i)$. Exposure time controller 3900 may also take other metrics into account, such as transition-point noise discrepancy, face exposure, and/or other metrics including those discussed above in reference to steps 540 and 550 of method 500.

In an embodiment, entropy variance optimizer 3950 includes synthesizer 430 for synthesizing HDR histograms. In this embodiment, synthesizer 430 may synthesize the HDR histogram from a plurality of exposure-time-specific histograms, and entropy variance optimizer 3950 may further include a noise remover 3960 that removes an effect of noise from each of the exposure-time-specific histograms.

Exposure time controller 3900 may auto expose embodiments of SME HDR image sensor 110 operating with two exposure times, i.e., long exposure time 292 and short exposure time 294. Alternatively, exposure time controller 3900 may auto expose embodiments of SME HDR image sensor 110 operating with more than two exposure times, i.e., long exposure time 292, short exposure time 294, and one or more middle exposure times. Exposure time controller 3900 is capable of auto exposing color SME HDR image sensors 110 as well as monochrome SME HDR image sensors 110.

FIG. 40 illustrates one method 4000 for auto exposure of an SME HDR image sensor based at least in part upon minimization of entropy variance $Var(S_i)$. Method 4000 is an embodiment of method 500 and may be performed by exposure time controller 3900 to auto expose SME HDR image sensor 110. Method 4000 includes steps 4010 and 4020. Step 4010 determines an optimal exposure time setting based at least in part upon minimization of entropy variance $Var(S_i)$, and step 4020 outputs the optimal exposure time setting to the SME HDR image sensor. Step 4010 may determine an optimal exposure time setting also based at least in part upon minimization of the noise discrepancy between pixels values from two different exposure time settings. For example, the two different exposure time settings may correspond to two closest exposure time settings. For example, exposure time controller 3900 may (a) in step 4010, process raw image data 280 from SME HDR image sensor 110 and employ entropy variance optimizer 3950 to determine an optimal exposure time set 290, and (b) in step 4020, output the optimal exposure time set 290 to SME HDR image sensor 110. In an example (not shown in the Figures), exposure time controller 3900 may be additionally configured to minimize the noise discrepancy between pixels values from two different exposure time settings, for example two closest exposure time settings.

In an embodiment, the optimal exposure time may be determined according to the method 2200 of FIG. 22. The two exposure time settings may relate to a long exposure time set to an initial value and to a short exposure time set to a minimum value according to method step 2210 of method 2200 described above.

Step 4010 processes a plurality of HDR histograms of the pixel values from a respective plurality of individual exposures of the SME-HDR image sensor at different respective exposure time settings. For each of the plurality of HDR histograms, step 4010 evaluates the variance Var($S_i$) of the contribution from individual bins of the HDR histogram to total entropy of the HDR histogram, so as to determine an optimal exposure time setting for the image sensor corresponding to a minimum value of the entropy variance Var($S_i$).

In an embodiment, step 4010 performs steps 4014 and 4018 for each of the different exposure time settings. Step 4014 generates an instance of the HDR histogram for the pixel values from an exposure at a respective one of the exposure time setting. In one example of step 4014, synthesizer 430 generates an HDR histogram from a frame of raw image data 280 retrieved from SME HDR image sensor 110. Step 4014 may include a step of 4016 of synthesizing the HDR histogram from a plurality of exposure-time-specific histograms associated with a respective plurality of pixel subsets of the SME HDR image sensor operating at a respective plurality of different exposure times. In one example of step 4016, synthesizer 430 synthesizes the HDR histogram from a histogram of long-exposure pixel values 282 and a histogram of short-exposure pixel values 284. Step 4018 calculates the entropy variance Var($S_i$) for each of the HDR histograms.

In embodiments of method 4000, wherein step 4014 includes step 4016, step 4010 may perform a step 4012 prior to step 4014. Step 4012 removes effect of noise from each of the exposure-time-specific histograms used to synthesize the HDR histogram in step 4016. Step 4014 is similar to steps 1440 and 1450 discussed above in reference to FIGS. 14 and 17. In one example of step 4012, noise remover 3960 removes an effect of noise from each of (a) a histogram of long-exposure pixel values 282 and (b) a histogram of short-exposure time pixel values 284.

Step 4010 may perform the repetitions of steps 4014 and 4018 (and optionally 4012) in an iterative fashion, wherein each iteration except for the first iteration is based upon raw image data captured with exposure time settings as determined in the preceding iteration. Step 4010 may also take other metrics than entropy variance into account, such as transition-point noise discrepancy, face exposure, and/or other metrics those discussed above in reference to steps 540 and 550 of method 500.

Method 4000 may auto expose monochrome SME HDR image sensors and color SME HDR image sensors. When applied to auto exposure of a color SME HDR image sensor, such as color SME HDR image sensor 810, method 4000 may minimize the entropy variance Var($S_i$) of an HDR histogram of luminance values processed in steps 4014 and 4018, or method 4000 may minimize the entropy variance Var($S_i$) of one or more HDR histograms of color-specific pixel values processed in steps 4014 and 4018.

Without departing from the scope hereof, method 4000 may be applied to SME HDR image sensors configured to operate at more than two different exposure times. In such scenarios, method 4000 may further process one or more sets of middle-exposure time values and determine one or more optimal middle exposure times, respectively. Also without departing from the scope hereof, method 4000 may be applied to auto exposure of temporally-multiplexed-exposure HDR image sensors.

Figure 41:
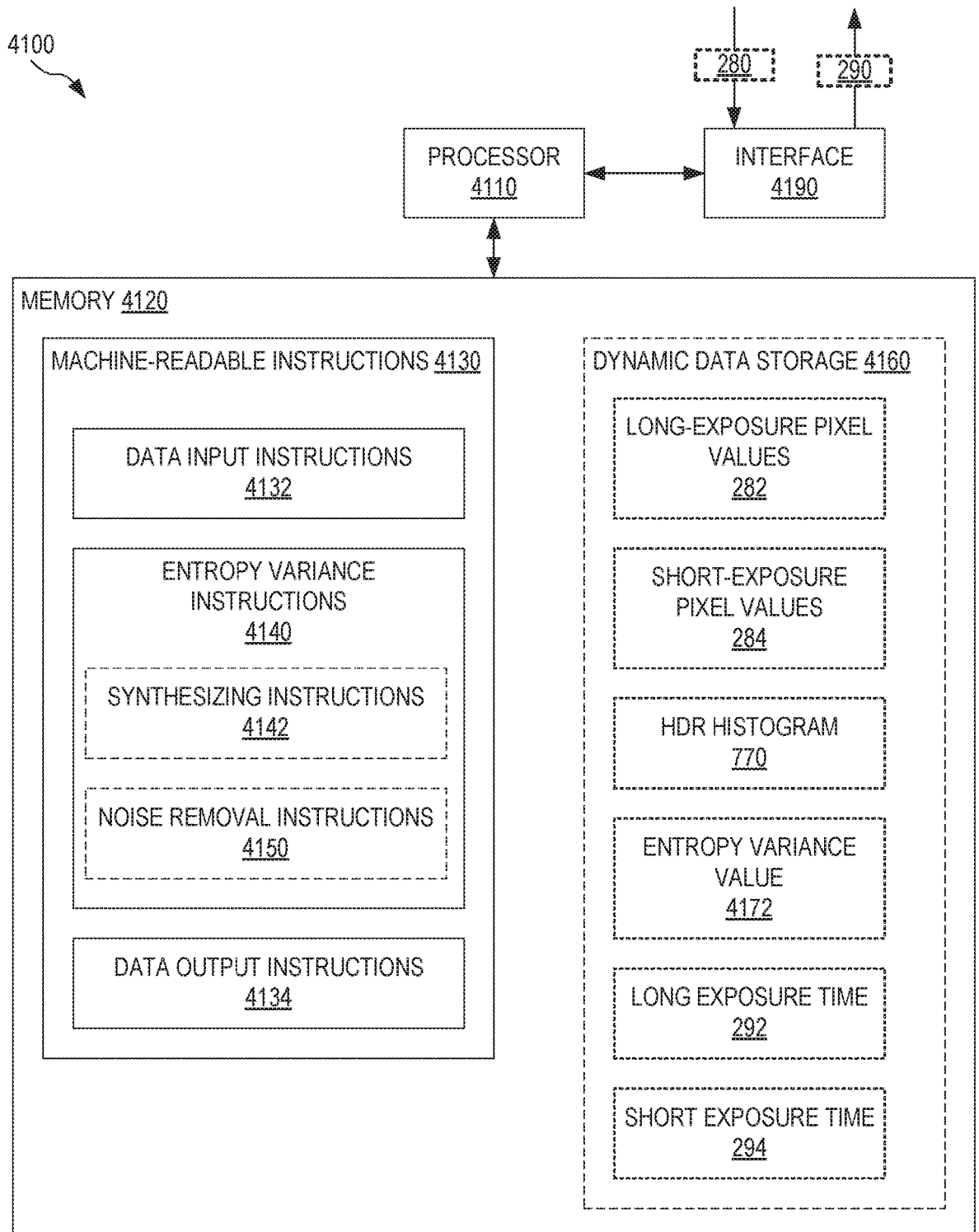
FIG. 41 illustrates a computer for auto exposure of an SME HDR image sensor, based at least in part upon minimization of entropy variance, according to an embodiment.

FIG. 41 illustrates one computer 4100 for auto exposure of an SME HDR image sensor, based at least in part upon minimization of entropy variance Var($S_i$). Computer 4100 is an embodiment of exposure time controller 3900 and may be implemented together with SME HDR image sensor 110 in HDR camera 3902. Alternatively, computer 4100 may be provided as a standalone product to be implemented with a third-party SME HDR image sensor. Computer 4100 includes a processor 4110, a non-transitory memory 4120, and an interface 4190. Memory 4120 includes machine-readable instructions 4130 and may further include a dynamic data storage 4160.

Machine-readable instructions 4130 include data input instructions 4132, entropy variance instructions 4140, and data output instructions 4134. Upon execution by processor 4110, data input instructions 4132 retrieve raw image data (e.g., raw image data 280) from an SME HDR image sensor via interface 4190. The raw image data is to be used in step 4010 of method 4000. Upon execution by processor 4110, entropy variance instructions 4140 and data output instructions 4134 perform steps 4010 and 4020, respectively, of method 4000. Entropy variance 4132 may include one or both of synthesizing instructions 4142 and noise removal instructions 4150 that, upon execution by processor 4110, perform steps 4016 and 4012, respectively, of method 4000. Data output instructions 4134 are configured to output exposure time set 290 via interface 4190.

Dynamic data storage 4160 may store one or more of (a) long-exposure pixel values 282 and short-exposure pixel values 284 received via interface 4190 upon execution by processor 4110 of data input instructions 4132, (b) one or more HDR histograms 770 generated upon execution by processor 4110 of synthesizing instructions 4142, (c) one or more entropy variance values 4172 generated upon execution by processor 4110 of entropy variance instructions 4140, and (d) long exposure time 292 and short exposure time 294 generated upon execution by processor 4110 of entropy variance instructions 4140.

It is understood that machine-readable instructions 4130 may be provided as a standalone software product encoded in non-transitory memory for implementation with a third-party processor 4110 and interface 4190. Without departing from the scope hereof, either one of computer 4100 and machine-readable instructions 4130 provided as a standalone software product may be applied to auto exposure of a temporally-multiplexed-exposure HDR image sensor.

Figure 42:
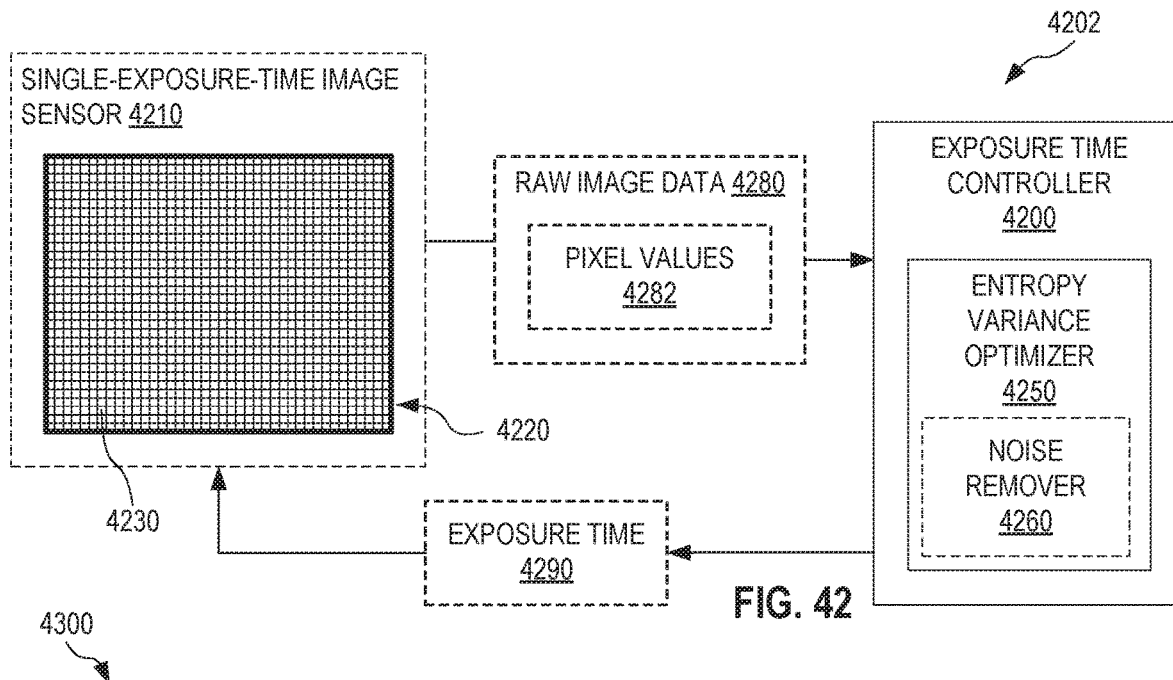
FIG. 42 illustrates an exposure time controller for auto exposure of a single-exposure-time image sensor, based at least in part upon minimization of entropy variance, according to an embodiment.

FIG. 42 illustrates one exposure time controller 4200 for auto exposure of a single-exposure-time image sensor, based at least in part upon minimization of entropy variance Var($S_i$). Exposure time controller 4200 is similar to exposure time controller 3900 except for being adapted to optimize a single exposure time instead of two or more exposure times. Exposure time controller 4200 may be coupled with a single-exposure-time image sensor 4210 in a camera 4202. Single-exposure-time image sensor 4210 includes a pixel array 4220 of pixels 4230 that are all exposed at the same exposure time.

Exposure time controller 4200 includes an entropy variance optimizer 4250 that processes raw image data 4280, including pixel values 4282, received from single-exposure-time image sensor 4210 to optimize exposure time 4290 of single-exposure-time image sensor 4210 based upon minimization of entropy variance Var($S_i$) for a histogram of pixel values 4282. Exposure time controller 4200 may further take into account other metrics, such as other entropy-based metrics, face exposure, the number of pixels 4230 that are overexposed, and/or the number of pixels 4230 that are underexposed. Entropy variance optimizer 4250 may include a noise remover 4260 that removes an effect of noise from the histogram of pixel values 4282.

Exposure time controller 4200 is capable of auto exposing color image sensors as well as monochrome image sensors.

Figure 43:
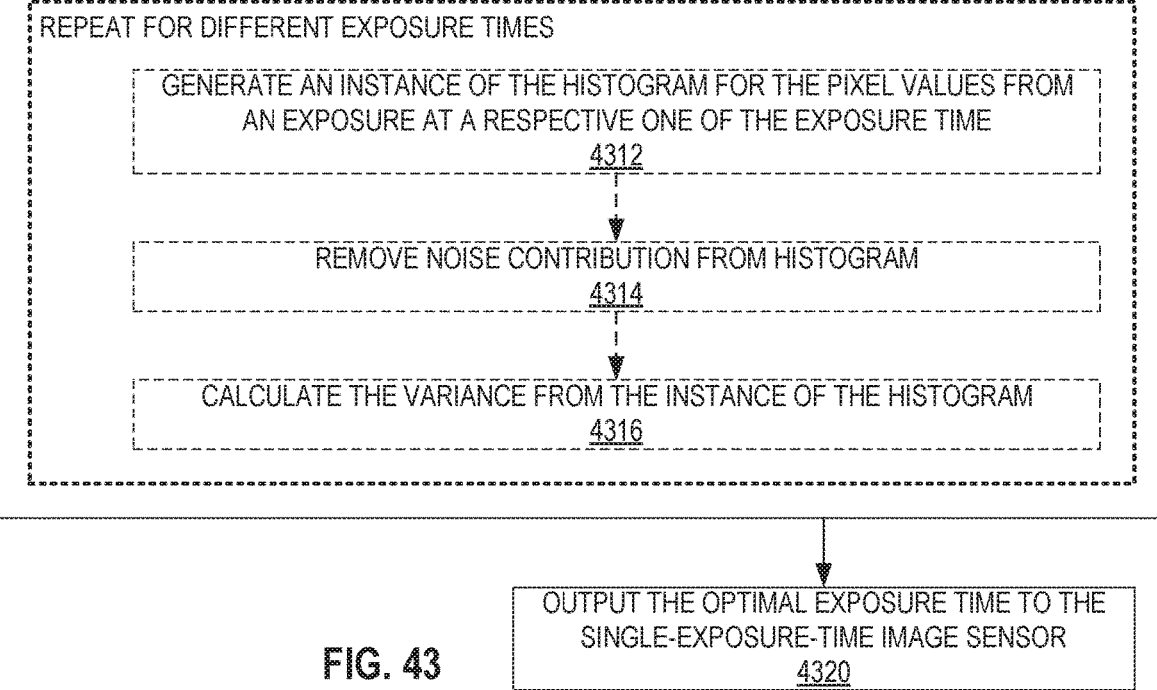
FIG. 43 illustrates a method for auto exposure of single-exposure-time image sensor based at least in part upon minimization of entropy variance, according to an embodiment.

FIG. 43 illustrates one method 4300 for auto exposure of single-exposure-time image sensor based at least in part upon minimization of entropy variance Var($S_i$). Method 4300 is similar to method 4000 except for optimizing only a single exposure time applicable to all pixels of the single-exposure-time image sensor. Method 4300 may be performed by exposure time controller 4200 to auto expose single-exposure-time image sensor 4210. Method 4300 includes steps 4310 and 4320. Step 4310 determines an optimal exposure time based at least in part upon minimization of entropy variance Var($S_i$), and step 4320 outputs the optimal exposure time to the single-exposure-time image sensor. For example, exposure time controller 4200 may (a) in step 4310, process raw image data 4280 from single-exposure-time image sensor 4210 and employ entropy variance optimizer 4250 to determine an optimal exposure time 4290, and (b) in step 4320, output the optimal exposure time 4290 to single-exposure-time image sensor 4210.

Step 4310 processes a plurality of histograms of the pixel values from a respective plurality of individual exposures of the single-exposure-time image sensor at different respective exposure times. For each of the plurality of histograms, step 4310 evaluates the variance Var($S_i$) of the contribution from individual bins of the histogram to total entropy of the histogram, so as to determine an optimal exposure time for the image sensor corresponding to a minimum value of the entropy variance Var($S_i$).

In an embodiment, step 4310 performs steps 4312 and 4316 for each of the different exposure times. For each exposure time, step 4312 generates an instance of HDR histogram for the pixel values from an exposure at the exposure time. In one example of step 4312, entropy variance optimizer 4250 generates a histogram of pixel values 4282 retrieved from single-exposure-time image sensor 4210. Step 4316 calculates the entropy variance Var($S_i$) for the histogram generated in step 4312.

In an embodiment, step 4310 performs a step 4314 between steps 4312 and 4316. Step 4314 removes effect of noise from the histogram generated in step 4312 prior to entropy variance calculation in step 4316. Step 4314 is similar to steps 1440 and 1450 discussed above in reference to FIGS. 14 and 17. In one example of step 4314, noise remover 4260 removes an effect of noise from a histogram of pixel values 4282.

Step 4310 may perform the repetitions of steps 4312 and 4316 (and optionally 4314) in an iterative fashion, wherein each iteration except for the first iteration is based upon raw image data captured with exposure time setting as determined in the preceding iteration. Step 4310 may also take other metrics than entropy variance into account, such as other entropy-based metrics, face exposure, the number of pixels 4230 that are overexposed, and/or the number of pixels 4230 that are underexposed.

Method 4300 may auto expose monochrome single-exposure-time image sensors and color single-exposure-time image sensors. When applied to auto exposure of a color single-exposure-time image sensor, such as a single-exposure-time image sensor with a Bayer color filter array, method 4300 may minimize the entropy variance Var($S_i$) of a histogram of luminance values generated by combining pixel values 4282 of different colors, or method 4300 may minimize the entropy variance Var($S_i$) of one or more histograms of color-specific pixel values 4282.

Figure 44:
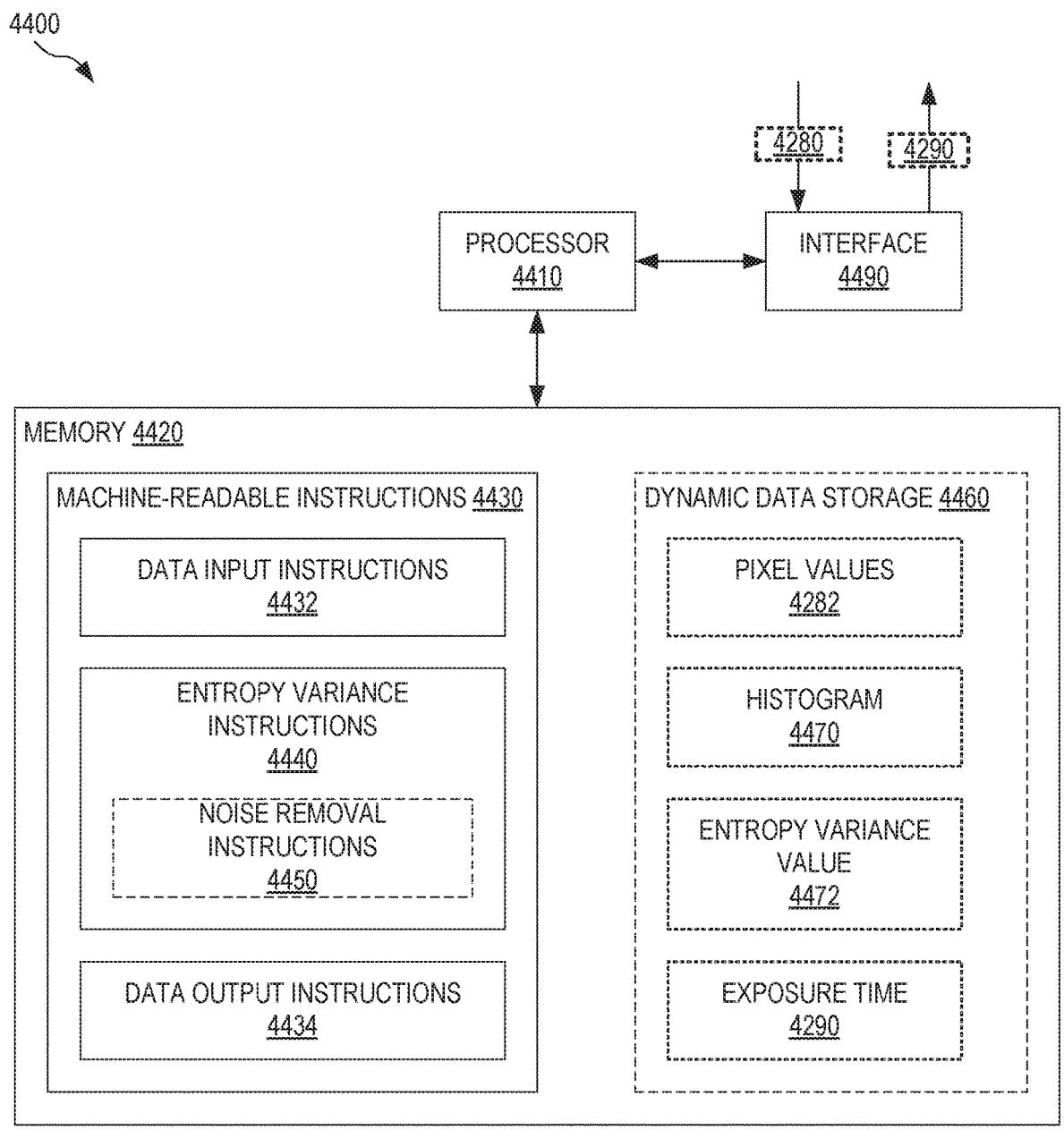
FIG. 44 illustrates a computer for auto exposure of a single-exposure-time image sensor, based at least in part upon minimization of entropy variance, according to an embodiment.

FIG. 44 illustrates one computer 4400 for auto exposure of a single-exposure-time image sensor, based at least in part upon minimization of entropy variance Var($S_i$). Computer 4400 is an embodiment of exposure time controller 4200 and may be implemented together with single-exposure-time image sensor 4210 in camera 4202. Alternatively, computer 4400 may be provided as a standalone product to be implemented with a third-party single-exposure-time image sensor. Computer 4400 includes a processor 4410, a non-transitory memory 4420, and an interface 4490. Memory 4420 includes machine-readable instructions 4430 and may further include a dynamic data storage 4460.

Machine-readable instructions 4430 include data input instructions 4432, entropy variance instructions 4440, and data output instructions 4434. Upon execution by processor 4410, data input instructions 4432 retrieve raw image data (e.g., raw image data 4280) from a single-exposure-time image sensor via interface 4490. The raw image data is to be used in step 4310 of method 4300. Upon execution by processor 4410, entropy variance instructions 4440 and data output instructions 4434 perform steps 4310 and 4320, respectively, of method 4300. Entropy variance instructions 4440 may include noise removal instructions 4450 that, upon execution by processor 4410, perform step 4314 of method 4300. Data output instructions 4434 are configured to output exposure time 4290 via interface 4490.

Dynamic data storage 4460 may store one or more of (a) pixel values 4282 received via interface 4490 upon execution by processor 4410 of data input instructions 4432, (b) one or more histograms 4470 generated upon execution by processor 4410 of entropy variance instructions 4440, (c) one or more entropy variance values 4472 generated upon execution by processor 4410 of entropy variance instructions 4440, and (d) exposure time 4290 generated upon execution by processor 4410 of entropy variance instructions 4440.

It is understood that machine-readable instructions 4430 may be provided as a standalone software product encoded in non-transitory memory for implementation with a third-party processor 4410 and interface 4490.

Figure 45:
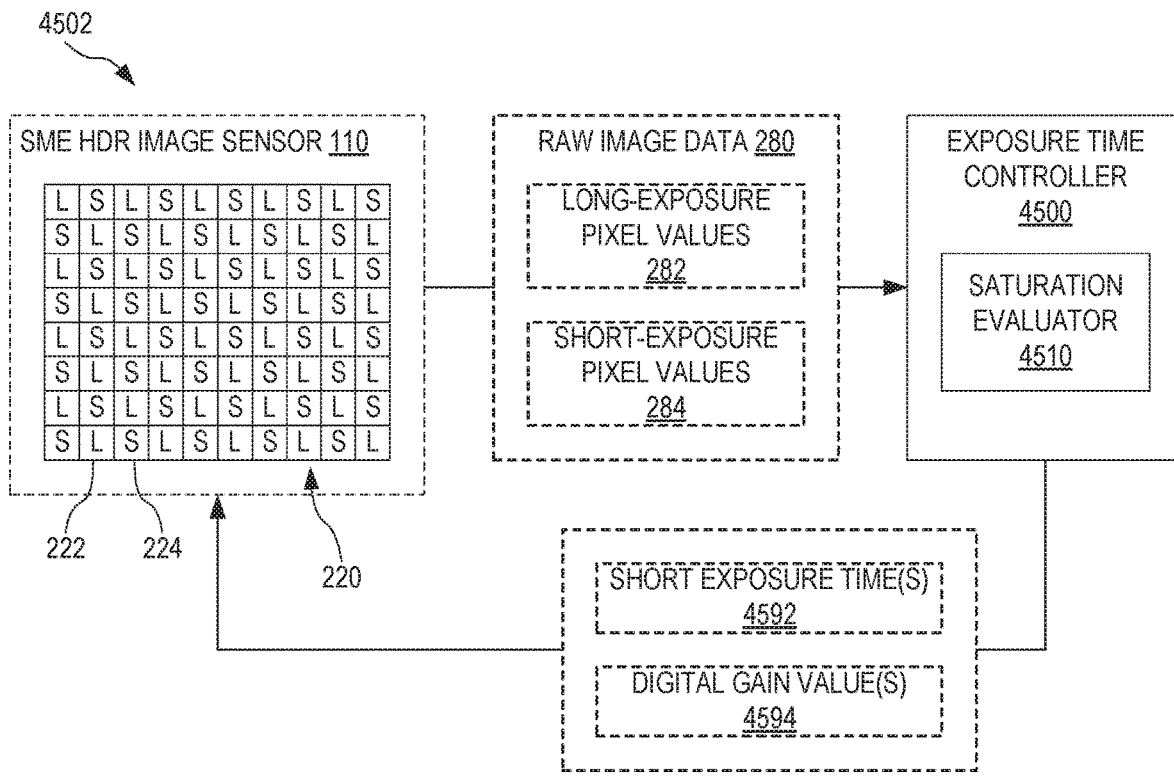
FIG. 45 illustrates an exposure time controller for auto exposure of an SME HDR image sensor based upon the saturation level of long-exposure pixels of the SME HDR image sensor, according to an embodiment.

FIG. 45 illustrates one exposure time controller 4500 for auto exposure of an SME HDR image sensor based upon the saturation level of long-exposure pixels of the SME HDR image sensor. Exposure time controller 4500 essentially uses the long-exposure pixels of the SME HDR image sensor as light meters. Exposure time controller 4500 may be coupled with SME HDR image sensor 110 in an HDR camera 4502. Exposure time controller 4500 includes a saturation evaluator 4510.

In operation, exposure time controller 4500 processes one or more frames of raw image data 280, received from SME HDR image sensor 110. Saturation evaluator 4510 evaluates the level of long-exposure pixel values 282 of raw image data 280 relative to a saturation threshold. If long-exposure pixel values 282 from long-exposure pixels 222 exceed a predefined saturation threshold, exposure time controller 4500 sets a reduced short exposure time 4592 for at least some of short-exposure pixels 224 of SME HDR image sensor 110. To compensate for the reduction in exposure time, exposure time controller 4500 sets an increased digital gain 4594 for these short-exposure pixels 224, such that the product of short exposure time and corresponding digital gain is unchanged.

In one embodiment, exposure time controller 4500 applies the same short exposure time 4592 and corresponding digital gain 4594 to all short-exposure pixels 224 of SME HDR image sensor 110. In another embodiment, exposure time controller 4500 is configured to define position dependent short exposure time 4592 and corresponding digital gain 4594. In this embodiment, exposure time controller 4500 may set short-exposure time 4592 (and corresponding digital gain 4594) for different local spatial regions of pixel array 220 separately, according to the saturation level determined by saturation evaluator 4510 in each of these local spatial regions.

In one implementation, exposure time controller 4500 auto exposes a monochrome SME HDR image sensor 110 wherein all long-exposure pixels 222 and short-exposure pixels 224 have the same spectral sensitivity. In another implementation, exposure time controller 4500 auto exposes a color SME HDR image sensors 110, such as color SME HDR image sensor 810, which includes several different spectral-sensitivity classes, e.g., red, green, and blue. In this implementation, exposure time controller 4500 may define the same short exposure time 4592 and corresponding digital gain 4594 to all spectral-sensitivity classes either (a) globally for all short-exposure time pixels 224 of pixel array 220 or (b) for all short-exposure time pixels 224 within each of a plurality of separately configurable local spatial regions of pixel array 220.

Figure 46:
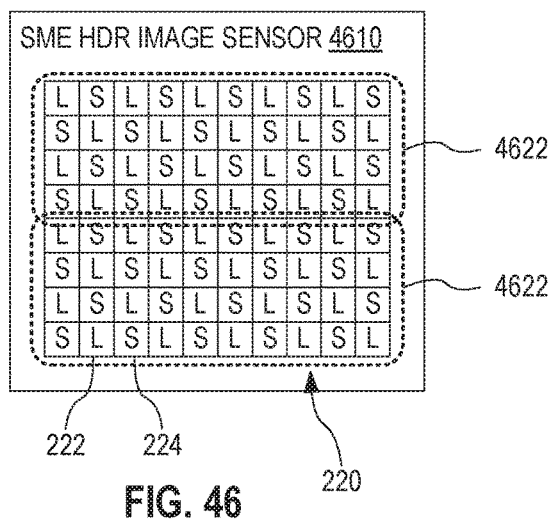
FIG. 46 illustrates an SME HDR image sensor having separate short-exposure time control for a plurality of local spatial regions of its pixel array, according to an embodiment.

FIG. 46 illustrates one SME HDR image sensor 4610 having separate short-exposure time control for a plurality of local regions 4622 of its pixel array 220. SME HDR image sensor 4610 is an embodiment of SME HDR image sensor 110. SME HDR image sensor 4610 may be implemented in HDR camera 4502, such that exposure time controller 4500 may separately auto expose each local region 4622 as discussed above in reference to FIG. 45. Although, for clarity of illustration, FIG. 46 depicts only two separately controllable local regions 4622, pixel array 220 of SME HDR image sensor 4610 may be configured to more than two separately controllable local regions 4622. SME HDR image sensor 4610 may be a monochrome image sensor or a color image sensor such as color SME HDR image sensor 810.

Figure 47:
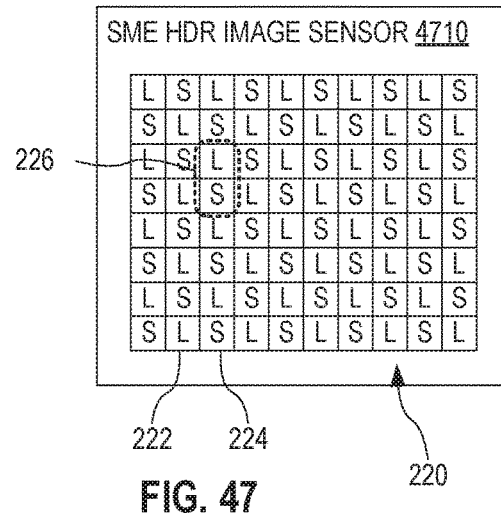
FIG. 47 illustrates an SME HDR image sensor having separate short-exposure time control for each local group of pixels representing each spectral-sensitivity class and exposure time of SME HDR image sensor, according to an embodiment.

FIG. 47 illustrates one SME HDR image sensor 4710 having separate short-exposure time control for each local group of pixels representing each spectral-sensitivity class and exposure time of SME HDR image sensor 4710. In monochrome embodiments of SME HDR image sensor 4710, wherein each pixel group 226 consists of one long-exposure pixel 222 and one short-exposure pixel 224, short exposure time 4592 and corresponding digital gain 4594 are configurable for each short-exposure pixel 224 separately from other short-exposure pixels 224. In color embodiments of SME HDR image sensor 4710, configured with pixel groups 830, short exposure time 4592 and corresponding digital gain 4594 are configurable for each pixel group 830 separately from other pixel groups 830.

Figure 48:
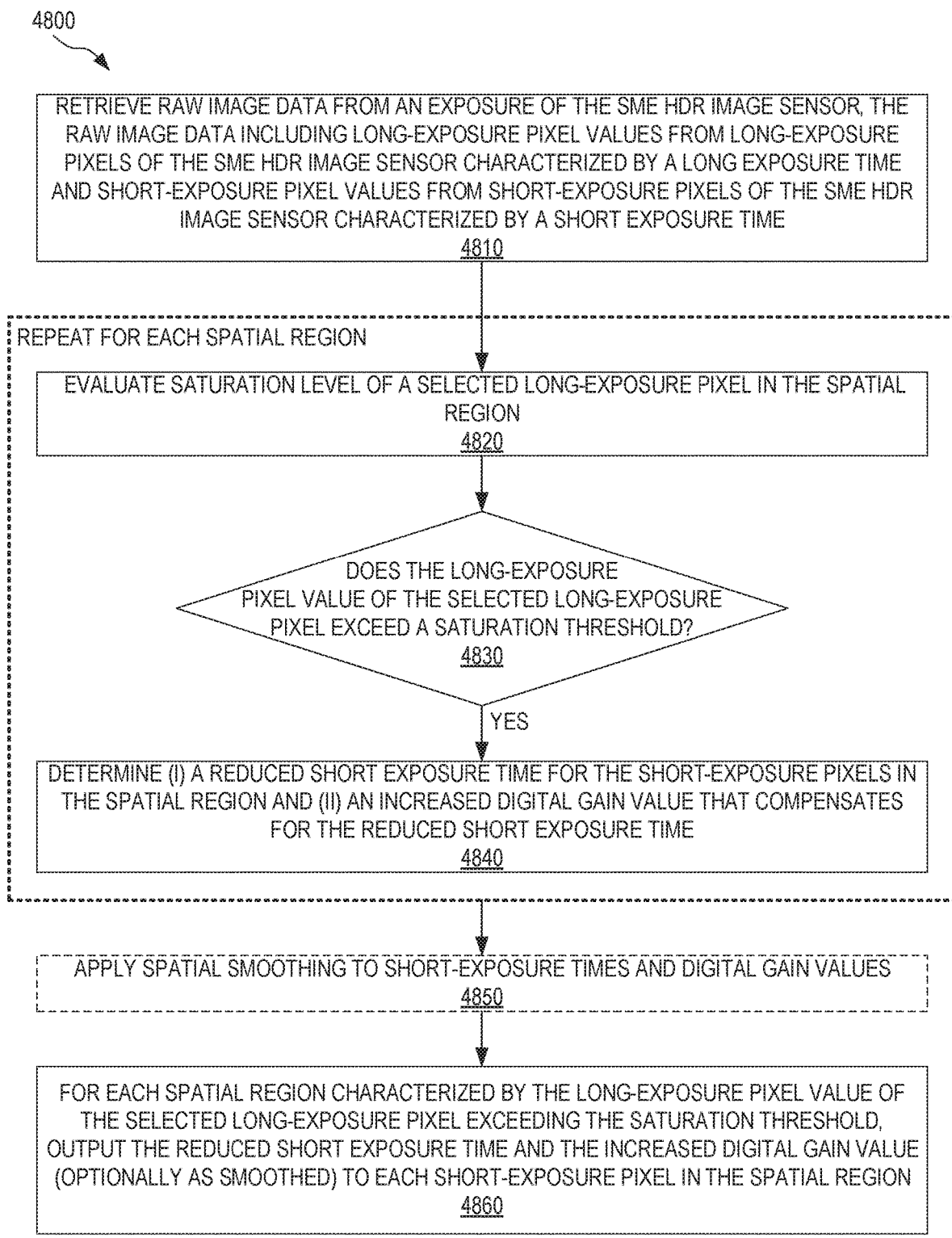
FIG. 48 illustrates a method for auto exposure of an SME HDR image sensor based upon the saturation level of long-exposure pixels of the SME HDR image sensor, according to an embodiment.

FIG. 48 illustrates one method 4800 for auto exposure of an SME HDR image sensor based upon the saturation level of long-exposure pixels of the SME HDR image sensor. Method 4800 may be performed by exposure time controller 4500 to auto exposure SME HDR image sensor 110 in HDR camera 4502.

In a step 4810, method 4800 retrieves raw image data from an exposure of the SME HDR image sensor. The raw image data includes long-exposure pixel values from long-exposure pixels of the SME HDR image sensor characterized by a long exposure time and short-exposure pixel values from short-exposure pixels of the SME HDR image sensor characterized by a short exposure time. In one example of step 4810, exposure time controller 4500 retrieves raw image data 280, including long-exposure pixel values 282 and short-exposure pixel values 284, from SME HDR image sensor 110.

Next, method 4800 performs steps 4820 and 4830, and if needed also step 4840, for each separately configurable local spatial region of the SME HDR image sensor. In one scenario, the SME HDR image sensor is limited to operation with the same short exposure time and corresponding digital gain throughout the pixel array. In this scenario, method 4800 performs steps 4820 and 4830, and if needed also step 4840, once to globally set the short exposure time and corresponding digital gain. In another scenario, the SME HDR image sensor is configured with two or more separately configurable local spatial regions, for example as shown in FIGS. 46 and 47. In this scenario, method 4800 performs steps 4820 and 4830, and if needed also step 4840, for each of these local spatial regions.

Step 4820 evaluates the saturation level of at least one selected long-exposure pixel in the local spatial region under consideration. In one example, saturation evaluator 4510 evaluates the saturation of at least one long-exposure pixel 222 in the local spatial region. When the local spatial region includes more than one long-exposure pixel 222, step 4820 may evaluate (a) a single, selected one of these long-exposure pixels 222, (b) all of these long-exposure pixels 222, or (c) a proper subset of these long-exposure pixels 222.

Step 4830 is a decision step. If the long-exposure pixel value of the selected long-exposure pixel(s), as evaluated in step 4820, exceeds a saturation threshold, method 4800 proceeds to step 4840. Step 4840 determines (i) a reduced short exposure time for the short-exposure pixels in the local spatial region and (ii) an increased digital gain value that compensates for the reduced short exposure time. In one example of steps 4830 and 4840, exposure time controller 4500 determines, based upon evaluation by saturation evaluator 4510, that the long-exposure pixel value of one or more selected long-exposure pixels in the local spatial region exceeds a saturation threshold, and exposure time controller 4500 then defines a reduced short exposure time 4592 and a corresponding digital gain 4594 that compensates for the short exposure time reduction.

After step 4840, method 4800 performs a step 4860. For each local spatial region characterized by the long-exposure pixel value of the selected long-exposure pixel(s) exceeding the saturation threshold, step 4860 outputs the reduced short exposure time and the correspondingly increased digital gain value to each short-exposure pixel in the local spatial region. In one example of step 4860, exposure time controller 4500 outputs short exposure time 4592 and corresponding digital gain 4594 to each local spatial region affected by long-exposure pixel saturation beyond a saturation threshold.

In embodiment of method 4800 configured to auto exposure SME HDR image sensors with two or more separately configurable local spatial regions, method 4800 may further include a step 4850 between steps 4840 and 4860. Step 4850 applies spatial smoothing to short-exposure times and digital gain values after the adjustments made in step 4840. In one implementation of this embodiment, step 4850 imposes an upper limit on differences between short exposure times of neighboring local spatial regions. In another implementation of this embodiment, step 4850 applies a spatial smoothing filter to the short exposure times, as adjusted in step 4840. In yet another implementation of this embodiment, step 4840 is performed with a spatial resolution that is less than the spatial resolution of local spatial regions of the SME HDR image sensor, and step 4850 utilizes the full spatial resolution of the local spatial regions of the SME HDR image sensor to smooth the exposure time transitions. Exposure time controller 4500 may perform step 4850.

Method 4800 may be applied to auto exposure of monochrome SME HDR image sensors as well as color SME HDR image sensors, as discussed above for exposure time controller 4500.

Figure 49:
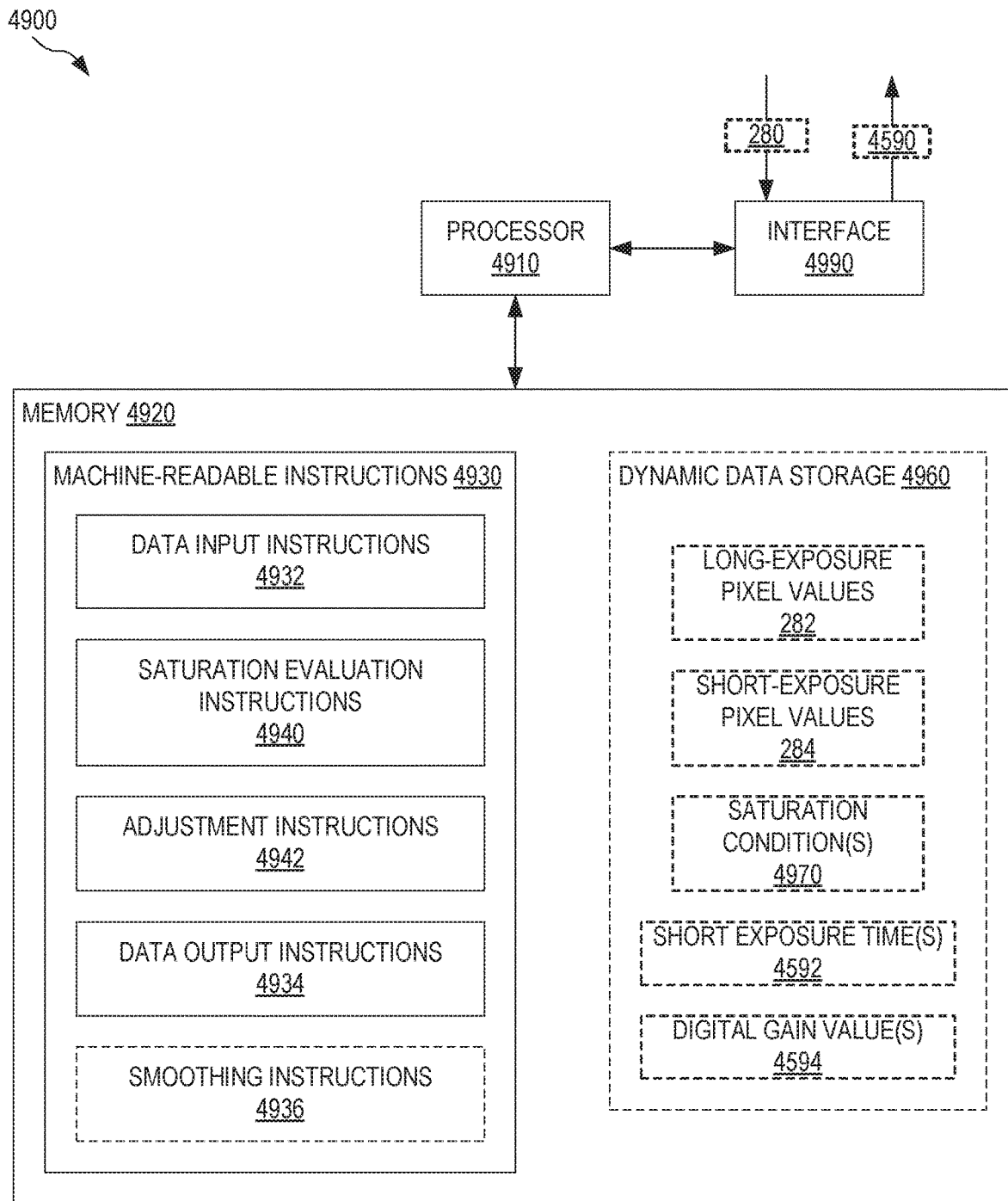
FIG. 49 illustrates a computer for auto exposure of an SME HDR image sensor based upon saturation level of long-exposure pixels, according to an embodiment.

FIG. 49 illustrates one computer 4900 for auto exposure of an SME HDR image sensor based upon saturation level of long-exposure pixels. Computer 4900 is an embodiment of exposure time controller 4500 and may be implemented together with SME HDR image sensor 110 in HDR camera 4502. Alternatively, computer 4900 may be provided as a standalone product to be implemented with a third-party SME HDR image sensor. Computer 4900 includes a processor 4910, a non-transitory memory 4920, and an interface 4990. Memory 4920 includes machine-readable instructions 4930 and may further include a dynamic data storage 4960.

Machine-readable instructions 4930 include data input instructions 4932, saturation evaluation instructions 4940, adjustment instructions 4942, and data output instructions 4934. Upon execution by processor 4910, data input instructions 4432 perform step 4810 of method 4800 to retrieve raw image data (e.g., raw image data 280) from an SME HDR image sensor via interface 4990. Upon execution by processor 4910, saturation evaluation instructions 4940 perform step 4820 of method 4800. Upon execution by processor 4910, adjustment instructions 4942 perform step 4830, and if needed also step 4840, of method 4800. In an embodiment, machine-readable instructions 4930 further include smoothing instructions 4936 that, upon execution by processor 4910, perform step 4850 of method 4800. Data output instructions 4434 are configured to output short exposure time 4592 and corresponding digital gain 4594 via interface 4990.

Dynamic data storage 4960 may store one or more of (a) long-exposure pixel values 282 and short-exposure pixel values 284 received via interface 4990 upon execution by processor 4910 of data input instructions 4932, (b) one or more saturation conditions 4970 determined upon execution by processor 4910 of saturation evaluation instructions 4940, and (c) one or more sets of short exposure time 4592 and corresponding digital gain 4594 generated upon execution by processor 4910 of adjustment instructions 4942.

It is understood that machine-readable instructions 4930 may be provided as a standalone software product encoded in non-transitory memory for implementation with a third-party processor 4910 and interface 4990.

Combinations of Features

Features described above as well as those claimed below may be combined in various ways without departing from the scope hereof. For example, it will be appreciated that aspects of one method or product for auto exposure of an image sensor, described herein, may incorporate or swap features of another one method or product for auto exposure of an image sensor described herein. The following examples illustrate some possible, non-limiting combinations of embodiments described above. It should be clear that many other changes and modifications may be made to the methods, products, and systems herein without departing from the spirit and scope of this invention:

(A1) An auto exposure method for an SME HDR image sensor may include (I) retrieving raw image data from an exposure of the SME HDR image sensor, wherein the raw image data includes long-exposure pixel values from pixels of the SME HDR image sensor characterized by a long exposure time and short-exposure pixel values from pixels of the SME HDR image sensor characterized by a short exposure time, (II) preprocessing the long-exposure pixel values and the short-exposure pixel values to remove therefrom long-exposure pixel values and short-exposure pixel values failing to meet one or more quality requirements, (III) synthesizing, into an HDR histogram, the long-exposure pixel values remaining after the step of preprocessing and the short-exposure pixel values remaining after the step of preprocessing, (IV) deriving a goodness metric from the HDR histogram, (V) adjusting at least one of the long exposure time and the short exposure time, based at least in part upon the goodness metric, and (VI) outputting the at least one of the long exposure time and the short exposure time, as adjusted, to the SME HDR image sensor.

(A2) In the auto exposure method denoted as (A1), the goodness metric may include an entropy metric.

(A3) In the auto exposure method denoted as (A2), the goodness metric may include a variance, across the HDR histogram, of contribution from individual bins of the HDR histogram to total entropy of the HDR histogram.

(A4) In the auto exposure method denoted as (A3), the step of deriving may include computing the contribution $S_i$ from each individual bin i of the HDR histogram as $S_i = -p_i \log_2(p_i)$, wherein $p_i$ is count in the individual bin i.

(A5) Either of the auto exposure methods denoted as (A3) and (A4) may further include, prior to the step of synthesizing, removing an effect of noise from the long-exposure pixel values and the short-exposure pixel values.

(A6) In the auto exposure method denoted as (A5), the step of removing the effect of noise may include deconvoluting, according to a noise model, each of (a) a first histogram of the long-exposure pixel values and (b) a second histogram of the short-exposure pixel values.

(A7) In the noise model of the auto exposure method denoted as (A6), expectation value of noise variance may be modeled with a linear function of pixel value.

(A8) Any of the auto exposure methods denoted as (A3) through (A7) may further include performing a plurality of iterations of the steps of retrieving, preprocessing, synthesizing, deriving, adjusting, and outputting, to determine an optimal set of the long exposure time and the short exposure time that minimizes the variance.

(A9) The auto exposure method denoted as (A8) may further include, prior to the step of performing the plurality of iterations, determining an optimal long exposure time, and the step of performing the plurality of iterations may include determining an optimal short exposure time while maintaining the long exposure time at the optimal long exposure time.

(A10) In the auto exposure method denoted as (A9), the step of determining the optimal long exposure time may include changing the long exposure time to minimize a noise discrepancy between the long-exposure pixel values and the short-exposure pixel values at a transition point that defines transition between use of the long-exposure pixel values and use of the short-exposure pixel values in demosaicing of an image captured by the SME HDR image sensor.

(A11) In the auto exposure method denoted as (A10), the step of changing the long exposure time may include (1) setting the long exposure time to an initial value and the short exposure time to a minimum value, and (2) carrying out at least one iteration of: (a) performing the steps of retrieving, preprocessing, and synthesizing to generate a preliminary HDR histogram, (b) estimating a target value of the long exposure time from the preliminary HDR histogram, (c) for a plurality of values of the long exposure time in a range about the target value, computing a respective plurality of parameters indicative of the noise discrepancy that would result from the long exposure time, (d) deducing, from the values of the parameter, a revised value of the long exposure time that corresponds to the transition point coinciding with the bin associated with a smallest one of the values of the noise discrepancy, (e) unless the revised value of the long exposure time is greater than or equal to the initial value of the long exposure time, updating the initial value of the long exposure time to the revised value of the long exposure time and proceeding to a subsequent iteration, and (f) if the revised value of the long exposure time is greater than or equal to the initial value of the long exposure time, outputting the revised value of the long exposure time as the optimal long exposure time.

(A12) Any of the auto exposure methods denoted as (A2) through (A11) may further include detecting a face in the raw image data, and the step of adjusting may include adjusting the set of the long exposure time and the short exposure time partly based upon the goodness metric and partly to improve exposure of the face.

(A13) In any of the auto exposure methods denoted as (A2) through (A12), the goodness metric may further include a metric indicative of clipping at one or both of upper and lower end of the HDR histogram.

(A14) Any of the auto exposure methods denoted as (A1) through (A13) may include (i) in the step of retrieving, further retrieving, as part of the raw image data, middle-exposure pixel values from pixels of the SME HDR image sensor characterized by a middle exposure time that is shorter than the long exposure time and longer than the short exposure time, (ii) in the step of preprocessing, further preprocessing the middle-exposure pixel values to remove therefrom middle-exposure pixel values failing to meet one or more second quality requirements, (iii) in the step of synthesizing, further synthesizing into the HDR histogram the middle-exposure pixel values remaining after the step of preprocessing, (iv) in the step of adjusting, further adjusting the middle exposure time, and (v) in the step of outputting, further outputting the middle exposure time as adjusted.

(A15) In any of the auto exposure methods denoted as (A1) through (A14), the SME HDR image sensor may be a color image sensor having a plurality of color-specific pixel sets, wherein each of the color-specific pixel sets is specifically sensitive to a respective one of a plurality of colors, and wherein each of the color-specific pixel sets includes a subset of the pixels characterized by the long exposure time and a subset of the pixels characterized by the short exposure time, and the auto exposure method may further include (A) performing the steps of retrieving, preprocessing, synthesizing, and deriving for each of the color-specific pixel sets separately and (B) collectively evaluating each goodness metric determined for the color-specific pixel sets to generate one adjusted set of the long exposure time and the short exposure time applicable to all of the colors.

(A16) In any of the auto exposure methods denoted as (A1) through (A14), the SME HDR image sensor may be a color image sensor having a plurality of color-specific pixel sets, wherein each of the color-specific pixel sets is specifically sensitive to a respective one of a plurality of colors, and wherein each of the color-specific pixel sets includes a subset of the pixels characterized by the long exposure time and a subset of the pixels characterized by the short exposure time, and the auto exposure method may further include (1) in the step of retrieving, retrieving, for each of the color-specific pixel sets, respective color-specific long-exposure pixel values and respective color-specific short-exposure pixel values and (2) prior to the step of preprocessing, combining spatially adjacent ones of the color-specific long-exposure pixel values associated with different colors to generate the long-exposure pixel values, and combining spatially adjacent ones of the color-specific short-exposure pixel values associated with different colors to generate the short-exposure pixel values, wherein the long-exposure pixel values and the short-exposure pixel values are representative of luminance.

(A17) In any of the auto exposure methods denoted as (A1) through (A16), the step of preprocessing may include filtering, separately from each other, the long-exposure pixel values and the short-exposure pixel values.

(A18) In the auto exposure method denoted as (A17), the step of preprocessing may include (1) in the step of filtering, removing (a) from the long-exposure pixel values, long-exposure pixel values above a saturation-related threshold and (b) from the short-exposure pixel values, short-exposure pixel values below a noise-related threshold, and (2) comparing the long-exposure pixel values and the short-exposure pixel values, remaining after the step of filtering, to evaluate motion discrepancies and remove short-exposure pixel values and long-exposure values from spatial regions of the SME HDR image sensor affected by motion discrepancies in excess of a threshold motion discrepancy level.

(A19) In any of the auto exposure methods denoted as (A1) through (A18), the step of synthesizing may include (1) scaling to a common scale (a) a first histogram of the long-exposure pixel values remaining after the step of preprocessing, and (b) a second histogram of the short-exposure pixel values remaining after the step of preprocessing, (2) removing from the second histogram, bins of short-exposure pixel values that, on the common scale, have center value less than or equal to center value of top-most bin of the first histogram, and (3) after the step of removing, merging the first histogram and the second histogram to form the HDR histogram.

(A20) In any of the auto exposure methods denoted as (A1) through (A19), the step of preprocessing may include scaling the long-exposure pixel values and the short-exposure pixel values to compensate for presence of an optical gradient filter between the SME HDR image sensor and a scene represented by the raw image data.

(A21) Any of the auto exposure methods denoted as (A1) through (A20) may include performing a plurality of iterations of the steps of retrieving, preprocessing, synthesizing, deriving, adjusting, and outputting, to determine an optimal set of the long exposure time and the short exposure time that optimizes the goodness metric.

(A22) In the auto exposure method denoted as (A21), each subsequent iteration may be based upon raw image data acquired by the SME HDR image sensor using the adjusted set of the long exposure time and the short exposure time outputted to the SME HDR image sensor in a most recent prior iteration.

(A23) Either of the auto exposure methods denoted as (A21) and (A22) may further include executing the step of performing separately for a plurality of local regions of the SME HDR image sensor, to locally optimize a spatially varying set of the long exposure time and the short exposure time.

(A24) Any of the auto exposure methods denoted as (A21) through (A23) may further include (1) in the step of retrieving, retrieving the raw image data from a frame of a raw video stream recorded by the SME HDR image sensor, (2) executing the steps of retrieving, preprocessing, synthesizing, deriving, adjusting, and outputting for the raw image data of a plurality of frames of the raw video stream to adjust, during capture of the raw video stream by the SME HDR image sensor, the optimal long set of the exposure time and the short exposure time, (3) for each frame of the raw video stream, producing an HDR image from the long-exposure pixel values and the short-exposure pixel values, so as to produce an HDR video stream from the raw video stream, and (4) post-processing the HDR video stream to reduce temporal brightness instability of the HDR video stream caused by adjustment of the optimal set of the long exposure time and the short exposure time during the capture of the video series.

(A25) In the auto exposure method denoted as (A24), the step of post-processing may include multiplying each HDR image by ratio of (a) a fixed reference sensitivity to (b) sensitivity of the SME HDR image sensor at the long exposure time and the short exposure time used during capture of the frame associated with the HDR image.

(A26) Any of the auto exposure methods denoted as (A21) through (A23) may further include (1) obtaining a raw video stream of frames recorded by the SME HDR image sensor, (2) analyzing temporal brightness variation of the raw video stream to predict a brightness of a later frame to be captured by the SME HDR image sensor, and (3) performing the iterations on at least some of the frames of the raw video stream, wherein each of the iterations further includes manipulating, based upon the brightness predicted in the step of analyzing, the optimal set of the long exposure time and the short exposure time to be optimal for the later frame.

(B1) A product for auto exposure of an SME HDR image sensor may include machine-readable instructions encoded in non-transitory memory, wherein the machine-readable instructions include (I) data input instructions that, when executed by a processor, retrieve raw image data from an exposure of the SME HDR image sensor, the raw image data including long-exposure pixel values from pixels of the SME HDR image sensor characterized by a long exposure time and short-exposure pixel values from pixels of the SME HDR image sensor characterized by a short exposure time, (II) preprocessing instructions that, when executed by the processor, preprocess the long-exposure pixel values and the short-exposure pixel values to remove therefrom long-exposure pixel values and short-exposure pixel values failing to meet one or more quality requirements, (III) synthesizing instructions that, when executed by the processor, synthesize into an HDR histogram (a) the long-exposure pixel values remaining after execution of the preprocessing instructions and (b) the short-exposure pixel values remaining after execution of the preprocessing instructions, (IV) metric instructions that, when executed by the processor, derive a goodness metric from the HDR histogram, (V) adjustment instructions that, when executed by the processor, adjust at least one of the long exposure time and the short exposure time, based at least in part upon the goodness metric, and (VI) data output instructions that, when executed by the processor, output the at least one of the long exposure time and the short exposure time.

(B2) In the product denoted as (B1), the goodness metric may be a variance, across the HDR histogram, of contribution from individual bins of the HDR histogram to total entropy of the HDR histogram.

(B3) In the product denoted as (B2), the metric instructions may be configured to, when executed by the processor, compute the contribution $S_i$ from each individual bin i of the HDR histogram as $S_i = -p_i \log_2(p_i)$, wherein $p_i$ is count in the individual bin i.

(B4) In the product denoted as (B3), the machine-readable instructions may further include noise removal instructions that, when executed by the processor, remove an effect of noise from the HDR histogram, the machine-readable instructions being configured to, when executed by the processor, command the processor to execute the noise removal instructions prior to the metric instructions.

(B5) In the product denoted as (B4), the noise removal instructions may be configured to, when executed by the processor, deconvolute the HDR histogram according to a noise model.

(B6) In the noise model of the product denoted as (B5), expectation value of noise variance may be modeled with a linear function of pixel value.

(B7) In any of the products denoted as (B2) through (B6), the machine-readable instructions may further include iteration instructions that, when executed by the processor, perform a plurality of iterations of executing the data input instructions, the preprocessing instructions, the synthesizing instructions, the metric instructions, the adjustment instructions, and the data output instructions, to determine and output to the SME HDR image sensor an optimal set of the long exposure time and the short exposure time that minimizes the variance.

(B8) An SME HDR imaging system with auto exposure functionality, may include an SME HDR image sensor, a processor, and any of the products denoted as (B2) through (B7) for adjusting the long exposure time and the short exposure time of the SME HDR image sensor when the processor executes the machine-readable instructions of the product, wherein the machine-readable instructions of the product further include iteration instructions that, when executed by the processor, perform a plurality of iterations of executing the data input instructions, the preprocessing instructions, the synthesizing instructions, the metric instructions, the adjustment instructions, and the data output instructions, to determine and output to the SME HDR image sensor an optimal set of the long exposure time and the short exposure time that optimizes the goodness metric.

(B9) In the SME HDR imaging system denoted as (B8), the SME HDR image sensor may be a color image sensor having a plurality of color-specific pixel sets, wherein each of the color-specific pixel sets is specifically sensitive to a respective one of a plurality of colors, and wherein each of the color-specific pixel sets includes a subset of the pixels characterized by the long exposure time and a subset of the pixels characterized by the short exposure time. The machine-readable instructions may be configured to, when executed by the processor, command the processor to execute the data input instructions, the preprocessing instructions, the synthesizing instructions, and the metric instructions for each of the color-specific pixel sets separately, and the adjustment instructions may be configured to, when executed by the processor, collectively evaluate the goodness metric determined for each of the color-specific pixel sets to adjust the at least one of the long exposure time and the short exposure time, wherein the at least one of the long exposure time and the short exposure time is applicable to all of the colors.

(B10) In the SME HDR imaging system denoted as (B9), the SME HDR image sensor may be a zig-zag HDR image sensor.

(B11) In the SME HDR imaging system denoted as (B9) or (B10), the SME HDR image sensor may be a quad HDR image sensor, and the machine-readable instructions may be configured such that (1) the data input instructions, when executed by the processor, further retrieve, as part of the raw image data, middle-exposure pixel values from pixels of the SME HDR image sensor characterized by a middle exposure time that is shorter than the long exposure time and longer than the short exposure time, (2) the preprocessing instructions, when executed by the processor, further preprocess the middle-exposure pixel values to remove therefrom middle-exposure pixel values failing to meet one or more second quality requirements, (3) the synthesizing instructions, when executed by the processor, further synthesize into the HDR histogram the middle-exposure pixel values remaining after execution of the preprocessing instructions, and (4) the adjustment instructions, when executed by the processor, further adjust the middle exposure time, and (5) the step of data output instructions, when executed by the processor, further output the middle exposure as adjusted.

(B12) In the SME HDR imaging system denoted as (B8), the SME HDR image sensor may be a color image sensor having a plurality of color-specific pixel sets, wherein each of the color-specific pixel sets is specifically sensitive to a respective one of a plurality of colors, and each of the color-specific pixel sets includes a subset of the pixels characterized by the long exposure time and a subset of the pixels characterized by the short exposure time. The data input instructions may be configured to, when executed by the processor, retrieve, for each of the color-specific pixel sets, respective color-specific long-exposure pixel values and respective color-specific short-exposure pixel values, and the machine-readable instructions may further include combination instructions, that, when executed by the processor prior to execution of the preprocessing instructions, combine (a) spatially adjacent ones of the color-specific long-exposure pixel values associated with different colors to generate the long-exposure pixel values, and (b) spatially adjacent ones of the color-specific short-exposure pixel values associated with different colors to generate the short-exposure pixel values, wherein the long-exposure pixel values and the short-exposure pixel values are representative of luminance.

(B13) In the SME HDR imaging system denoted as (B12), the SME HDR image sensor may be a zig-zag HDR image sensor.

(B14) In the SME HDR imaging system denoted as (B12), the SME HDR image sensor may be a quad HDR image sensor, and the machine-readable instructions may be configured such that (1) the data input instructions, when executed by the processor, further retrieve, as part of the raw image data, color-specific middle-exposure pixel values from pixels of the SME HDR image sensor characterized by a middle exposure time that is shorter than the long exposure time and longer than the short exposure time, (2) the combination instructions, when executed by the processor, further combine spatially adjacent ones of the color-specific middle-exposure pixel values associated with different colors to generate middle-exposure pixel values, wherein the middle-exposure pixel values are representative of luminance, (3) the preprocessing instructions, when executed by the processor, further preprocess the middle-exposure pixel values to remove therefrom middle-exposure pixel values failing to meet one or more second quality requirements, (4) the synthesizing instructions, when executed by the processor, further synthesize into the HDR histogram middle-exposure pixel values remaining after preprocessing according to the preprocessing instructions, (5) the adjustment instructions, when executed by the processor, further adjust the middle exposure time, and (6) the data output instructions, when executed by the processor, further output the middle exposure time as adjusted.

(B15) In any of the SME HDR imaging systems denoted as (B8) through (B14), the iteration instructions may be configured to, when executed by the processor, perform the iterations separately for a plurality of local regions of the SME HDR image sensor, to locally optimize a spatially varying set of the long exposure time and the short exposure time, and the SME HDR image sensor may include circuitry for locally defining the long exposure time and the short exposure time for each of the local regions.

(C1) An auto exposure method for an image sensor may include (I) evaluating variance, for each of a plurality of histograms of the pixel values from a respective plurality of individual exposures of the image sensor at respective exposure time settings, of contribution from individual bins of the histogram to total entropy of the histogram, to determine an optimal exposure time for the image sensor corresponding to a minimum value of the variance, and (II) outputting the optimal exposure time to the image sensor.

(C2) In the auto exposure method denoted as (C1), the step of evaluating may include, for a plurality of different exposure time settings, performing a respective plurality of iterations of (a) generating an instance of the histogram for the pixel values from an exposure of the image sensor at a respective one of the exposure time setting settings, and (b) calculating the variance from the instance of the histogram.

(C3) In the auto exposure method denoted as (C2), the step of calculating may include, for each individual bin i, computing the contribution as $S_i = -p_i \log_2 (p_i)$, wherein $p_i$ is count in the individual bin i.

(C4) In either of the auto exposure methods denoted as (C2) and (C3), each of the iterations may further include, before the step of calculating, removing an effect of noise from the instance of the histogram.

(C5) In the auto exposure method denoted as (C4), the step of removing the effect of noise may include deconvoluting the instance of the histogram according to a noise model.

(C6) In any of the auto exposure methods denoted as (C1) through (C5), the image sensor may be configured to expose all pixels of the image sensor at same exposure time.

(C7) In any of the auto exposure methods denoted as (C1) through (C6), the image sensor may be a spatially-multiplexed-exposure high-dynamic-range image sensor, and the auto exposure method may include synthesizing the histogram from a plurality of exposure-time-specific histograms associated with a respective plurality of pixel subsets of the spatially-multiplexed-exposure high-dynamic-range image sensor operating at a respective plurality of different exposure times.

(C8) The auto exposure method denoted as (C7) may further include, before the step of synthesizing, removing an effect of noise from each of the exposure-time-specific histograms.

(C9) In the auto exposure method denoted as (C8), the step of removing the effect of noise may include deconvoluting each of the exposure-time-specific histograms according to a noise model.

(C10) In the auto exposure method denoted as (C1) through (C9), the minimum value of the variance is calculated by collectively minimizing the variance and a noise discrepancy between the pixel values from at least two different exposure times.

(C11) In the auto exposure method denoted as (C10), collectively minimizing the variance and the noise discrepancy comprises minimizing a function dependent upon the variance and the noise discrepancy.

(C12) In the auto exposure method denoted as (C10) or (C11), the noise discrepancy being calculated between pixel values from two closest exposure times.

(C13) In the auto exposure method denoted as (C10) or (C11) or (C12), wherein collectively minimizing the variance and the noise discrepancy comprises minimizing or reducing the number of pixels having pixel values at the transition point.

(C14) In the auto exposure method of any methods denoted as (C10) through (C13), wherein the image sensor being a color image sensor and wherein collectively minimizing the variance and the noise discrepancy at the transition point is performed for one or more selected color of the color image sensor, or for luminance values.

(C15) In the auto exposure method denoted as (C10) through (C14), the method comprising: setting a first time exposure to an initial value, setting a second time exposure to a minimum value shorter than the first time exposure, estimating a target value of the first time exposure from an histogram generated by setting the first time exposure to the initial value and the second time exposure to the minimum value, for scaling at least part of the histogram, outputting the target value as the optimal exposure time if the target value is equal or exceeds the initial value.

(C16) In the auto exposure method denoted as (C15), the method further comprising, prior outputting the target value: for a plurality of values of the first exposure time in a range about the target value, computing a respective plurality of values of a parameter indicative of the noise discrepancy resulting from the first exposure time; computing, from the values of the parameter, a revised value of the first exposure time corresponding to the transition point coinciding with the bin associated with a smallest one of the values of the noise discrepancy; outputting the revised value as the optimal exposure time if the revised value is equal or exceeds the initial value.

(C17) In the auto exposure method denoted as (C15) or (C16), the method comprising: updating the initial value of the first exposure time to the target value or revised value if the target value or the revised value is less than the initial value and proceeding to a subsequent iteration according to the steps of the method denoted as (C14) or (C15).

(D1a) A product for auto exposure of an image sensor may include machine-readable instructions encoded in non-transitory memory, wherein the machine-readable instructions include (I) data input instructions that, when executed by a processor, cause the processor to carry out any of the auto exposure method denoted as (C1) through (C16).

(D1b) A computer program comprising instructions which, when the program is executed by a computer, cause the computer to carry out any of the method denoted as (C1) through (C16).

(D2) An imaging system with auto exposure functionality may include an image sensor, a processor, and the product denoted as (D1a) or computer program denoted as (D1b) for determining the optimal exposure time for the image sensor when the processor executes the machine-readable instructions.

(D3) In the imaging system denoted as (D2), the image sensor may be configured to expose all pixels of the image sensor at same exposure time.

(D4) In either of the imaging systems denoted as (D2) and (D3), the image sensor may be a spatially-multiplexed-exposure high-dynamic-range image sensor, and the machine-readable instructions may further include synthesizing instructions that, when executed by the processor, synthesize the histogram from a plurality of exposure-time-specific histograms associated with a respective plurality of pixel subsets of the spatially-multiplexed-exposure high-dynamic-range image sensor operating at a respective plurality of different exposure times.

(D5) In the imaging system denoted as (D4), the entropy variance optimization instructions may include noise removal instructions that, when executed by the processor and in each of the iterations, remove an effect of noise from each of the exposure-time-specific histograms before execution of the synthesizing instructions.

(D6) In the imaging system denoted as (D5), the noise removal instructions may be configured to, when executed by the processor, deconvolute each of the exposure-time-specific histograms according to a noise model.

(E1) An auto exposure method for an SME HDR image sensor may include (I) retrieving raw image data from an exposure of the SME HDR image sensor, wherein the raw image data includes long-exposure pixel values from long-exposure pixels of the SME HDR image sensor characterized by a long exposure time and short-exposure pixel values from short-exposure pixels of the SME HDR image sensor characterized by a short exposure time, (II) for each of a plurality of spatial regions of the SME-HDR image sensor, evaluating saturation level of a selected long-exposure pixel in the spatial region, (III) for each of the spatial regions characterized by the long-exposure pixel value of the selected long-exposure pixel exceeding a saturation threshold, determining (i) a reduced short exposure time for the short-exposure pixels in the spatial region and (ii) an increased digital gain value that compensates for the reduced short exposure time, and (IV) for each of the spatial regions characterized by the long-exposure pixel value of the selected long-exposure pixel exceeding the saturation threshold, outputting the reduced short exposure time and the increased digital gain value to each short-exposure pixel in the spatial region.

(E2) In the auto exposure method denoted as (E1), each of the spatial regions may consist of one long-exposure pixel and one associated short-exposure pixel for each spectral-sensitivity class of pixels of the SME-HDR image sensor.

(E3) In the auto exposure method denoted as (E1), each of the spatial regions may include a plurality of the long-exposure pixels and a plurality of the short-exposure pixels for each spectral-sensitivity class of pixels of the SME-HDR image sensor.

(E4) In any of the auto exposure methods denoted as (E1) through (E3), the spatial regions may collectively include all long-exposure pixels and all short-exposure pixels of the SME-HDR image sensor.

(F1) A HDR imaging system with auto exposure functionality may include (I) a spatially-multiplexed-exposure (SME) HDR image sensor with circuitry configured to separately adjust at least one exposure time for each of a plurality of spatial regions, (II) a processor, and (III) machine-readable instructions encoded in non-transitory memory, wherein the machine-readable instructions include (a) data input instructions that, when executed by the processor, retrieve raw image data from an exposure of the SME HDR image sensor, the raw image data including long-exposure pixel values from long-exposure pixels of the SME HDR image sensor characterized by a long exposure time and short-exposure pixel values from short-exposure pixels of the SME HDR image sensor characterized by a short exposure time, (b) saturation evaluation instructions that, when executed by the processor and for each of the spatial regions, evaluate saturation level of at least one selected long-exposure pixel in the spatial region, (c) adjustment instructions that, when executed by the processor and for each of the spatial regions characterized by the long-exposure pixel value of the at least one selected long-exposure pixel exceeding a saturation threshold, determine (i) a reduced short exposure time for each short-exposure pixel in the spatial region and (ii) an increased digital gain value that compensates for the reduced short exposure time, and (d) data output instructions that, when executed by the processor and for each spatial region characterized by the long-exposure pixel value of the at least one selected long-exposure pixel exceeding a saturation threshold, output the reduced short exposure time and the increased digital gain value to each short-exposure pixel in the spatial region.

(F2) In the product denoted as (F1), each of the spatial regions may consist of one long-exposure pixel and one associated short-exposure pixel for each spectral-sensitivity class of pixels of the SME-HDR image sensor.

(F3) In the product denoted as (F1), each of the spatial regions may include a plurality of the long-exposure pixels and a plurality of the short-exposure pixels for each spectral-sensitivity class of pixels of the SME-HDR image sensor.

(F4) In any of the products denoted as (F1) through (F3), the spatial regions may collectively include all long-exposure pixels and all short-exposure pixels of the SME-HDR image sensor.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

The invention claimed is:

1. An auto exposure method for a spatially-multiplexed-exposure high-dynamic-range image sensor, comprising:
   evaluating variance, for each of a plurality of histograms of pixel values from a respective plurality of individual exposures of the image sensor at respective exposure time settings, of entropy contribution from individual bins of the histogram to total entropy of the histogram, to determine an optimal exposure time for the image sensor corresponding to at least a minimum value of the variance;
   setting a first time exposure to an initial value,
   setting a second time exposure to a minimum value shorter than the first time exposure,
   estimating a target value of the first time exposure from an histogram generated by setting the first time exposure to the initial value and the second time exposure to the minimum value, for scaling at least part of the histogram; and
   outputting to the image sensor the target value as the optimal exposure time if the target value is equal or exceeds the initial value, wherein the minimum value of the variance is calculated by collectively minimizing the variance and a noise discrepancy between the pixel values from at least two different exposure times.

2. The auto exposure method of claim 1, the step of evaluating comprising:
   for a plurality of different exposure time settings, performing a respective plurality of iterations of:
   (a) generating an instance of the histogram for pixel values from an exposure of the image sensor at a respective one of the exposure time setting settings; and
   (b) calculating the variance from the instance of the histogram.

3. The auto exposure method of claim 2, the step of calculating comprising, for each individual bin i, computing the entropy contribution as $S_i = -p_i \log_2(p_i)$, wherein $p_i$ is count in the individual bin i and calculating the variance of the entropy contribution ($Var(S_i)$).

4. The auto exposure method of claim 3, each of the iterations further comprising, before the step of calculating, removing an effect of noise from the instance of the histogram.

5. The auto exposure method of claim 4, the step of removing the effect of noise comprising deconvoluting the instance of the histogram according to a noise model.

6. The auto exposure method of claim 1, the image sensor being configured to expose all pixels of the image sensor at same exposure time.

7. The auto exposure method of claim 1, the auto exposure method comprising synthesizing the histogram from a plurality of exposure-time-specific histograms associated with a respective plurality of pixel subsets of the spatially-multi-plexed-exposure high-dynamic-range image sensor operating at a respective plurality of different exposure times.

8. The auto exposure method of claim 7, further comprising, before the step of synthesizing, removing an effect of noise from each of the exposure-time-specific histograms.

9. The auto exposure method of claim 8, the step of removing the effect of noise comprising deconvoluting each of the exposure-time-specific histograms according to a noise model.

10. The auto exposure method of claim 1, wherein collectively minimizing the variance and the noise discrepancy comprises minimizing a function depending on the variance and the noise discrepancy.

11. The auto exposure method of claim 10, wherein the noise discrepancy is calculated between pixel values from two closest exposure times.

12. The auto exposure method of claim 10, wherein collectively minimizing the variance and the noise discrepancy comprises minimizing or reducing the number of pixels having pixel values at a transition point.

13. The auto exposure method of claim 10, wherein the image sensor is a color image sensor and collectively minimizing the variance and the noise discrepancy at the transition point is performed for one or more selected color of the color image sensor, or for luminance values.

14. The auto exposure method of claim 10, comprising:
   setting a first time exposure to an initial value,
   setting a second time exposure to a minimum value shorter than the first time exposure,
   estimating a target value of the first time exposure from an histogram generated by setting the first time exposure to the initial value and the second time exposure to the minimum value, for scaling at least part of the histogram; and
   outputting the target value as the optimal exposure time if the target value is equal or exceeds the initial value.

15. The auto exposure method of claim 14, further comprising, prior outputting the target value:
   for a plurality of values of the first exposure time in a range about the target value, compute a respective plurality of values of an exposure parameter indicative of the noise discrepancy resulting from the first exposure time, computing, from the values of the exposure parameter, a revised value of the first exposure time corresponding to the transition point coinciding with the bin associated with a smallest one of the values of the noise discrepancy; and outputting the revised value as the optimal exposure time if the revised value is equal or exceeds the initial value.

16. The auto exposure method of claim 14, comprising:

updating the initial value of the first exposure time to the target value or revised value if the target value or the revised value is less than the initial value and proceeding to a subsequent iteration according to the steps of the method of claim 14 or 15.

17. A product for auto exposure of an image sensor, comprising machine-readable instructions encoded in non-transitory memory, the machine-readable instructions including:

data input instructions that, when executed by a processor, cause the processor to carry out any of the method of claim 1.

18. An imaging system with auto exposure functionality, comprising:

a spatially-multiplexed-exposure high-dynamic-range image sensor;

a processor; and the product of claim 17 for determining the optimal exposure time for the image sensor when the processor executes the machine-readable instructions.

19. The imaging system of claim 18, the image sensor being configured to expose all pixels of the image sensor at same exposure time.

20. The imaging system of claim 18, the machine-readable instructions further including synthesizing instructions that, when executed by the processor, synthesize the histogram from a plurality of exposure-time-specific histograms associated with a respective plurality of pixel subsets of the spatially-multiplexed-exposure high-dynamic-range image sensor operating at a respective plurality of different exposure times.

* * * * *